United States Patent
Henmi et al.

(10) Patent No.: US 10,558,335 B2
(45) Date of Patent: Feb. 11, 2020

(54) INFORMATION PROVIDING SYSTEM, INFORMATION PROVIDING METHOD, AND NON-TRANSITORY RECORDING MEDIUM

(71) Applicant: UNIVERSAL ENTERTAINMENT CORPORATION, Koto-Ku, Tokyo (JP)

(72) Inventors: Takuo Henmi, Tokyo (JP); Shigefumi Iinuma, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 927 days.

(21) Appl. No.: 14/950,634

(22) Filed: Nov. 24, 2015

(65) Prior Publication Data
US 2016/0148105 A1 May 26, 2016

(30) Foreign Application Priority Data
Nov. 26, 2014 (JP) .................................. 2014-239221

(51) Int. Cl.
*G06F 17/27* (2006.01)
*G06F 3/0484* (2013.01)

(52) U.S. Cl.
CPC ........ *G06F 3/0484* (2013.01); *G06F 17/2785* (2013.01)

(58) Field of Classification Search
CPC ............... G06F 3/0484; G06F 17/2211; G06F 17/2785; G06F 17/2795
See application file for complete search history.

(56) References Cited

U.S. PATENT DOCUMENTS

| | | | |
|---|---|---|---|
| 5,513,316 A * | 4/1996 | Rodrigues | G06F 11/3414 |
| | | | 714/38.13 |
| 7,925,498 B1 * | 4/2011 | Baker | G06F 17/30672 |
| | | | 704/10 |
| 2009/0099840 A1 | 4/2009 | Ishikawa et al. | |

(Continued)

OTHER PUBLICATIONS

Jeon et al. "Finding Similar Questions in Large Question and Answer Archives", CIKM'05 Proceedings of the 14th ACM International Conference on Information and Knowledge Management, Bremen, German, Oct. 31-Nov. 5, 2005 (Year: 2005).*

(Continued)

*Primary Examiner* — Li B. Zhen
*Assistant Examiner* — Tsu-Chang Lee
(74) *Attorney, Agent, or Firm* — Simpson & Simpson, PLLC; S. Peter Konzel, Esq.

(57) ABSTRACT

Provided is an information providing system for a system administrator not highly skilled in the arts of natural language or artificial intelligence to be able to easily correct or add a response to an input from a user to arrange the response into an appropriate one if the response is not appropriate. When an input sentence does not hit any knowledge data, the system administrator is able to add a combination of the input sentence and a response thereto by opening a new QA quick addition screen from a knowledge maintenance screen by pressing a link of the input sentence. Furthermore, the system administrator is able to easily add the input sentence to knowledge data as a synonymous sentence of a candidate Q, which is determined to be semantically close to the input sentence, by clicking the candidate Q on the knowledge maintenance screen.

14 Claims, 38 Drawing Sheets

(56) References Cited

U.S. PATENT DOCUMENTS

| | | | |
|---|---|---|---|
| 2010/0070448 A1* | 3/2010 | Omoigui | H01L 27/1463 706/47 |
| 2010/0240018 A1* | 9/2010 | Bethune | G09B 7/02 434/309 |
| 2015/0026106 A1 | 1/2015 | Oh et al. | |

OTHER PUBLICATIONS

Brill, et al., "Data-Intensive Question Answering", TREC2001 (Year: 2001).*

Serveryn, et al., "Learning to Rank Short Text Pair with Convolutional Deep Neural Networks", 38the International ACM SIGIR Conference on Research and Development in Information Retrieval, Santiago, Chile, Aug. 9-13, 2015 (Year: 2015).*

* cited by examiner

INPUT AND RESPONSE SCREEN 110

FIG. 16

NEW QA ADDITION SCREEN 810

▼ Q (REQUIRED)

I WANT A BOOK ABOUT PSYCHOLOGY.

I AM LOOKING FOR A BOOK ABOUT PSYCHOLOGY.

} 811

812 — ADD SYNONYMOUS SENTENCE

▼ A

| No. | A | REORDER | DELETE |
|---|---|---|---|
| 1 | YOU WILL FIND IT ON THE THIRD FLOOR.<br>◇ RESPONSE CONDITION<br>[+ SIMPLE CONFIGURATION] [+ CUSTOM CONFIGURATION] | | |
| 2 | TAKE THE ESCALATOR TO THE THIRD FLOOR. DISCOUNT IS AVAILABLE ON TUESDAYS!<br>◇ RESPONSE CONDITION<br>[+ SIMPLE CONFIGURATION] [+ CUSTOM CONFIGURATION] | ⇧ ⇩ | ✗ |

} 813

815   814 — ADD RESPONSE SENTENCE

▼ RESPONSE ACTION

▼ NOT APPLICABLE

816

817 — [ REGISTER ]

FIG. 17

SIMPLE CONFIGURATION SCREEN 830

SIMPLE CONFIGURATION SETTINGS

▼ A

| No. | A |
|---|---|
| 2 | TAKE THE ESCALATOR TO THE THIRD FLOOR. DISCOUNT IS AVAILABLE ON TUESDAYS! |

⎬ 831

TO INCLUDE ALL ▽ OF THE FOLLOWING CONDITIONS
TO INCLUDE ANY ONE

⎬ 832

| 1. DATE | — ▽ YR — ▽ MO — ▽ DAY ~ — ▽ YR — ▽ MO — ▽ DAY |
|---|---|
| 2. DAY OF THE WEEK | ☐ MON ☑ TUE ☐ WED ☐ THU ☐ FRI ☐ SAT ☐ SUN |
| 3. TIME | — ▽ TO — ▽ |
| 4. REVISIT | ☐ REVISIT |

⎬ 833

SET
834

FIG. 18

NEW QA ADDITION SCREEN 810

- ▼ Q (REQUIRED)
  - I WANT A BOOK ABOUT PSYCHOLOGY.
  - I AM LOOKING FOR A BOOK ABOUT PSYCHOLOGY.

811

812 — ⊞ ADD SYNONYMOUS SENTENCE

▼ A

| No. | A | REORDER | DELETE |
|---|---|---|---|
| 1 | YOU WILL FIND IT ON THE THIRD FLOOR.<br>◇ RESPONSE CONDITION<br>[+ SIMPLE CONFIGURATION] [+ CUSTOM CONFIGURATION] | | |
| 2 | TAKE THE ESCALATOR TO THE THIRD FLOOR. DISCOUNT IS AVAILABLE ON TUESDAYS!<br>◇ RESPONSE CONDITION<br>☐ TUE — 818       819 — [RESET]<br>[+ SIMPLE CONFIGURATION] [+ CUSTOM CONFIGURATION] | ⇧ ⇩ | ✕ |

813

815         814 — ⊞ ADD RESPONSE SENTENCE

▼ RESPONSE ACTION

▼ NOT APPLICABLE

816

817 — [REGISTER]

FIG. 19

NEW QA ADDITION SCREEN 810

- ▼ Q (REQUIRED)
  - I WANT A BOOK ABOUT PSYCHOLOGY.
  - I AM LOOKING FOR A BOOK ABOUT PSYCHOLOGY. ☒

— 811

812 — ⊞ ADD SYNONYMOUS SENTENCE

▼ A

| No. | A | REORDER | DELETE |
|---|---|---|---|
| 1 | YOU WILL FIND IT ON THE THIRD FLOOR.<br>◇ RESPONSE CONDITION<br>[+ SIMPLE CONFIGURATION] [+ CUSTOM CONFIGURATION] | | |
| 2 | TAKE THE ESCALATOR TO THE THIRD FLOOR. DISCOUNT IS AVAILABLE ON TUESDAYS!<br>◇ RESPONSE CONDITION<br>☐ TUE — 818     819 — [RESET]<br>[+ SIMPLE CONFIGURATION] [+ CUSTOM CONFIGURATION] | ⇧ ⇩ | ☒ |
| 3 | VISIT THE THIRD FLOOR. SPECIAL SALE IS GOING ON!<br>◇ RESPONSE CONDITION<br>[+ SIMPLE CONFIGURATION] [+ CUSTOM CONFIGURATION] | ⇧ ⇩ | ☒ |

— 813

815      814 — ⊞ ADD RESPONSE SENTENCE

▼ RESPONSE ACTION

▼ NOT APPLICABLE

816

817 — [ REGISTER ]

FIG. 21

NEW QA ADDITION SCREEN 810

▼ Q (REQUIRED)

I WANT A BOOK ABOUT PSYCHOLOGY.

I AM LOOKING FOR A BOOK ABOUT PSYCHOLOGY. ☒

811

812 — ⊞ ADD SYNONYMOUS SENTENCE

▼ A

| No. | A | REORDER | DELETE |
|---|---|---|---|
| 1 | YOU WILL FIND IT ON THE THIRD FLOOR.<br>◇ RESPONSE CONDITION<br>[+ SIMPLE CONFIGURATION] [+ CUSTOM CONFIGURATION] | | |
| 2 | VISIT THE THIRD FLOOR. SPECIAL SALE IS GOING ON!<br>◇ RESPONSE CONDITION  820<br>device=D0001,version>2.41    821 — [RESET]<br>[+ SIMPLE CONFIGURATION] [+ CUSTOM CONFIGURATION] | ⇧⇩ | ☒ |
| 3 | TAKE THE ESCALATOR TO THE THIRD FLOOR. DISCOUNT IS AVAILABLE ON TUESDAYS!<br>◇ RESPONSE CONDITION<br>☐ TUE — 818    819 — [RESET]<br>[+ SIMPLE CONFIGURATION] [+ CUSTOM CONFIGURATION] | ⇧⇩ | ☒ |

813

815          814 — ⊞ ADD RESPONSE SENTENCE

▼ RESPONSE ACTION

▼ NOT APPLICABLE

816

817 — [ REGISTER ]

FIG. 24

NEW QA ADDITION SCREEN 810

▼ Q (REQUIRED)

HELLO

812 — ⊞ ADD SYNONYMOUS SENTENCE

811

▼ A

| No. | A | REORDER | DELETE |
|---|---|---|---|
| 1 | HOW ARE YOU?<br>◇ RESPONSE CONDITION<br>+ SIMPLE CONFIGURATION  + CUSTOM CONFIGURATION | | |

813

816

▼ NOT APPLICABLE

| ☑ | IF YOU CHECK HERE, THIS Q IS EXCLUDED FROM SUGGESTIONS. |
| ☐ | IF YOU CHECK HERE, HIT ON THIS Q IS NOT RECORDED IN LOG. |

828

817 — ( REGISTER )

FIG. 27

SPECIFIC EVENT MESSAGE CONFIGURATION SCREEN 860

SPECIFIC EVENT MESSAGES

| NO HIT | NO ENTRY | START | ENTRY OF BANNED WORD |

| No. | MESSAGE IN EVENT OF NO HIT | REORDER | DELETE |
|---|---|---|---|
| 1 | MORE DETAILS, PLEASE.<br>◇ RESPONSE CONDITION<br>[+ SIMPLE CONFIGURATION] [+ CUSTOM CONFIGURATION] | | |
| 2 | CANNOT UNDERSTAND. COULD YOU EXPRESS YOUR QUESTION IN A DIFFERENT WAY?<br>◇ RESPONSE CONDITION<br>word_count>500  [RESET]<br>[+ SIMPLE CONFIGURATION] [+ CUSTOM CONFIGURATION] | ⇑ ⇓ | ☒ |

}861

865  863 [✎ EDIT MESSAGE]  864 [⊞ ADD MESSAGE]

▼ RESPONSE ACTION

▼ NOT APPLICABLE

866

867 (REGISTER)

FIG. 28

SPECIFIC EVENT MESSAGE CONFIGURATION SCREEN 860

SPECIFIC EVENT MESSAGES

| NO HIT | NO ENTRY | START | ENTRY OF BANNED WORD |

| No. | MESSAGE IN EVENT OF NO HIT | REORDER | DELETE |
|---|---|---|---|
| 1 | MAYBE, IS THIS WHAT YOU WANTED TO SAY?<br><br>◇ RESPONSE CONDITION<br>[+ SIMPLE CONFIGURATION] [+ CUSTOM CONFIGURATION] | | |

} 861

▼ RESPONSE ACTION      865

| SELECT | INFORMATION | INDICATION (INFORMATION DISPLAY AREA) | SET |
|---|---|---|---|
| ○ | RELATED TEXT | | |
| ◉ | AUTOMATIC CANDIDATE Q | DISPLAY CANDIDATE Qs CLOSE TO INPUT SENTENCE HAVING NO HIT | |
| ○ | API | | |
| ○ | NO INDICATION | | |

} 868

▼ NOT APPLICABLE

866

867 [ REGISTER ]

FIG. 29

TEST SCREEN 880

TEST (QA TEST/INTERNAL DICTIONARY TEST)

QA TEST | INTERNAL DICTIONARY TEST

◆ QA FREE TEST

INPUT SENTENCE: I CANNOT HEAR THE SOUND.   RESPONSE CONDITION (OPTIONAL):   [SEND]

<TEST RESULT>

(RETEST) (RELEASE)

| INPUT SENTENCE | A | HIT | HIT Q | CANDIDATE Q |
|---|---|---|---|---|
| I CANNOT HEAR THE SOUND. | CONTACT YOUR DEALER. | HIT (HIGH) | SOMETIMES I CANNOT HEAR THE SOUND. | - I CANNOT HEAR.<br>- I CANNOT SEE THE SCREEN.<br>- I CANNOT HEAR THE OTHER END OF THE CALL. |

} 881

◆ QA FILE TEST

IMPORT FILE: test.txt   (BROWSE) (SEND)

<TEST RESULT>

HIT LEVEL [SHOW ALL ▽]   CANDIDATE Q [SHOW ALL ▽]   STATUS [SHOW ALL ▽] (SEARCH)

|<| < page: 1 > >|    1 - 3 OF 3

(RETEST) (RELEASE)

| INPUT SENTENCE | A | HIT | HIT Q | CANDIDATE Q |
|---|---|---|---|---|
| I CANNOT HEAR THE SOUND. | CONTACT YOUR DEALER. | HIT (HIGH) | SOMETIMES I CANNOT HEAR THE SOUND. | - I CANNOT HEAR.<br>- I CANNOT SEE THE SCREEN.<br>- I CANNOT HEAR THE OTHER END OF THE CALL. |
| IT'S COLD TODAY | MORE DETAILS, PLEASE. | × | | |
| HOW ARE YOU? | MORE DETAILS, PLEASE. | × | | |

KNOWLEDGE MAINTENANCE SCREEN 890

KNOWLEDGE MAINTENANCE

<LOG PERIOD>
— ▽YR — ▽MO — ▽DAY ~ — ▽YR — ▽MO — ▽DAY

HIT LEVEL [SHOW ALL ▽] CANDIDATE Q [SHOW ALL ▽] STATUS [SHOW ALL ▽] (SEARCH)

⎫
⎬ 891
⎭

|< < page: 1 > >|  1 - 4 OF 4

ORDER: [TIME AND DATE OF INPUT (FROM NEWEST) ▽]  (INPUT SENTENCE TEST) (RELEASE)

| EXCLUDE | INPUT SENTENCE | HIT | HIT Q | CANDIDATE Q | TIME AND DATE OF INPUT | COUNT |
|---|---|---|---|---|---|---|
| ☐ | I CANNOT HEAR THE SOUND. | HIT (HIGH) | SOMETIMES I CANNOT HEAR THE SOUND. | - I CANNOT HEAR.<br>- I CANNOT SEE THE SCREEN.<br>- I CANNOT HEAR THE OTHER END OF THE CALL. | 2014/11/3 | 1 |
| ☐ | I CANNOT LISTEN TO THE OTHER END. | × | | - I CANNOT HEAR THE OTHER END OF THE CALL.<br>- THE CALL IS DISCONNECTED. | 2014/11/3 | 1 |
| ☐ | I CANNOT SEE THE SCREEN. | HIT (HIGH) | I CANNOT SEE THE SCREEN. | | 2014/11/1 | 1 |
| ☐ | I CANNOT TALK WITH THE OTHER END. | × | | - I CANNOT HEAR THE OTHER END OF THE CALL.<br>- THE CALL IS DISCONNECTED. | 2014/10/9 | 1 |

KNOWLEDGE MAINTENANCE SCREEN 890

| EXCLUDE | INPUT SENTENCE | HIT | HIT Q | CANDIDATE Q | TIME AND DATE OF INPUT | COUNT |
|---|---|---|---|---|---|---|
| ☐ | I CANNOT HEAR THE SOUND. | HIT (HIGH) | SOMETIMES I CANNOT HEAR THE SOUND. | - I CANNOT HEAR.<br>- I CANNOT SEE THE SCREEN.<br>- I CANNOT HEAR THE OTHER END OF THE CALL. | 2014/11/3 | 1 |
| ☐ | I CANNOT LISTEN TO THE OTHER END. | × | | - I CANNOT HEAR THE OTHER END OF THE CALL.<br>- THE CALL IS DISCONNECTED. | 2014/11/3 | 1 |
| ☐ | I CANNOT SEE THE SCREEN. | HIT (HIGH) | I CANNOT SEE THE SCREEN. | | 2014/11/1 | 1 |
| ☐ | I CANNOT TALK WITH THE OTHER END. | × | | - I CANNOT HEAR THE OTHER END OF THE CALL.<br>- THE CALL IS DISCONNECTED. | 2014/10/9 | 1 |

<LOG PERIOD>
— YR — MO — DAY ~ — YR — MO — DAY
HIT LEVEL: SHOW ALL  CANDIDATE Q: SHOW ALL  STATUS: SHOW ALL  (SEARCH)

page: 1   1 – 4 OF 4
ORDER: TIME AND DATE OF INPUT (FROM NEWEST)   (INPUT SENTENCE TEST)  (RELEASE)

891
892

893
▶ DETAILED INFORMATION
▶ FIND OTHER CANDIDATE

FIG. 34

CANDIDATE Q DETAILED INFORMATION SCREEN 910

| CANDIDATE Q DETAILED INFORMATION | | |
|---|---|---|
| CANDIDATE Q | A (RESPONSE) | SCORE |
| I CANNOT HEAR THE OTHER END OF CALL. | A1: DESCRIBE THE SITUATION MORE SPECIFICALLY. | 47% |
| THE CALL IS DISCONNECTED. | A8: CHECK WITH THE DEALER. | 45% |

911

912 RETURN

FIG. 37

KNOWLEDGE MAINTENANCE SCREEN 890

| EXCLUDE | INPUT SENTENCE | HIT | HIT Q | CANDIDATE Q | TIME AND DATE OF INPUT | COUNT |
|---|---|---|---|---|---|---|
| ☐ | I CANNOT HEAR THE SOUND. | HIT (HIGH) | SOMETIMES I CANNOT HEAR THE SOUND. | - I CANNOT HEAR.<br>- I CANNOT SEE THE SCREEN.<br>- I CANNOT HEAR THE OTHER END OF THE CALL. | 2014/11/3 | 1 |
| ☐ | I CANNOT LISTEN TO THE OTHER END. | HIT (HIGH) | CHECK WHETHER OTHER APP OUTPUTS SOUND. | - I CANNOT HEAR THE OTHER END OF THE CALL.<br>- THE CALL IS DISCONNECTED. | 2014/11/3 | 1 |
| ☐ | I CANNOT SEE THE SCREEN. | HIT (HIGH) | I CANNOT SEE THE SCREEN. | | 2014/11/1 | 1 |
| ☐ | I CANNOT TALK WITH THE OTHER END. | HIT (HIGH) | I CANNOT HEAR THE OTHER END OF CALL. | - THE CALL IS DISCONNECTED. | 2014/10/9 | 1 |

Section 891: KNOWLEDGE MAINTENANCE, <LOG PERIOD> YR/MO/DAY ~ YR/MO/DAY, HIT LEVEL [SHOW ALL], CANDIDATE Q [SHOW ALL], STATUS [SHOW ALL], (SEARCH)

Section 892: page 1, 1-4 OF 4, ORDER: TIME AND DATE OF INPUT (FROM NEWEST), (INPUT SENTENCE TEST), (RELEASE)

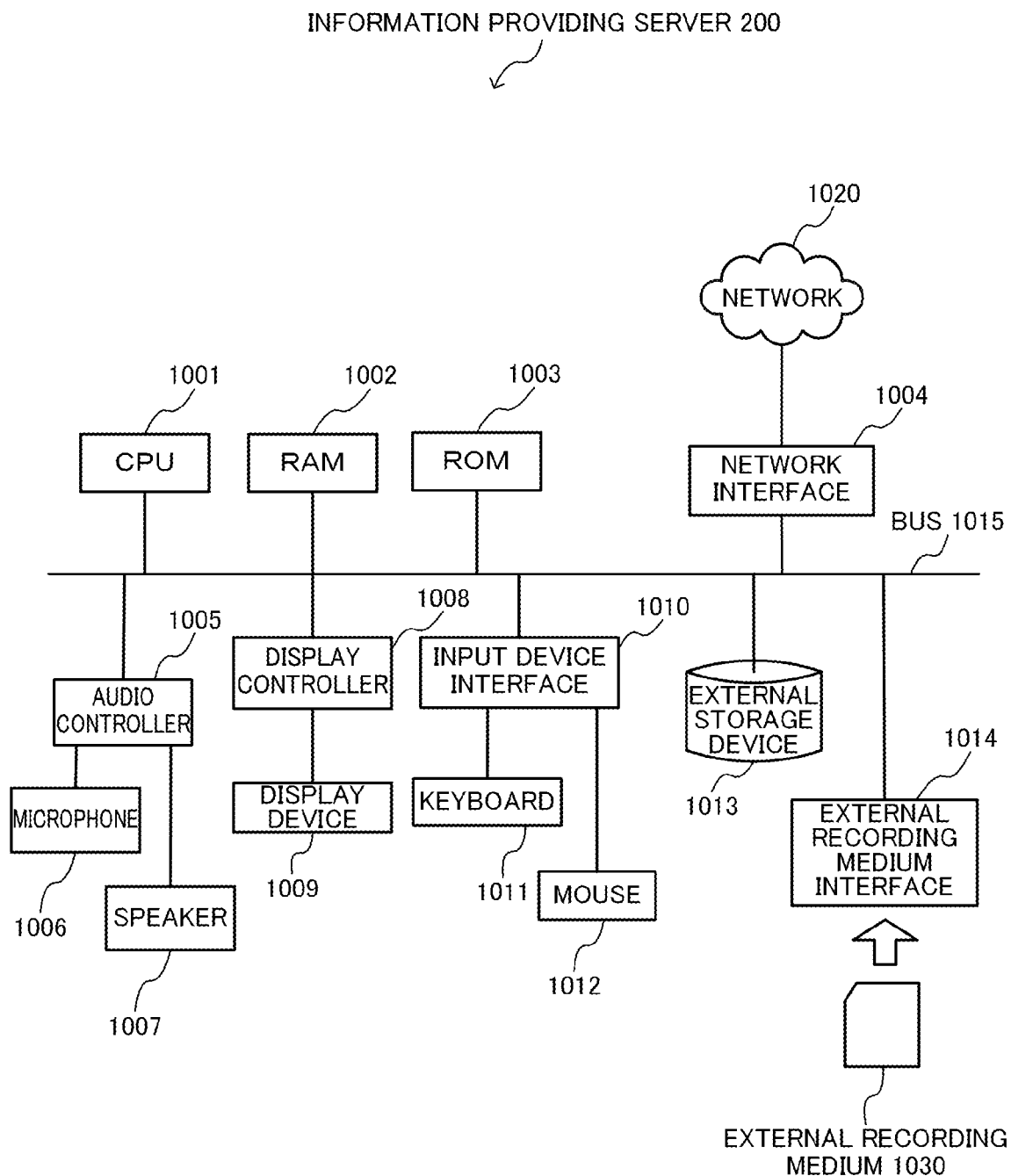

INFORMATION PROVIDING SYSTEM, INFORMATION PROVIDING METHOD, AND NON-TRANSITORY RECORDING MEDIUM

CROSS-REFERENCE TO RELATED APPLICATIONS

This application claims the benefit of Japanese Patent Application No. 2014-239221 filed on Nov. 26, 2014, which application is incorporated herein by reference in its entirety.

FIELD OF THE INVENTION

The present invention relates to an information providing system for providing information in response to input of a user.

BACKGROUND OF THE INVENTION

In recent years, systems for retrieving and providing an optimum solution to an inquiry from a user have been studied eagerly. Furthermore, in connection with development of such systems, technologies of natural language processing and artificial intelligence have been studied in order to analyze the syntax and the meaning of the inquiry entered by the user or to retrieve a solution to the inquiry.

For example, a question answering system has been proposed that outputs a candidate answer evaluated as the optimum to a question (refer to US patent application publication No. US 2015/0026106 A1). This question answering system retrieves candidate answers to a question, calculates a score representing the extent that the candidate answer is right to the question using a learning function for each of the combinations of a question and a candidate answer, and outputs the candidate answer which is most likely to be a right answer based on the calculated scores.

In the meanwhile, a requested matter identification system that analyzes an input sentence of a user's request described in natural language, determines whether the requested matter in the input sentence matches any of the predefined requests, and identifies and outputs the requested matter in the input sentence (refer to US patent application publication No. US 2009/0099840 A1).

BRIEF SUMMARY OF THE INVENTION

However, the important elements such as knowledge data, the learning engine, and the learning algorithm to implement the functionality of such a system are independently specialized and highly technical; even for the system administrator who provides and operates the system for users (end users), it is difficult to correct those elements to output more appropriate answers to the input sentences from the users.

Accordingly, an object of the present invention is to provide an information providing system, an information providing method, and a non-transitory recording medium for storing a program for supporting a system administrator who is not highly skilled in the arts of natural language and artificial intelligence so that, if a response to an input from a user is not appropriate, the system administrator can easily correct or add knowledge data or arrange the response to the input to an appropriate one.

The first aspect of the present invention is an information providing system (e.g., the information providing system 1) comprising:

an input reception module (e.g., the input reception module 211 of the information providing server 200) for receiving an input text (e.g., a question entered by a user 10) input from a user terminal operated by a user (e.g., the user 10);

a response determination module (e.g., the response determination module 212 of the information providing server 200) for determining a response to the input text (e.g., an answer to the question of the user 10) based on knowledge data (e.g., the knowledge data 310);

a response data generation module (e.g., the response data generation module 213 and the web access control module 250 of the information providing server 200) for generating response data including the response determined by the response determination module and sending the generated response data to the user terminal; and an administrative control module (e.g., the test control module 223 and the knowledge maintenance control module 222) for sending information about determination of a response in the response determination module (e.g., information on a response to a test input text determined in a test mode or information on candidate Qs to be displayed in the knowledge maintenance screen 890 (see FIG. 30) in a maintenance mode) to a system management terminal (e.g., the system management terminal 600) operated by a system administrator (e.g., the system administrator 20) in response to information from the system management terminal (e.g., a test input text in a test mode or information on an operation instruction specified with the knowledge maintenance screen 890 (see FIG. 30)) in a mode for the system administrator to make operations.

In the information providing system, the knowledge data includes reference texts (e.g., Qs stored in the knowledge data) to be compared with the input text and response texts (e.g., As stored in the knowledge data) associated with the reference texts; and the response determination module is configured to compare the input text with the reference texts and to determine a response text associated with a reference text semantically closest to the input text to be the response in a case where the response determination module determines that the semantic closeness level of the semantically closest reference text is higher than a predetermined level (e.g., in the case where the hit level is determined to be hit (high) or hit (low)).

The foregoing configuration of this invention allows the information providing system to exchange specific information with the system management terminal in accordance with operations of the system administrator. Accordingly, when the response to an input from the user is not appropriate, the information providing system of the present invention can support the system administrator in correcting or adding knowledge data, or arranging the response to the input into an appropriate one, even if the system administrator is not highly skilled in the arts of natural language and artificial intelligence.

The second aspect of the present invention is the information providing system of the first aspect, in which, the response determination module is configured to compare the input text with the reference texts and to determine a response text associated with a reference text semantically closest to the input text to be the response in a case where the response determination module determines that the semantic closeness level of the semantically closest reference text is higher than a predetermined level (e.g., in the case where the hit level is determined to be hit (high) or hit (low)), and the administrative control module includes a test control module (e.g., the test control module 223) configured to determine a response to a test input text provided from the system management terminal (e.g., the system management terminal 600) operated by the system administrator (e.g., the system administrator 20) based on data (e.g., the test data 320) including the reference texts to be compared with the input text and response texts associated with the reference texts and to send the determined response to the system management terminal in a test mode.

The foregoing configuration of the present invention provides a test mode in which the system administrator can test inputs and responses with knowledge data corrected or added by the system administrator by simulating inputs from users before providing the service to the users. In the test mode, which reference text is hit and which response text is returned are displayed for an input sentence entered by the system administrator. Hence, the system administrator can check the appropriateness of the knowledge data by testing inputs and responses before providing the service to the users.

The third aspect of the present invention is the information providing system of the second aspect, in which, the test input text is provided in a file (e.g., test.txt shown in FIG. 29) including a plurality of test input texts to be tested, and the test control module is configured to individually determine responses to the plurality of test input texts and to send data to display a list of the responses (e.g., the test result list in the QA file test area 882 shown in FIG. 29) to the system management terminal.

The foregoing configuration of the present invention provides the system administrator with a function to test a plurality of input sentences in a batch, instead of entering input sentences one by one in a test mode. Hence, the system administrator can check the appropriateness of the knowledge data through more efficient test of inputs and responses.

The fourth aspect of the present invention is the information providing system of the second aspect, in which the test control module is configured to send data to display the test input text (e.g., the input sentence "I cannot hear the sound." indicated in the field of input sentence in the QA file test area 882 in FIG. 29), a reference text associated with the response determined in the test mode (e.g., the reference text indicated in the field of hit Q in the QA file test area 882 in FIG. 29), and a reference text other than the reference text determined to be semantically closest to the test input text as a result of the comparison of the test input text with the reference texts (e.g., the reference texts indicated in the field of candidate Q in the QA file test area 882 in FIG. 29) to the system management terminal in a case where a response is determined in the test mode.

The foregoing configuration of the present invention provides the system administrator with indication of which reference text is hit and which reference text is selected as a candidate Q for an input sentence entered by the system administrator in a test mode. Hence, the system administrator can check the reference text semantically close to the input sentence but other than the hit Q.

The fifth aspect of the present invention is the information providing system of the second aspect, in which the test control module is configured to send data to display the test input text (e.g., the input sentence "It's cold today." indicated in the field of input sentence in the QA file test area 882 in FIG. 29) and a reference text determined to be semantically closest to the test input text as a result of the comparison of the test input text with the reference texts (e.g., a reference text indicated in the field of candidate Q in the QA file test area 882 in FIG. 29) to the system management terminal in a case where no response is determined in the test mode.

The foregoing configuration of the present invention provides the system administrator with indication of which reference text is selected as candidate Q for the input sentence entered by the system administrator. Hence, the system administrator can check the reference text semantically close to the input sentence.

The sixth aspect of the present invention is the information providing system of the first aspect, in which, the response determination module is configured to compare the input text with the reference texts and to determine a response text associated with a reference text semantically closest to the input text to be the response in a case where the response determination module determines that the semantic closeness level of the semantically closest reference text is higher than a predetermined level; and the administrative control module includes a knowledge maintenance control module (e.g., the knowledge maintenance control module 222) configured to send data to display a list of log data including an input text for which no response text associated with a reference text is determined to be a response (e.g., the input sentence "I cannot listen to the other end." indicated in the field of input sentence in the log data display area 892 in FIG. 30) and a reference text determined to be semantically closest to the input text by the response determination module as a result of the comparison of the input text with the reference texts (e.g., the reference text "I cannot hear the other end of the call." indicated in the field of candidate Q in the log data display area 892 in FIG. 30) to the system management terminal in response to operations of the system management terminal by the system administrator in a maintenance mode.

The foregoing configuration of the present invention provides a maintenance mode in which the system administrator can easily correct knowledge data based on the log of inputs and responses acquired after the service is provided to the users. In the maintenance mode, an input text having no hit and a candidate Q for the input text are shown for the system administrator based on the actual log data. Hence, the system administrator can check the reference text semantically close to the input sentence.

The seventh aspect of the present invention is the information providing system of the sixth aspect, in which the knowledge maintenance control module is configured to control the system management terminal to display a screen (e.g., the new QA quick addition screen 900 in FIG. 31) to add the input text to the knowledge data as a reference text when the input text shown in the list of log data (e.g., the input sentence "I cannot listen to the other end." indicated in the field of input sentence in the log data display area 892 in FIG. 30) is selected with the system management terminal.

The foregoing configuration of the present invention can show the system administrator an input sentence having no hit and a candidate Q for the input sentence based on the actual log data in a maintenance mode, and further, provide the system administrator with a screen for adding a QA for the input sentence in response to press of the input sentence. Hence, when the response to an input from the user is not appropriate, such as resulting in no hit, the system administrator can easily correct or add knowledge data by configuring a new QA to arrange the response to the input into an appropriate one, even if the system administrator is not highly skilled in natural language or artificial intelligence.

The eighth aspect of the present invention is the information providing system of the sixth aspect, in which the knowledge maintenance control module is configured to control the system management terminal to display a screen (e.g., the synonymous sentence quick addition screen 930 in FIG. 35) to add the input text associated with the reference text in the list of log data (e.g., the input sentence "I cannot talk with the other end." indicated in the field of input sentence in the log data display area 892 in FIG. 30) as a synonymous sentence of the reference text (e.g., "I cannot hear the other end of the call.") stored in the knowledge data when the reference text (e.g., the reference text "I cannot hear the other end of the call" indicated in the field of candidate Q in the log data display area 892 in FIG. 30) shown in the list of log data is selected with the system management terminal.

The foregoing configuration of the present invention can show the system administrator an input sentence having no hit and a candidate Q for the input sentence based on the actual log data in a maintenance mode, and further, provide the system administrator with a screen for adding the input sentence as a synonymous sentence of the candidate Q in response to press of the candidate Q. Hence, when the response to the input from the user is not appropriate, such as resulting in no hit, the system administrator can easily correct or add knowledge data by configuring a new QA to arrange the response to the input into an appropriate one, even if the system administrator is not highly skilled in natural language or artificial intelligence.

The ninth aspect of the present invention is an information providing method for an information providing server (e.g., the information providing server 200) in an information providing system. The method comprises:
an input reception step for receiving an input text input from a user terminal operated by a user;
a response determination step for determining a response to the input text based on knowledge data;
a response data generation step for generating response data including the response determined by the response determination step and sending the generated response data to the user terminal; and
an administrative control step for sending information about determination of a response in the response determination step to a system management terminal operated by a system administrator in response to information from the system management terminal in a mode for the system administrator to make operations.

In the information providing method, the knowledge data includes reference texts to be compared with the input text and response texts associated with the reference texts; and the response determination step compares the input text with the reference texts and determines a response text associated with a reference text semantically closest to the input text to be the response in a case where the response determination step determines that the semantic closeness level of the semantically closest reference text is higher than a predetermined level.

The foregoing configuration of this invention allows the information providing server to exchange specific information with the system management terminal in accordance with operations of the system administrator. Accordingly, when the response to an input from the user is not appropriate, the information providing system of the present invention can support the system administrator in correcting or adding knowledge data, or arranging the response to the input into an appropriate one, even if the system administrator is not highly skilled in the arts of natural language and artificial intelligence.

The tenth aspect of the present invention is the information providing method of the ninth aspect, in which,
the response determination step compares the input text with the reference texts and determines a response text associated with a reference text semantically closest to the input text to be the response in a case where the response determination step determines that the semantic closeness level of the semantically closest reference text is higher than a predetermined level; and
the administrative control step includes a test control step for determining a response to a test input text provided from the system management terminal operated by the system administrator based on data including the reference texts to be compared with the input text and response texts associated with the reference texts and sending the determined response to the system management terminal in a test mode.

The foregoing configuration of the present invention displays which reference text is hit and which response text is returned to an input sentence entered by the system administrator in a test mode. Hence, the system administrator can check the appropriateness of the knowledge data by testing inputs and responses before providing the service to the users.

The eleventh aspect of the present invention is the information providing method of the ninth aspect, in which,
the response determination step compares the input text with the reference texts and determines a response text associated with a reference text semantically closest to the input text to be the response in a case where the response determination step determines that the semantic closeness level of the semantically closest reference text is higher than a predetermined level; and
the administrative control step includes a knowledge maintenance control step for sending data to display a list of log data including an input text for which no response text associated with a reference text is determined to be a response and a reference text determined to be semantically closest to the input text by the response determination step as a result of the comparison of the input text with the reference texts to the system management terminal in response to operations of the system management terminal by the system administrator in a maintenance mode.

The foregoing configuration of the present invention shows the system administrator an input sentence having no hit and a candidate Q for the input sentence based on the actual log data. Hence, the system administrator can check the reference text semantically close to the input sentence.

The twelfth aspect of the present invention is a non-transitory recording medium storing a program for making a computer (e.g., the information providing server 200 in FIG. 38) function as:
an input reception module for receiving an input text input from a user terminal operated by a user;
a response determination module for determining a response to the input text based on knowledge data;
a response data generation module for generating response data including the response determined by the response determination module and sending the generated response data to the user terminal; and
an administrative control module for sending information about determination of the response in the response determination module to a system management terminal operated by a system administrator in response to information from the system management terminal in a mode for the system administrator to make operations.

The knowledge data includes reference texts to be compared with the input text and response texts associated with the reference texts; and the response determination module is configured to compare the input text with the reference texts and to determine a response text associated with a reference text semantically closest to the input text to be the response in a case where the response determination module determines that the semantic closeness level of the semantically closest reference text is higher than a predetermined level.

The foregoing configuration of this invention allows the information providing server to exchange specific information with the system management terminal in accordance with operations of the system administrator. Accordingly, when the response to an input from the user is not appropriate, the information providing system of the present invention can support the system administrator in correcting or adding knowledge data, or arranging the response to the input into an appropriate one, even if the system administrator is not highly skilled in the arts of natural language and artificial intelligence.

The thirteenth aspect of the present invention is the non-transitory recording medium of the twelfth aspect, in which, the response determination module is configured to compare the input text with the reference texts and to determine a response text associated with a reference text semantically closest to the input text to be the response in a case where the response determination module determines that the semantic closeness level of the semantically closest reference text is higher than a predetermined level; and the administrative control module includes a test control module configured to determine a response to a test input text provided from the system management terminal operated by the system administrator based on data including the reference texts to be compared with the input text and the response texts associated with the reference texts and to send the determined response to the system management terminal in a test mode.

The foregoing configuration of the present invention displays which reference text is hit and which response text is returned to an input sentence entered by the system administrator in a test mode. Hence, the system administrator can check the appropriateness of the knowledge data by testing inputs and responses before providing the service to the users.

The fourteenth aspect of the present invention is the non-transitory recording medium of the twelfth aspect, in which, the response determination module is configured to compare the input text with the reference texts and to determine a response text associated with a reference text semantically closest to the input text to be the response in a case where the response determination module determines that the semantic closeness level of the semantically closest reference text is higher than a predetermined level; and the administrative control module includes a knowledge maintenance control module configured to send data to display a list of log data including an input text for which no response text associated with a reference text is determined to be a response and a reference text determined to be semantically closest to the input text by the response determination module as a result of the comparison of the input text with the reference texts to the system management terminal in response to operations of the system management terminal by the system administrator in a maintenance mode.

The foregoing configuration of the present invention shows the system administrator an input sentence having no hit and a candidate Q for the input sentence based on the actual log data. Hence, the system administrator can check the reference text semantically close to the input sentence.

The information providing system of the present invention is capable of supporting a system administrator who is not highly skilled in the arts of natural language and artificial intelligence so that, if a response to an input from the user is not appropriate, the system administrator can easily correct or add knowledge data or arrange the response to the input to an appropriate one.

Furthermore, the information providing system of the present invention provides a test mode in which the system administrator can test inputs and responses with knowledge data corrected or added by the system administrator by simulating inputs from users before providing the service to the users.

Still further, the information providing system of the present invention provides a maintenance mode in which the system administrator can easily correct knowledge data based on the log of inputs and responses acquired after the service is provided to the users.

These and other aspects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which:

FIG. 16 is a diagram for illustrating a new QA addition screen;

FIG. 17 is a diagram for illustrating a simple configuration screen;

FIG. 18 is a diagram for illustrating a new QA addition screen;

FIG. 19 is a diagram for illustrating a new QA addition screen;

FIG. 21 is a diagram for illustrating a new QA addition screen;

FIG. 24 is a diagram for illustrating a new QA addition screen;

FIG. 27 is a diagram for illustrating a specific event message configuration screen;

FIG. 28 is a diagram for illustrating a specific event message configuration screen;

FIG. 29 is a diagram for illustrating a test screen;

FIG. 30 is a diagram for illustrating a knowledge maintenance screen;

FIG. 33 is a diagram for illustrating a knowledge maintenance screen;

FIG. 34 is a diagram for illustrating a candidate Q detailed information screen;

FIG. 37 is a diagram for illustrating a knowledge maintenance screen; and

FIG. 38 is a diagram for illustrating an example of a hardware configuration of a computer for implementing an information providing server included in the information providing system of the present invention.

DETAILED DESCRIPTION OF THE PREFERRED EMBODIMENT

Hereinafter, an information providing system 1 of an embodiment of the present invention is described with reference to the drawings.

Figure 1:
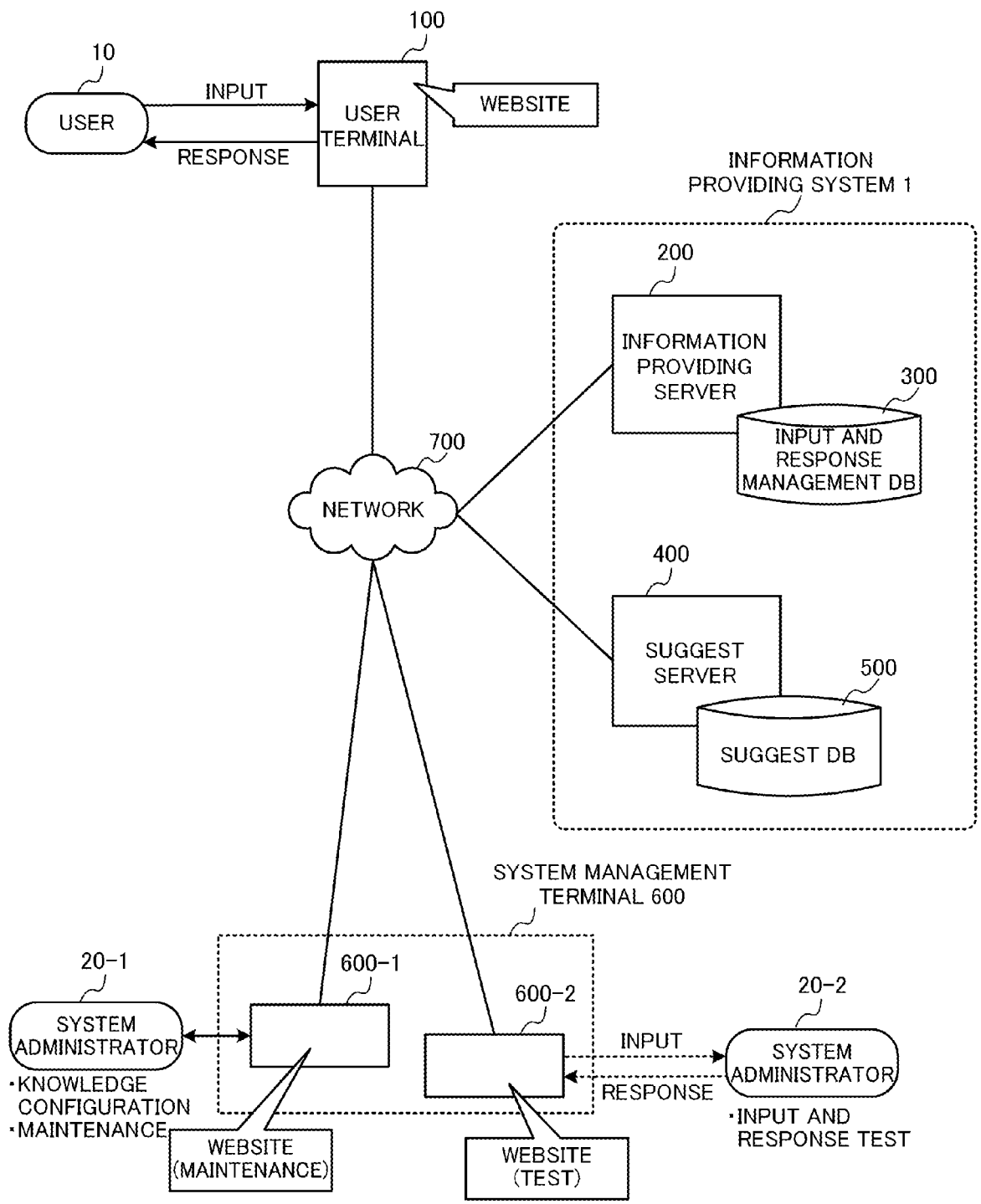
FIG. 1 is a diagram for illustrating an overview of an information providing system.

FIG. 1 is a diagram for illustrating an overview of a system including the information providing system 1 for providing knowledge data by making a response to an input.

A user 10 enters a text to an entry area of a specific web page displayed by a web browser run on a user terminal 100, for example, by using a keyboard or a touch panel (see the upper part of FIG. 1). The text entered by the user is usually in the form of a sentence (input sentence) in a natural language. The text may be a question about a product of the company providing the website including the web page. An input from the user is hereinafter referred to as input sentence for convenience; however, the input does not need to be a sentence and may be various types of texts, including a word or an incomplete sentence.

The text entered by the user is provided by the web browser on the user terminal 100 to the information providing system 1 via a network 700. The network 700 is a network including the Internet.

Upon receipt of the text from the user terminal 100, the information providing system 1 determines a text (usually, a response sentence) to be a response to the received text and sends the text to the user terminal 100 via the network 700. Hence, when the user enters a text to the entry area of a web page, a response (text) answering the text is displayed in the response display area of the web page. For example, when a user 10 enters a question about a product to the entry area of the web page, an answer to the question is displayed in the response display area of the web page.

The information providing system 1 includes an information providing server 200 and a suggest server 400. The information providing server 200 has an input and response management DB 300 including knowledge data. The information providing server 200 determines a text appropriate for a response to an input received from a user terminal 100 with the input and response management DB 300 and sends response data to the user terminal 100 so as to display the response text in the response display area (the response display area of the web page shown by the web browser run on the user terminal 100). The functions of the information providing server 200 and the input and response management DB 300 will be described later in detail.

The suggest server 400 has a suggest DB 500. When the user 100 enters a text with the user terminal 100, the suggest server 400 predicts the text being entered by the user 10 based on the texts entered by various users 10 with reference to the suggest DB 500 and sends data to the user terminal 100 so as to display candidates for the text under the entry area (the entry area of the web page displayed by the web browser run on the user terminal 100). In addition, the suggest server 400 selects some texts previously entered by the user 10 based on specified conditions and displays the texts on the web page. The functions of the suggest server 400 and the suggest DB 500 will be described later in detail.

The system administrator 20 (20-1 and 20-2) conducts maintenance and test of the information providing system 1 with a system management terminal 600 (see the lower part of FIG. 1). For example, the system administrator 20-1 conducts maintenance of the information providing system 1 (including newly creating knowledge, adding new knowledge, and correcting the knowledge) by performing predetermined operations on a web page for maintenance displayed by the web browser run on the system management terminal 600-1. The system administrator 20-2 tests the knowledge configured or reconfigured through the maintenance by the system administrator 20-1 by performing predetermined operations on a web page for testing displayed by the web browser run on the system management terminal 600-2 to check whether an appropriate response is made to an input (that is to say, the system administrator 20-2 simulates the operations of a user 10 of entering a text with the user terminal 100 and operations of the information providing system 1 of providing a response to the input on the user terminal 100).

Although FIG. 1 can be seen as the system administrator 20-1 conducts the maintenance and the system administrator 20-2 conducts the test with their system management terminals (600-1 and 600-2), the same system administrator may conduct these operations with the same system management terminal. The operations of the maintenance and the test may be further divided and assigned to sections or persons, so that more system administrators can share the operations. It is preferable that the system administrator 20 who conducts the maintenance and the test of the knowledge data be a knowledge configurator skilled in handling knowledge data.

If the information providing system 1 is provided to be used by unspecified users, the user 10 is expected to be an ordinary user who asks questions to the company or organization providing the website (about their products or services) and the user terminal 100 could be the user's PC (personal computer) connectable to the Internet. The information providing system 1 can be also used as a system for a limited range (for example, as an intra-company knowledge sharing system); in this case, the user 10 is a specified user authorized to access the information providing system 1.

The system administrator 20 is a person to manage the knowledge data to be handled by the information providing system 1; if the information providing system 1 is used as a system to receive questions about the products and services of a company or organization, the system administrator should be an employee of the company or organization. In place of the company or organization, an agent or an entrusted company can be the system administrator.

In FIG. 1, the user 10 places a question to the information providing system 1 by entering a text to an entry area of a website with an input device such as a keyboard; however, the information providing system 1 accepts a text entered in any way or via any route. For example, the user 10 may issue a question in speech; the speech can be converted into a text by speech recognition processing and the obtained text can be provided to the information providing system 1. For another example, a printed question can be converted into a text by OCR (Optical Character Recognition) and the obtained text can be provided to the information providing system 1.

It should be noted that the information providing server 200 in the present embodiment has a function of a web server that communicates data with the web browsers run on the user terminal 100 and the system management terminal 600 using some protocol such as HTTP to display a predetermined web page on the web browsers.

Although FIG. 1 shows the information providing server 200 as a single computer, the information providing server 200 can be implemented by distributing the processing to a plurality of computers having the same functions. As to the input and response management DB 300, the stored data can also be divided in accordance with various policies and distributed to a plurality of sites or computers.

Figure 2A:
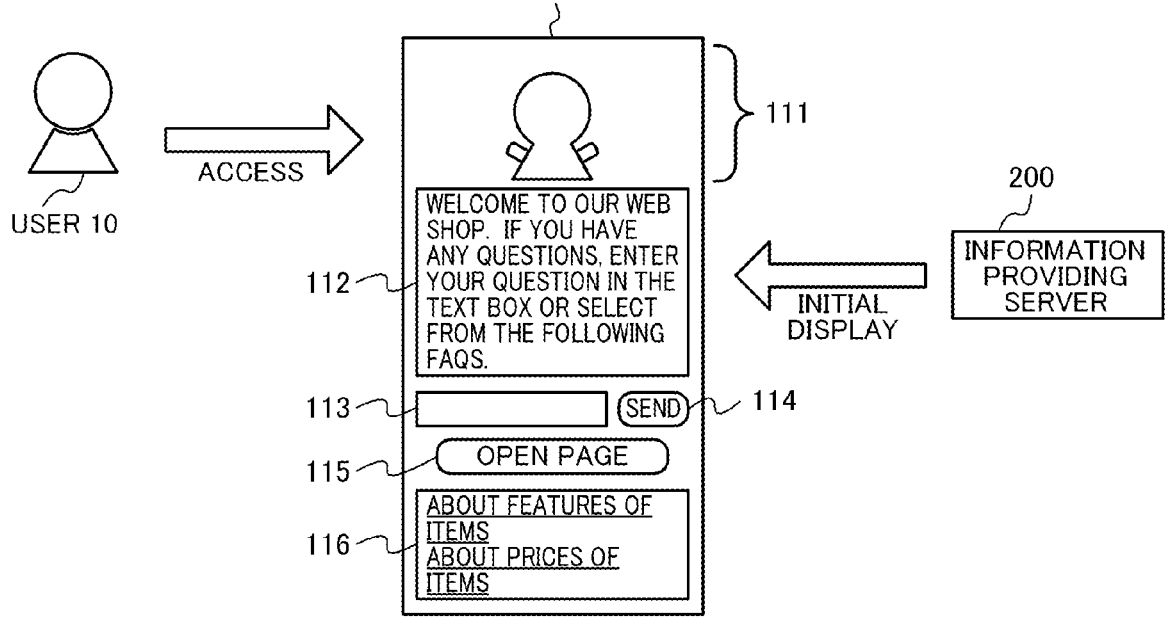
FIGS. 2A to 2C provide diagrams for illustrating a way of exchanging inputs and responses in the information providing system.
Figure 2B:
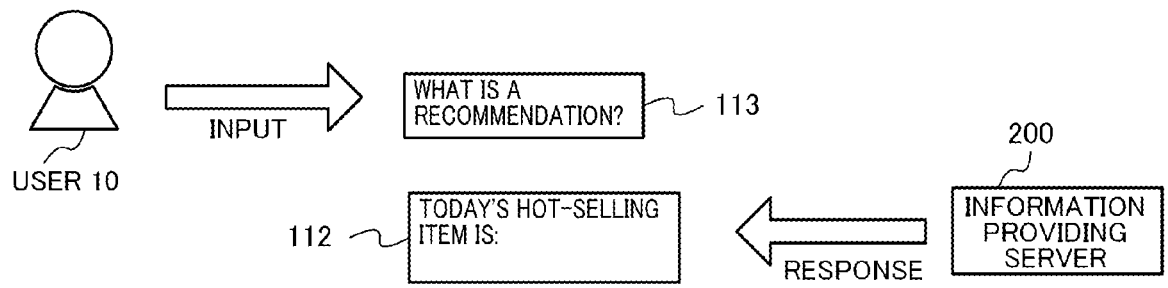
Figure 2C:
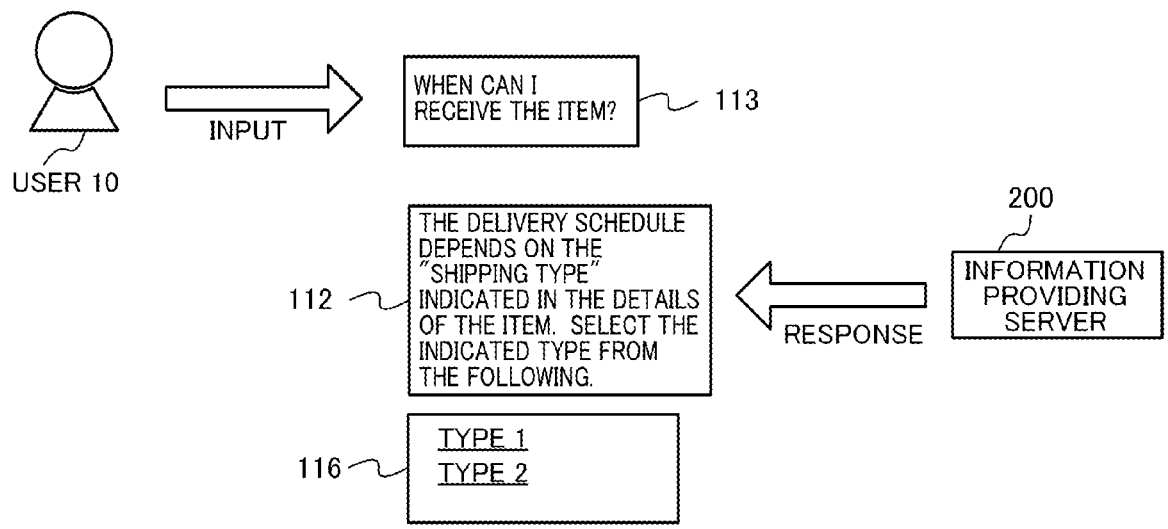

FIGS. 2A to 2C provide diagrams for illustrating a way of exchanging inputs and responses with a user 10 by the information providing system 1 of the present embodiment.

The input and response screen 110 in FIG. 2A is a web page (or a part of a web page) displayed by the web browser run on the user terminal 100. The input and response screen 110 may be displayed in the form of an independent window page or a part of a web page.

The input and response screen 110 includes a character image display area 111, an input and response display area 112, an entry area 113, a Send button 114, a page change button 115, and an information display area 116.

The character image display area 111 is an area for displaying a character image; the character can be changed in accordance with the context of the input or response. For example, even if the same character is displayed, the displayed character can be controlled to have different looks depending on the context of the response. The response display area 112 displays a response output from the information providing system 1.

The entry area 113 is an area for the user 10 to enter a text of a question. The Send button 114 is a button for the user 10 to press after the user 10 completes entering the text to the entry area 113 (The present embodiment assumes that buttons and links are pressed (clicked) with a mouse. The same applies to the following). In response to press of the Send button 114, the entered text is sent to the information providing system 1 via the network 700 using a protocol such as HTTP.

The page change button 115 is displayed in the case where the page change (jump to/open a page) is set in a response action, which will be described later; in response to press of the page change button 115, the display changes to the specified web page.

The information display area 116 is an area to display additional information supplemented to the response output by the information providing system 1.

In FIG. 2A, the user 10 first accesses the web page of this input and response screen 110. Then, the information providing server 200 of the information providing system 1 sends HTML data to the user terminal 100 to display a text such as "Welcome to our web shop." in the response display area 112 on the input and response screen 110 and to display link texts such as "About features of items" or "About prices of items" in the information display area 116.

The texts such as "About features of items" and "About prices of items" are provided by the suggest server 400 of the information providing system 1. These texts are inputs that are frequently provided and the responses thereto are successful (hit) in the past ("popular Qs" to be described later). In response to selection of a text displayed in the information display area 116 (in the example of FIG. 2A, either "About features of items" or "About prices of items") with a mouse, the selected text is automatically sent to the information providing system 1 as an input and a response to the text is displayed in the response display area 112.

After the input and response screen 110 as shown in FIG. 2A is displayed, the user 10 enters a question "What is a recommendation?" in the entry area 113 as shown in FIG. 2B and presses the Send button 114. Note that the input and response screens 110 in FIG. 2B and FIG. 2C show only the portions relevant to the description.

In response, the information providing server 200 of the information providing system 1 displays an answer "Today's hot-selling item is:" in the response display area 112.

Subsequently, the user 10 enters a question "When can I receive the item?" in the entry area 113 as shown in FIG. 2C and presses the Send button 114. In response, the information providing server 200 of the information providing system 1 displays an answer "The delivery schedule depends on the 'shipping type' indicated in the details of the item. Select the indicated type from the following." in the response display area 112. Furthermore, the information providing server 200 displays link texts "Type 1" and "Type 2" in the information display area 116.

When the user 10 selects a text (in the example of FIG. 2C, either "Type 1" or "Type 2") displayed in the information display area 116, the selected text is automatically entered to the entry area 113 and subsequently, the text is forwarded to the information providing system 1 as an input upon press of the Send button 114. Then, specific information about Type 1 or Type 2 is displayed in the response display area 112 as a response from the information providing system 1.

In this way, the user 10 can have a "dialogue" with the information providing system 1 (or the information providing server 200 thereof) through the input and response screen 110 displayed on the web browser of the user terminal 100 to direct the information providing system 1 to provide necessary information.

The system administrator 20 improves the knowledge data of the information providing system 1 so that the information providing system 1 can appropriately select information to be displayed in the response display area 112 and the information display area 116. The information providing system 1 guides the user 10 with a predetermined scenario by providing information step by step so that the user 10 can acquire desired information.

Figure 3:
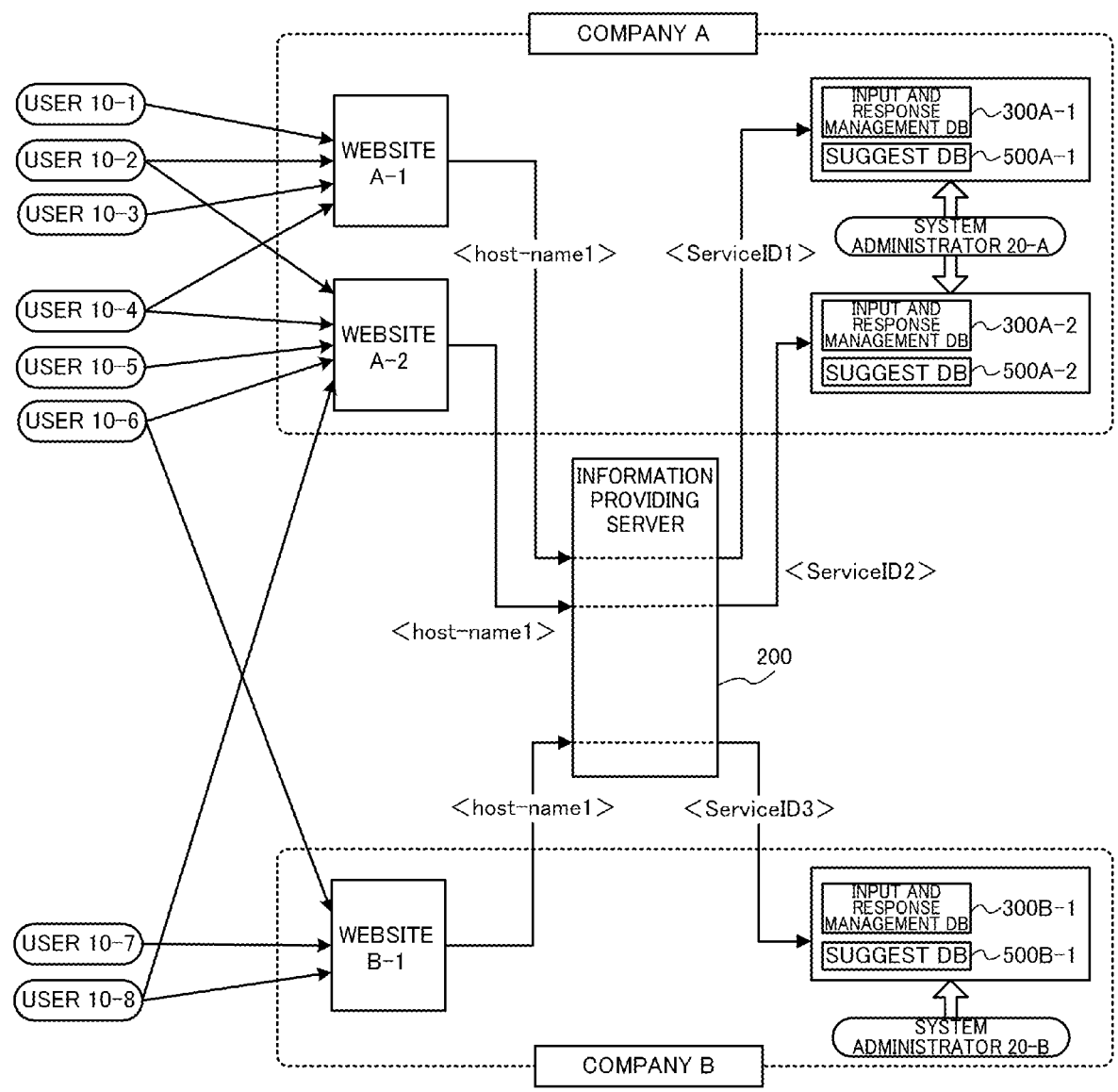
FIG. 3 is a diagram for illustrating an example of a case where the information providing system provides a plurality of input and response services each utilizing a different set of knowledge data.

FIG. 3 is a diagram for illustrating an example of a case where the information providing system 1 provides a plurality of input and response services each utilizing a different set of knowledge data.

In this example, it is assumed that Company A and Company B use the information providing system 1 to provide knowledge data. Company A runs a Q & A corner about a product A-1 on a website A-1 and a support corner about a service A-2 on a website A-2.

When a user 10 accesses the website A-1, opens a web page of the Q & A corner about the product A-1, and enters and sends a question through the web page, the HTTP request is sent to the information providing server 200. The information providing server 200 generates response data based on the input text with an input and response management DB 300A-1, sends the response data to the user terminal 100 of the user 10, and displays the response on the web page. In these operations, the HTTP request is addressed to <host-name1> and is identified as a question in the Q & A corner about the product A-1 with <ServiceID1>.

In similar, when a user 10 accesses the website A-2, opens a web page of the support corner about the service A-2, and enters and sends a question through the web page, the HTTP request is sent to the information providing server 200. The information providing server 200 generates response data based on the input text with an input and response management DB 300A-2, sends the response data to the user terminal 100 of the user 10, and displays the response on the web page. In these operations, the HTTP request is addressed to <host-name1> and is identified as a question in the support corner about the service A-2 with <ServiceID2>.

In the meanwhile, Company B runs a Q & A corner about a product B-1 on a website B-1.

When a user 10 accesses the website B-1, opens a web page of the Q & A corner about the product B-1, and enters and sends a question through the web page, the HTTP request is sent to the information providing server 200. The information providing server 200 generates response data based on the input text with an input and response management DB 300B-1, sends the response data to the user terminal 100 of the user 10, and displays the response on the web page. In these operations, the HTTP request is addressed to <host-name1> and is identified as a question in the Q & A corner about the product B-1 with <ServiceID3>.

As noted from above, in the example of FIG. 3, input and response services utilizing the knowledge data of two companies A and B are operated by one information providing server 200; different knowledge data (input and response management DB) is used depending on the website (namely, the subject of the question). If the user 10 accesses one of the websites through searching the Internet and inputs a question on the website, the user 10 can receive a response appropriate for the input. The user 10 does not recognize to which host the HTTP request is sent and which knowledge data is used.

For example, if a user 10-6 inputs a question about the service A-2 on the website A-2, the answer to the question is obtained using the input and response management DB 300A-2; if the user 10-6 inputs a question about the product B-1 on the website B-1, the answer to the question is obtained using the input and response management DB 300B-1.

Although the example of FIG. 3 uses a single information providing server 200, a plurality of information providing servers 200 may be used. In such a case, the system should be configured to select a host ID depending on the website. The system can also be configured to use the same input and response management DB 300 in making responses to questions about different websites, different products, or different services by assigning the same service ID.

In the example of FIG. 3, the website A-1, the website A-2, the input and response management DB 300A-1 (and the suggest DB 500A-1), and the input and response management DB 300A-2 (and the suggest DB 500A-2) are managed by Company A; the maintenance and the test are conducted by the system administrator 20-A of Company A. On the other hand, the website B-1 and the input and response management DB 300B-1 (and the suggest DB 500B-1) are managed by Company B; the maintenance and the test are conducted by the system administrator 20-B of Company B. The information providing server 200 has functions of a web server and an artificial intelligence engine; the specifications and configuration of the web server functions and the artificial intelligence engine are managed by the company that develops and provides the information providing system.

Figure 4:
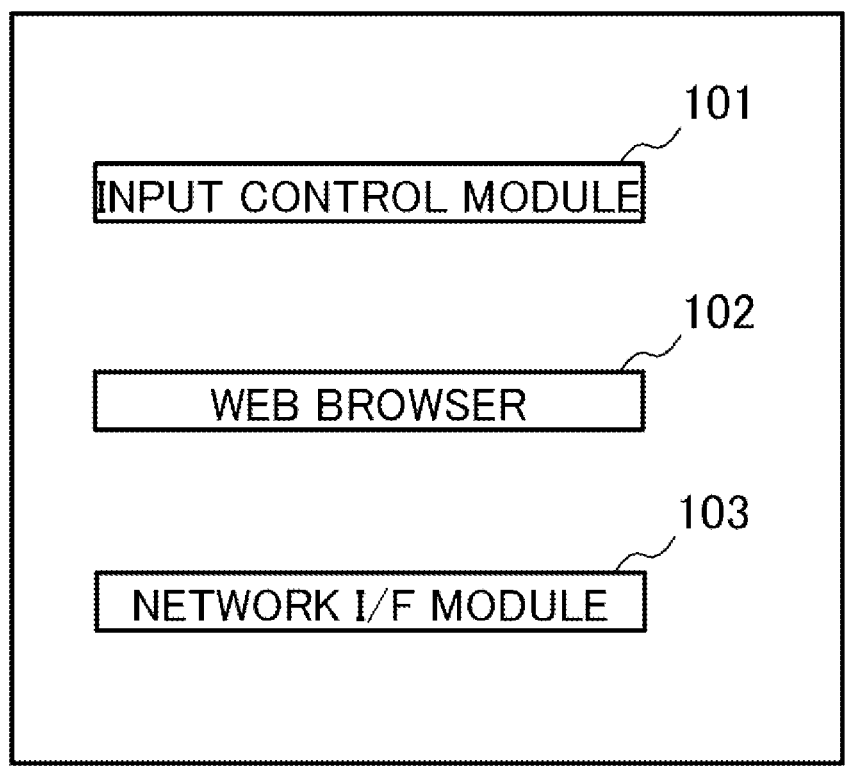
FIG. 4 is a functional block diagram of a user terminal.
Figure 5:
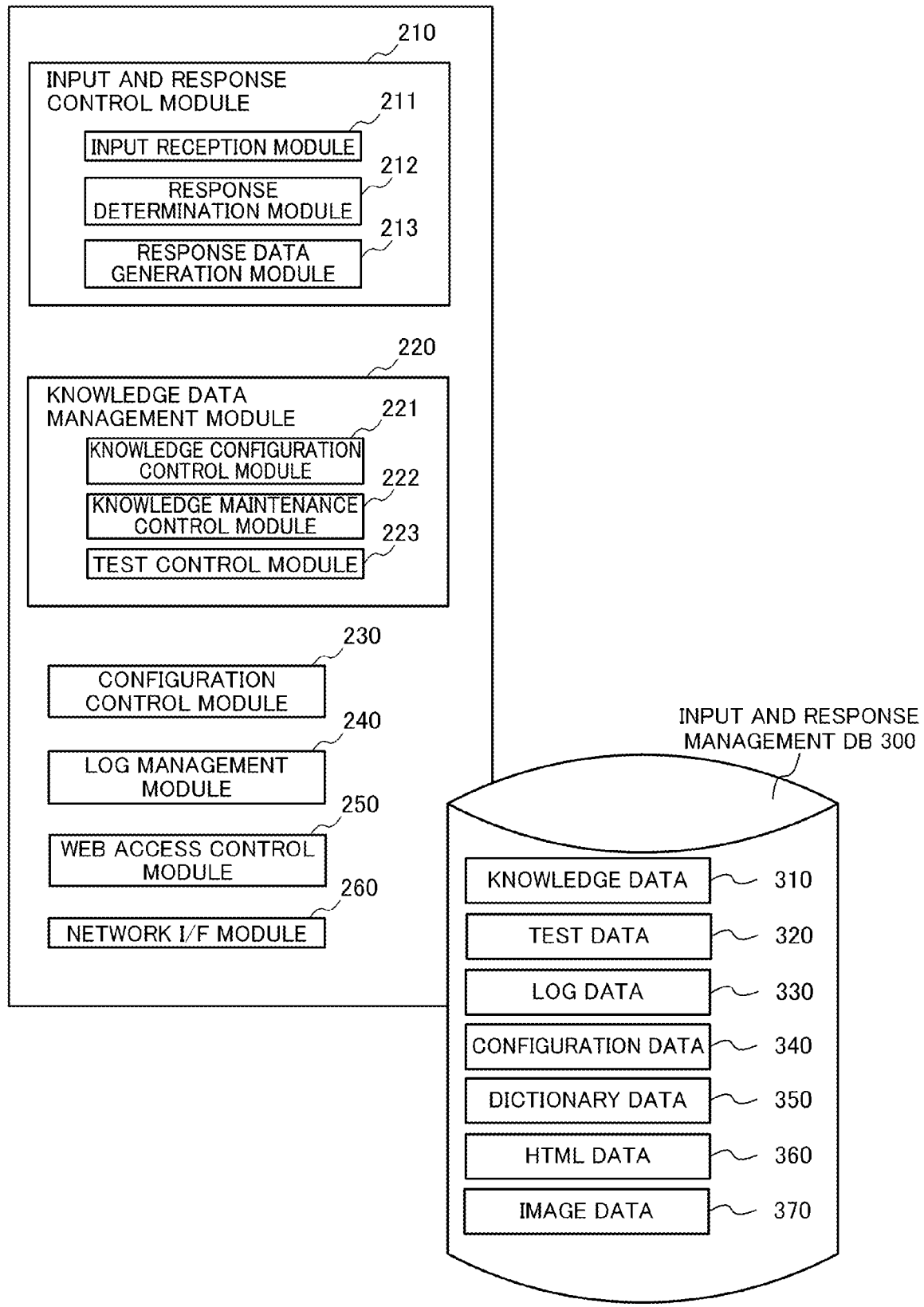
FIG. 5 is a functional block diagram of an information providing server.
Figure 6:
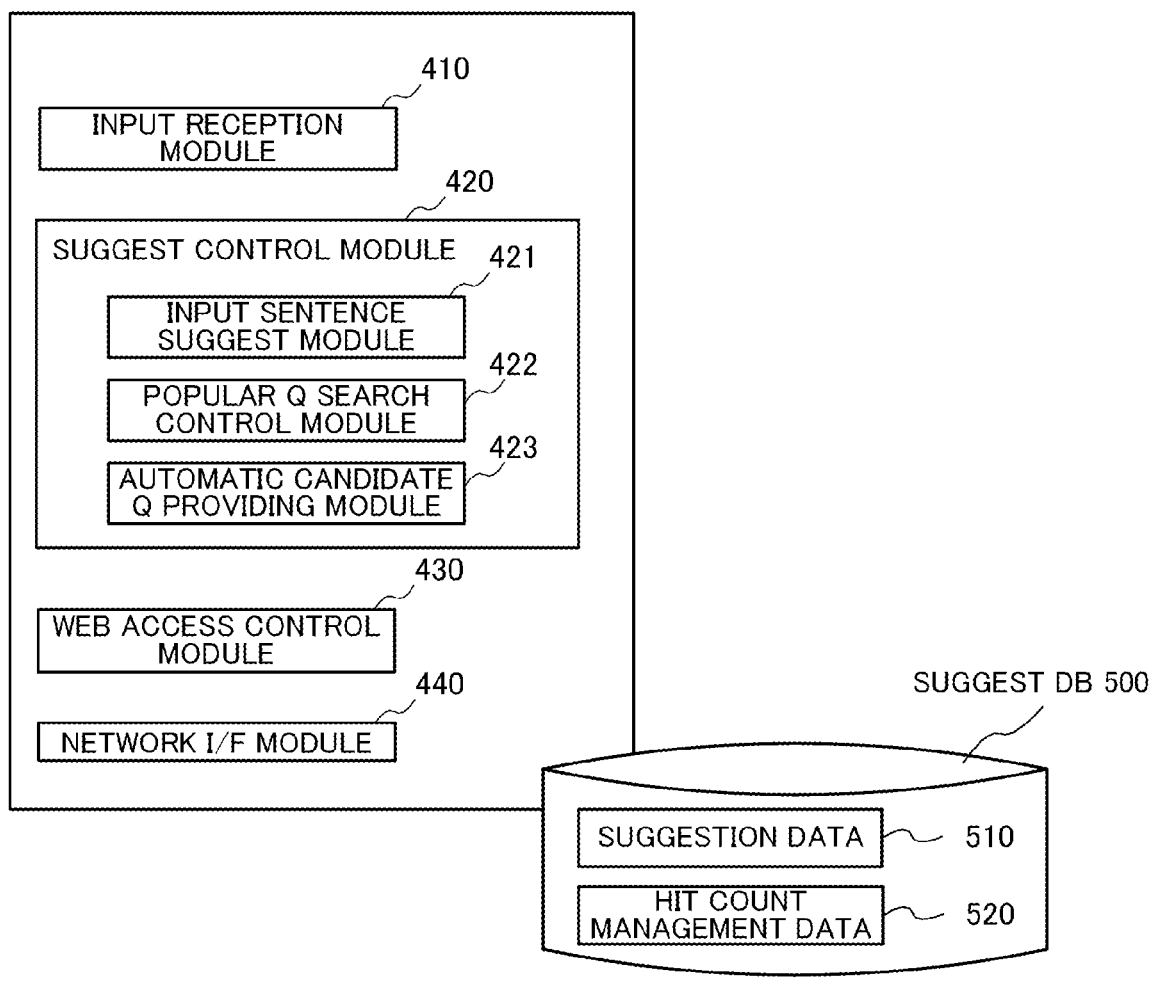
FIG. 6 is a functional block diagram of a suggest server.

Next, with reference to FIGS. 4 to 6, configurations of a user terminal 100 and apparatuses included in the information providing system 1 are described. FIG. 4 is a functional block diagram of a user terminal 100.

The user terminal 100 in FIG. 4 includes an input control module 101, a web browser 102, and a network I/F (interface) module 103.

The input control module 101 receives input information in the form of a signal generated in accordance with the user's operation of an input device connected with the user terminal 100. The input device includes a mouse, a keyboard, and a touch panel. The web browser 102 displays a specified web page and sends the input information received by the input control module 101 to the entry area of the web page. Furthermore, in response to the user's operation (press of the Send button), the web browser 102 sends an HTTP request to the web server through the network I/F module 103.

Still further, upon receipt of HTML data including response data from the information providing server 200 of the information providing system 1 through the network I/F module 103, the web browser 102 displays a web page based on the data (updates the display of the web browser).

The network I/F module 103 connects to the network 700 and controls data transmission with apparatuses such as the information providing server 200 of the information providing system 1.

FIG. 5 is a functional block diagram of the information providing server 200 of the information providing system 1.

The information providing server 200 in FIG. 5 includes an input and response control module 210, a knowledge data management module 220, a configuration control module 230, a log management module 240, a web access control module 250, and a network I/F (interface) module 260.

The input and response control module 210 includes an input reception module 211, a response determination module 212, and a response data generation module 213. The knowledge data management module 220 includes a knowledge configuration control module 221, a knowledge maintenance control module 222, and a test control module 223.

The information providing server 200 further has an input and response management DB 300. The input and response management DB 300 includes knowledge data 310, test data 320, log data 330, configuration data 340, dictionary data 350, HTML data 360, and image data 370.

The input reception module 211 of the input and response control module 210 receives a text entered by a user 10 to a user terminal 100 through the network 700 and the network I/F module 260 using a protocol such as HTTP.

The response determination module 212 of the input and response control module 210 determines a response appropriate for the text received at the input reception module 211 with reference to data such as the knowledge data 310 and the dictionary data 350 in the input and response management DB 300.

The response data generation module 213 of the input and response control module 210 generates response data to display the response determined by the response determination module 212 on the web page displayed on the web browser of the user terminal 100 and sends the response data to the user terminal 100 with the web access control module 250 and the network I/F module 260 via the network 700.

The knowledge configuration control module 221 of the knowledge data management module 220 configures knowledge data in accordance with the operation of the system administrator. The knowledge data is basically data specified with a combination of a text (input sentence) to be entered by the user with high probability and a text of the response thereto. The configured knowledge data is stored in the knowledge data 310 of the input and response management DB 300.

The knowledge maintenance control module 222 of the knowledge data management module 220 carries out maintenance of the knowledge data in accordance with the operation of the system administrator. The maintenance corrects or adds knowledge data effectively and easily using the log data 330 of the input and response management DB 300.

The test control module 223 of the knowledge data management module 220 tests the knowledge data updated through maintenance by the system administrator. The test simulates the operations of a user terminal 100 to determine whether the information providing server 200 can output an appropriate response for an input. The knowledge data for this test is stored in the test data 320 of the input and response management DB 300 and the test is conducted under the condition. If no problem is found in the knowledge data, the knowledge data is compiled to rebuild the knowledge data 310, and the knowledge data 310 is released to practical use.

The configuration control module 230 configures the input and response screen 110 illustrated in FIGS. 2A to 2C and responses in specific events in accordance with the operation of the system administrator.

The log management module 240 records how the information providing server 200 responds to inputs from users 10 to user terminals 100 as a log and analyzes the log to display a predetermined form of report on the system management terminal 600 in accordance with the operation of the system administrator. The log is stored in the log data 330 of the input and response management DB 300.

The web access control module 250 receives and analyzes an HTTP request sent from the web browser of a user terminal 100 in accordance with the operation of a user 10, prepares data responding to this request, and sends the data in the form of an HTTP response to the web browser of the user terminal 100. The data to be sent in the HTTP response includes response data generated by the response data generation module 213 of the input and response control module 210 and further, data selected from the HTML data 360 and the image data 370 of the input and response management DB 300. The HTML data 360 is HTML data to display a web page and the image data 370 is image data and/or video data to be displayed on the web page.

The network I/F (interface) module 260 connects to the network 700 and controls data transmission to and from apparatuses such as a user terminal 100.

FIG. 6 is a functional block diagram of the suggest server 400 in the information providing system 1.

The suggest server 400 illustrated in FIG. 6 includes an input reception module 410, a suggest control module 420, a web access control module 430, and a network I/F (interface) module 440.

The suggest control module 420 includes an input sentence suggest module 421, a popular Q search control module 422, and an automatic candidate Q providing module 423.

The suggest server 400 has a suggest DB 500. The suggest DB 500 includes suggestion data 510 and hit count management data 520.

The input reception module 410 receives a text entered by a user 10 to a user terminal 100 through the network 700 and the network I/F module 440 using a protocol such as HTTP.

The input sentence suggest module 421 of the suggest control module 420 acquires characters entered by the user 10 to the user terminal 100 with the input reception module 410 each time the user enters a character. Subsequently, the input sentence suggest module 421 acquires a list of input sentences including the character from the suggestion data 510 of the suggest DB 500 and sends the list to the user terminal 100 via the network 700 using the web access control module 430 and the network I/F 440. The suggestion data 510 includes input sentences specified as suggestions among the input sentences included in the knowledge data 310 in the input and response management DB 300.

As a result, every time the user enters a character to the entry area of the user terminal 100, the user terminal 100 displays a list of input sentences including the character under the entry area. The input sentences in the list are input sentences of various users 10 in the past and input sentences specified by the system administrator 20.

The popular Q search control module 422 of the suggest control module 420 acquires a list of input sentences frequently hit in the past with reference to the suggestion data 510 and the hit count management data 520 of the suggest DB 500. The hit count management data 520 stores hit counts of individual input sentences included in the suggestion data 510 (how many times the individual input sentences are selected as a response to an input of a user 10).

For example, the popular Q search control module 422 is invoked by the response determination module 212 of the information providing server 200 in determining a response and a list of input sentences acquired by the popular Q search control module 422 is included in the response data.

The automatic candidate Q providing module 423 of the suggest control module 420 acquires a list of input sentences semantically close to the input sentence entered by the user 10 with reference to the suggestion data 510 of the suggest DB 500.

For example, the automatic candidate Q providing module 423 is invoked by the response determination module 212 of the information providing server 200 in determining a response and a list of input sentences acquired by the automatic candidate Q providing module 423 is included in the response data.

The web access control module 430 receives and analyzes an HTTP request sent from the web browser of a user terminal 100 in accordance with the operation of a user 10, prepares data responding to this request, and sends the data in the form of an HTTP response to the web browser of the user terminal 100. The data to be sent in the HTTP response includes a list of input sentences acquired by the input sentence suggest module 421.

The network I/F (interface) 440 connects to the network 700 and controls data transmission to and from apparatuses such as the user terminal 100.

Figure 7:
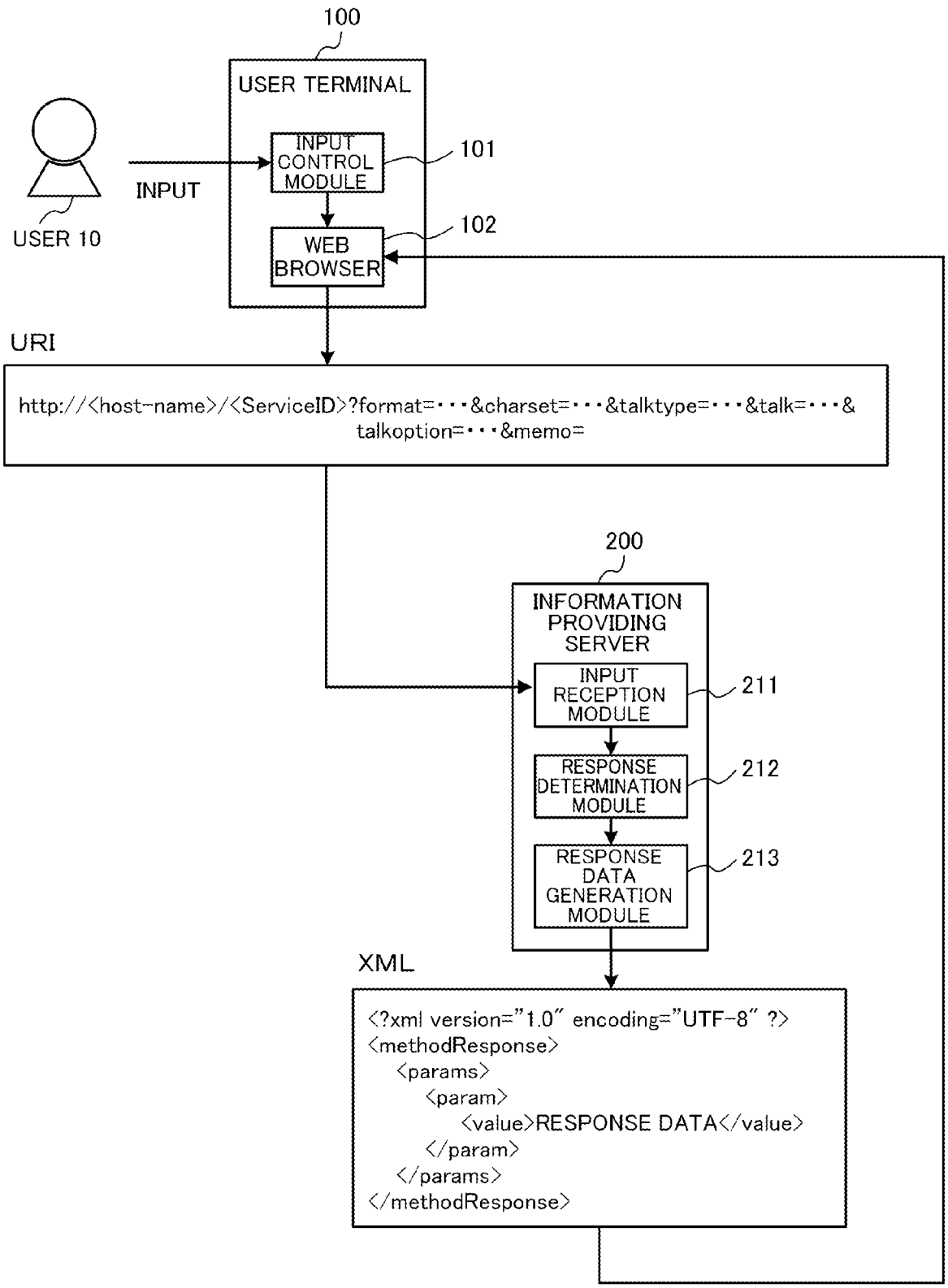
FIG. 7 is a diagram for illustrating an API between a user terminal and an information providing server.

FIG. 7 is a diagram for illustrating an API between a user terminal 100 and the information providing server 200.

In the user terminal 100, an input from a user 10 is provided to the web browser 102 via the input control module 101. The web browser 102 creates a URI (Uniform Resource Identifier) including the input of the user 10 and sends out the URI using HTTP.

An URI is described as shown in FIG. 7, starting from "http://" and being followed by <host-name>, which is a host name or an IP address of the information providing server 200 including a dialogue engine as illustrated in FIG. 3. The subsequent <ServiceID> is an ID for identifying the service provided by the information providing system 1; for example, the <ServiceID> is an ID for identifying the product or the service to be the subject of the input and response (that is to say, an ID for selecting knowledge data to be used) as illustrated in FIG. 3.

To use the suggest function provided by the suggest server 400, the URI should include a <host-name> corresponding to the suggest server 400 and a <ServiceID> corresponding to the suggest function (one of the function provided by the input sentence suggest module 421, the function provided by the popular Q search control module 422, and the function provided by the automatic candidate Q providing module 423).

Subsequent to the <ServiceID>, request parameters connected by "?" are described. Individual request parameters are separated by "&". In the example of FIG. 7, "format=" is followed by designation of the format of the return value. In the case of designation of "json", a response in JSON format can be received; in the case of designation of "xml", a response in XML format can be received.

Subsequent to "charset=", an encoding format of the return value, such as UTF-8, EUC-JP, or Shift-JIS, is specified. Subsequent to "talk_type=", the type of the input sentence to be sent to the information providing system 1 is specified. For example, a normal input is specified as 0 and the start of communication is specified as 3. Subsequent to "talk=", the input sentence itself entered by the user 10 to the entry area 113 is described.

Subsequent to "talk_option=", predetermined information to be used in matching the response conditions is specified.

For example, the information could be "device=D0001" or "device=E0001" in accordance with the model of the accessing user terminal 100. Any keyword can be used in any usage as far as the keyword is common in matching the response conditions. To append some memo to the input sentence, a text can be specified subsequent to "memo=". The employment of such a text enables necessary information to be stored in the log data, for example.

A session is usually held using cookie information in the user terminal 100. However, in the case of a device configured not to use cookie or a mobile phone that does not manage sessions with cookie, the URI can be structured to include session information.

The data included in the URI is sent in the form of an HTTP request to the information providing server 200 in accordance with the <host-name> specified in the URI and the input reception module 211 of the information providing server 200 receives the data. Subsequently, the response determination module 212 determines a response based on the data. The determined response is generated as XML data (if "format=xml" is described in specifying the return value) at the response data generation module 213.

In the XML data shown in FIG. 7, the response data is defined with a tag <value>.

This XML data is sent by the web access control module 250 of the information providing server 200 to the web browser 102 of the user terminal 100 in the form of an HTTP response and the web browser 102 displays the response data. For example, as shown in FIGS. 2A to 2C, the response data defined with the tag <value> is embedded into the response display area 112 of the input and response screen 110 to be displayed.

To display information in the information display area 116 of the input and response screen 110 shown in FIGS. 2A to 2C, the information to be displayed in the information display area 116 is defined with a specific tag and sent to the web browser 102. The web browser 102 interprets the tag and controls the user terminal 100 to display the information in the information display area 116. In similar, to change the character in the character display area, the image data to be used as the character should be defined with a specific tag.

FIG. 7 illustrates a configuration that the user terminal 100 includes the host name of the information providing server 200, a service provided by the information providing system 1, and request parameters in a URI to send a request to the information providing server 200; however, this configuration is merely an example. The same processing can be performed using various ways, such as by using Java Script™.

Figure 8:
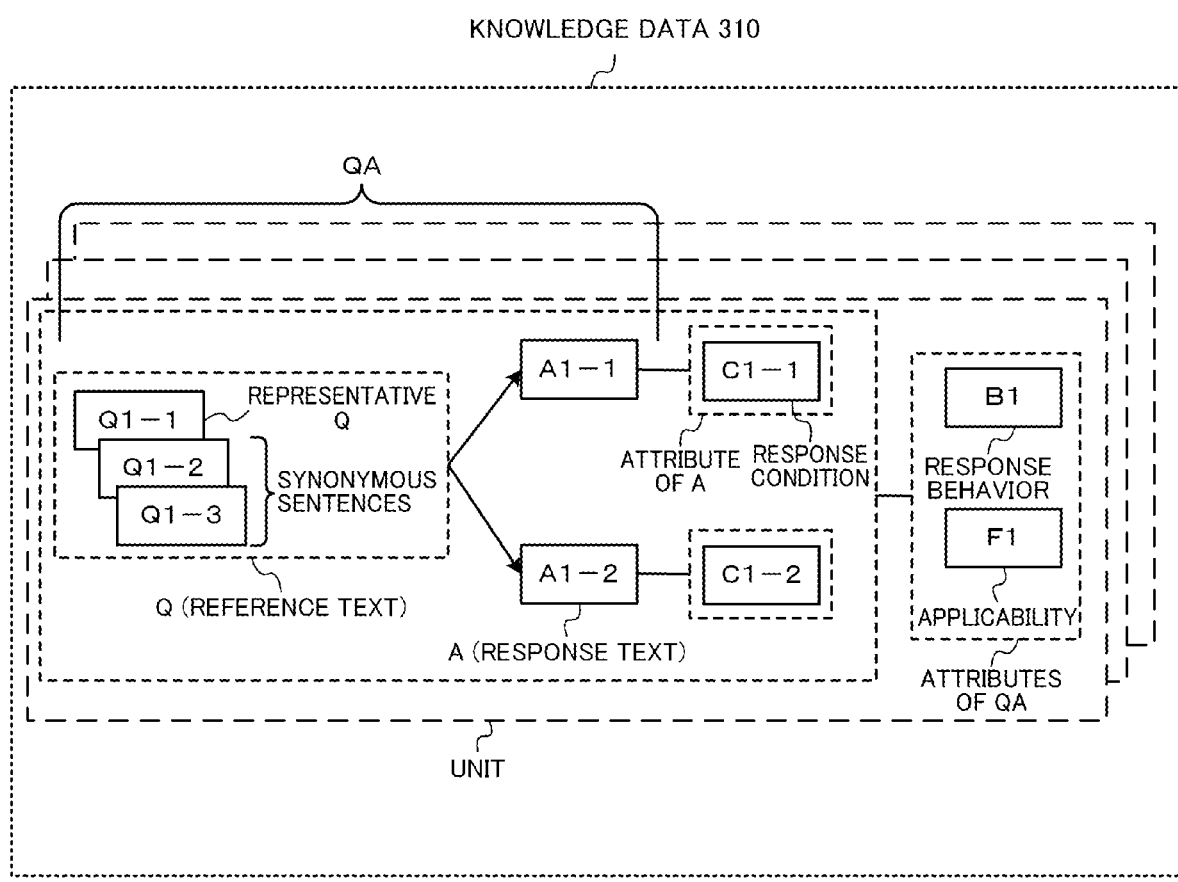
FIG. 8 is a diagram for illustrating an example of knowledge data to be used in the information providing system.

FIG. 8 is a diagram for illustrating an example of the knowledge data 310 of the input and response management DB 300 to be used in the information providing system 1 according to the present embodiment.

To make an effective response to a text input by a user 10 with a user terminal 100, the information providing server 200 of the information providing system 1 uses data stored in the knowledge data 310. The knowledge data 310 includes a plurality of units (FIG. 8 shows only Unit 1 in detail). Each unit includes at least one reference text and at least one response text; the reference text and the response text are associated with each other and constitute a set.

The reference text is a text to be compared with an input sentence of the user 10 received from the user terminal 100; FIG. 8 shows three reference texts Qs (Q1-1, Q1-2, and Q1-3). Although the Q seems to represent the initial letter of question, the denotation is merely for convenience; the reference text does not need to be in the form of a question (interrogative sentence). For example, the reference text can be a text in various forms such as a word, an affirmative sentence, a negative sentence, a greeting, and the like.

If the unit includes a plurality of reference texts, one reference text is a representative reference text (representative Q) and the other reference texts are synonymous sentences. In FIG. 8, the Q1-1 is a representative Q and the Q1-2 and the Q1-3 are the synonymous sentences of Q1-1. That is to say, a unit includes a collection of reference texts having the same meaning (very close meanings that can be referred to as being synonymous).

A response text is a text associated with the reference texts (as a response to the reference texts); FIG. 8 shows two response texts As (A1-1 and A1-2). Although the A seems to represent the initial letter of answer, the denotation is merely for convenience; the response text does not need to be a sentence in the form of an answer to some question. For example, the response text can be a text in various forms such as a word, an interrogative sentence, an affirmative sentence, a negative sentence, a greeting, and the like.

One unit includes one or more reference texts and one or more response texts and the reference texts and the response texts are associated with one another; the correspondence relation between the reference text and the response text can be one to one, one to n, n to one, or n to n.

Furthermore, one unit includes an attribute associated with each response text (attribute of A). The attribute of A represents the attribute of the response text; in FIG. 8, the attribute of A is a response condition. The response condition indicates in what condition the associated response text is appropriate for the response. If the unit does not have a plurality of response texts, the response condition is not necessary because the response can be uniquely determined.

Defining the set of reference texts and response texts associated therewith plus the attributes of the response texts as QA, each QA has an attribute (attribute of QA). The attribute of QA is represented by information including response behavior setting information (B1) or information including applicability setting information (F1). The response behavior setting information is to specify some behavior (action) to be taken by the user terminal 100 of the user 10 if the input sentence of the user 10 is determined to be semantically closest to (hit on) the reference text of the unit. The applicability setting information is to specify whether the reference text Q is to be a suggestion, whether to record a log about this QA, or the like. It should be noted that this attribute of QA can be regarded as attribute associated with the reference text (the group of the reference texts including the representative Q and the synonymous sentences if the unit includes a plurality of reference sentences).

Although FIG. 8 shows that the knowledge data 310 is managed as unified data, at least part of the data can be managed as different data while maintaining the association relations. For example, a collection of QAs can be stored as first data and a collection of the attributes of the QAs can be stored as second data together with the identifiers of the QAs.

FIGS. 9A to 9D are diagrams for schematically illustrating ways of determining a response to an input sentence using the knowledge data 310. It should be noted that the attributes of QA (response behavior setting information and applicability setting information) in each unit of the knowledge data 310 described with FIG. 8 are omitted from FIGS. 9A to 9D.

Figure 9A:
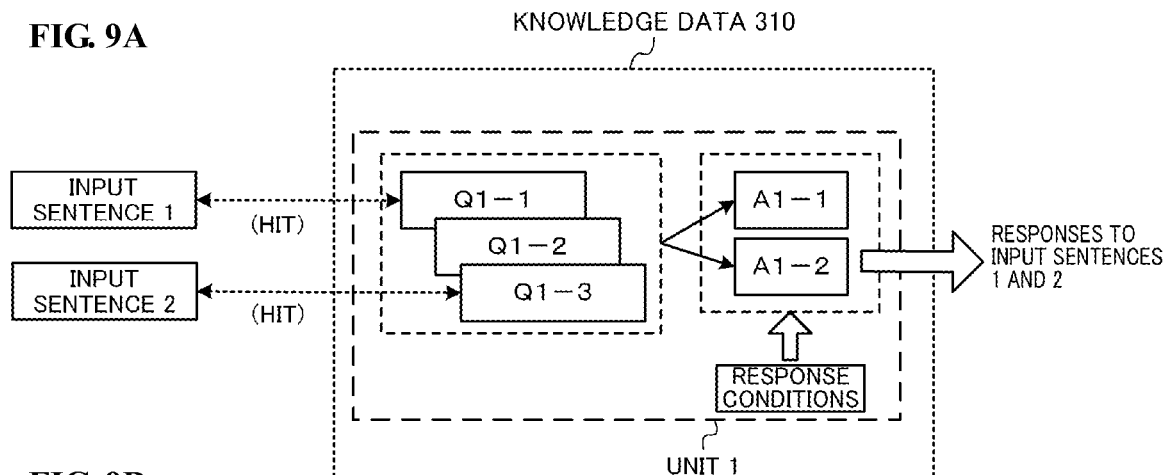
FIGS. 9A to 9D are diagrams for schematically illustrating ways of determining a response to an input sentence.

First, the case in FIG. 9A is described. Assume that a unit 1 (identical to Unit 1 shown in FIG. 8) is provided for the knowledge data 310, that input sentences 1 and 2 are entered by users 10, and that a Q1-1 is hit as the semantically closest text to the input sentence 1 and a Q1-3 is hit as the semantically closest text to the input sentence 2 (assuming that no other unit exists). In the case of FIG. 9A, an A1-2 is displayed for the response to the input sentence 1 and further, the A1-2 is displayed for the response to the input sentence 2 as well. This is because, regarding the response condition or the attribute of A, the response condition for the A1-2 is satisfied by both of the input sentence 1 and the input sentence 2.

Figure 9B:
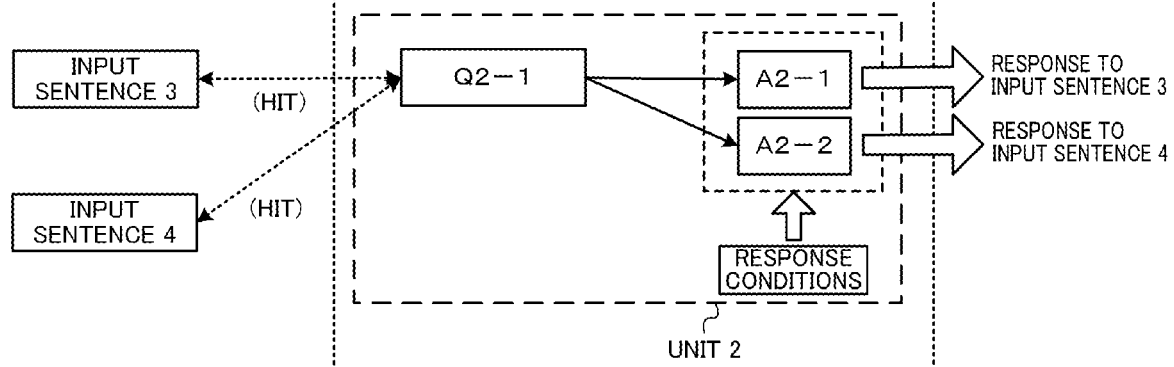

Next, the case in FIG. 9B is described. Assume that a unit 2 (in which one reference text (Q2-1) is associated with two response texts (A2-1 and A2-2)) is provided for the knowledge data 310, that input sentences 3 and 4 are entered by users 10, that the Q2-1 is hit as the semantically closest text to the input sentence 3 and also to the input sentence 4 (assuming that no other unit exists). In the case of FIG. 9B, the A2-1 is displayed for the response to the input sentence 3 and the A2-2 is displayed for the response to the input sentence 4. This is because, regarding the response condition or the attribute of A, the response condition for the A2-1 is satisfied by the input sentence 3 and the response condition for the A2-2 is satisfied by the input sentence 4.

Like this case, even if a plurality of input sentences hit on the same reference text, different responses could be displayed depending on the response condition.

Figure 9C:
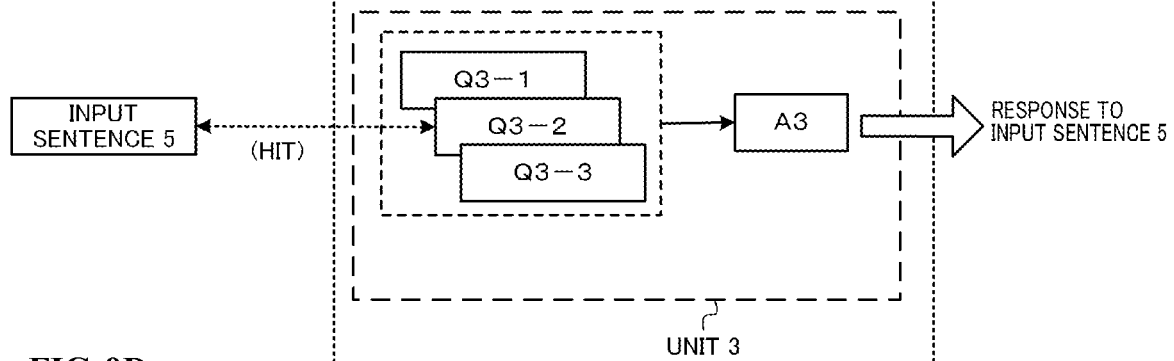

Next, the case in FIG. 9C is described. Assume that a unit 3 (in which three reference texts (Q3-1, Q3-2, and Q3-3) are associated with one response text (A3)) is provided for the knowledge data 310, that an input sentence 5 is entered by a user 10, that the Q3-2 is hit as the semantically closest text to the input sentence 5 (assuming that no other unit exists). In the case of FIG. 9C, the A3 is displayed for the response to the input sentence 5.

Figure 9D:
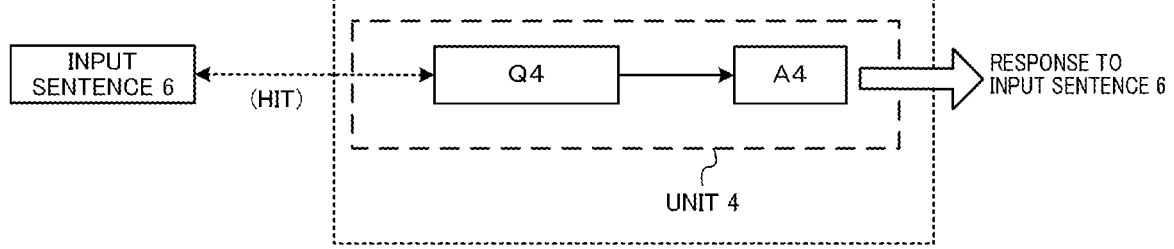

FIG. 9D shows the simplest case. Assume that a unit 4 (in which one reference text (Q4) is associated with one response text (A4)) is provided for the knowledge data 310, that an input sentence 6 is entered by a user 10, that the Q4 is hit as the semantically closest text to the input sentence 6 (assuming that no other unit exists). In the case of FIG. 9D, the A4 is displayed for the response to the input sentence 6.

Figure 10:
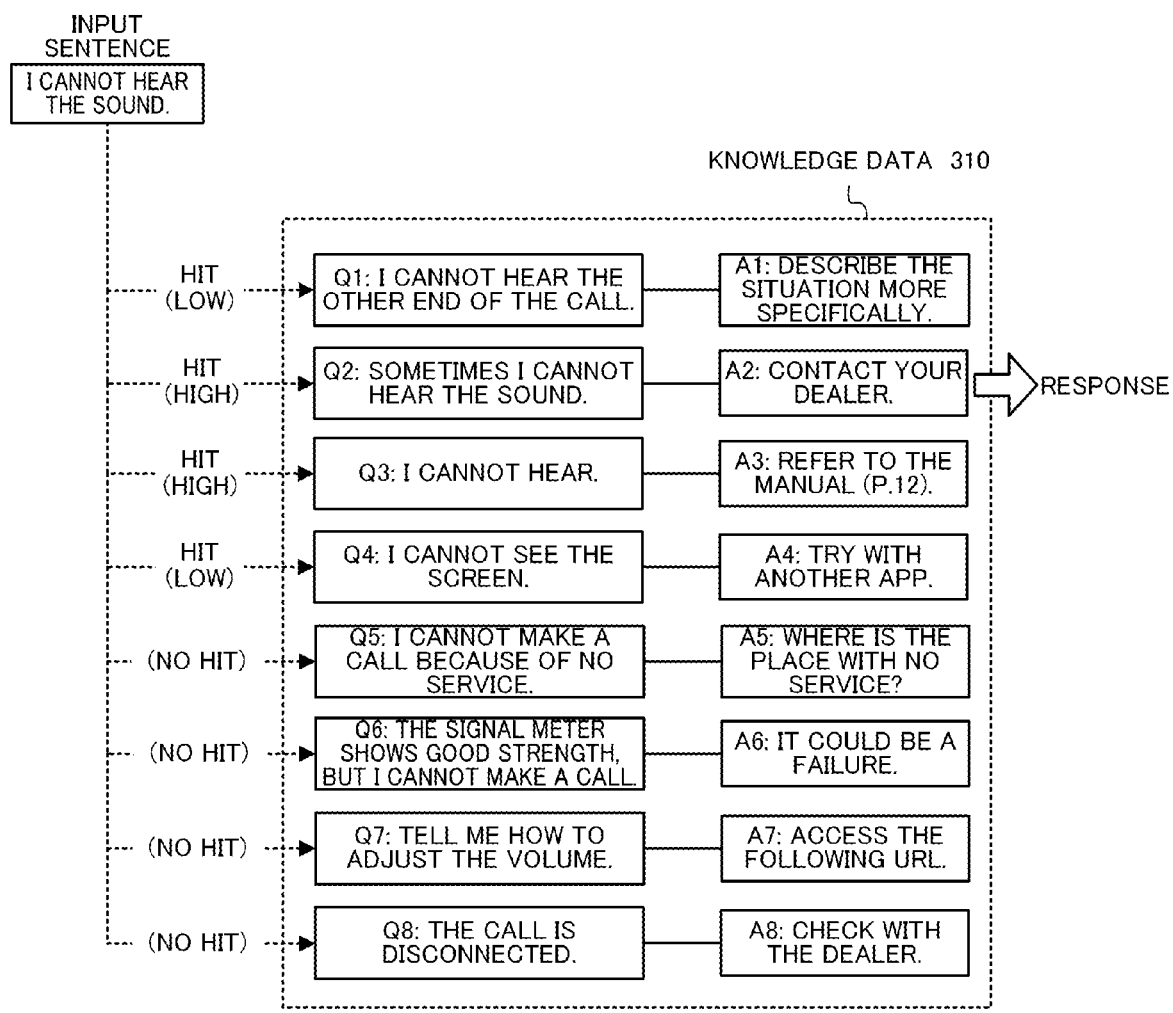
FIG. 10 is a diagram for schematically illustrating how to determine a response using knowledge data including a plurality of units.

FIG. 10 is a diagram for schematically illustrating how to determine a response, assuming the knowledge data 310 includes eight units.

In this example, one response text is associated with a reference text in each of the eight units. Although the reference texts in the drawing include characters of Q1 to Q8, these characters are reference signs. In similar, the response texts include reference signs of A1 to A8 for convenience of explanation.

In the example of FIG. 10, the input sentence from a user 10 is "I cannot hear the sound". When the information providing server 200 of the information providing system 1 receives this sentence at the input reception module 211, the information providing server 200 compares the received input sentence with each of the eight reference texts (Q1 to Q8) stored in the knowledge data 310 and determines the semantic closeness between them.

The semantic closeness means the degree of similarity between texts or sentences; the semantic distance between two sentences is represented by score using various known methods including morphological analysis and vector space method. The information providing system 1 in the present embodiment can employ various methods to determine the semantic closeness.

As a result of the determination of the semantic closeness, the eight reference texts (Q1 to Q8) are assigned scores. The scores are determined so that a text semantically closer to the input sentence will be assigned a higher score, for example. In accordance with the scores, the reference texts are classified into a plurality of hit levels of groups. For example, if the score is in a predetermined first range, the text is identified as "hit (high)"; if the score is in a second range lower than the first range, the text is identified as "hit (low)"; and if the score is in a range lower than the second range, the text is identified as "no hit". If the text hits on a partial hit Q, the text is classified as "partial hit" and if the text includes a banned word, the text is classified as a group of "banned".

In FIG. 10, the Q1 and the Q4 are classified as "hit (low)", the Q2 and the Q3 are classified as "hit (high)" represented by higher scores than the Q1 and the Q4, and the Q5 to the Q8 are classified as "no hit" represented by lower scores than the Q1 and the Q4 through the determination of semantic closeness.

Eventually, the Q2, which is assigned the highest score among these texts (that is to say, semantically closest to the input sentence), is determined to be a "hit", so that the A2 associated with this Q2 is selected as the response. That is to say, the input sentence "I cannot hear the sound." is determined to be semantically closest to "Q2: Sometimes I cannot hear the sound." and the response text associated with the Q2, "A2: Contact your dealer." is selected as the response.

If all the reference texts Q1 to Q8 are determined to be "no hit", the response determination module 212 selects a predetermined response in the event of no hit.

In this example, one input sentence is compared with only eight reference texts; however, in the actual information providing system 1, the input sentence can be compared with reference texts in the order of thousands or tens of thousands included in the knowledge data 310.

Figure 11:
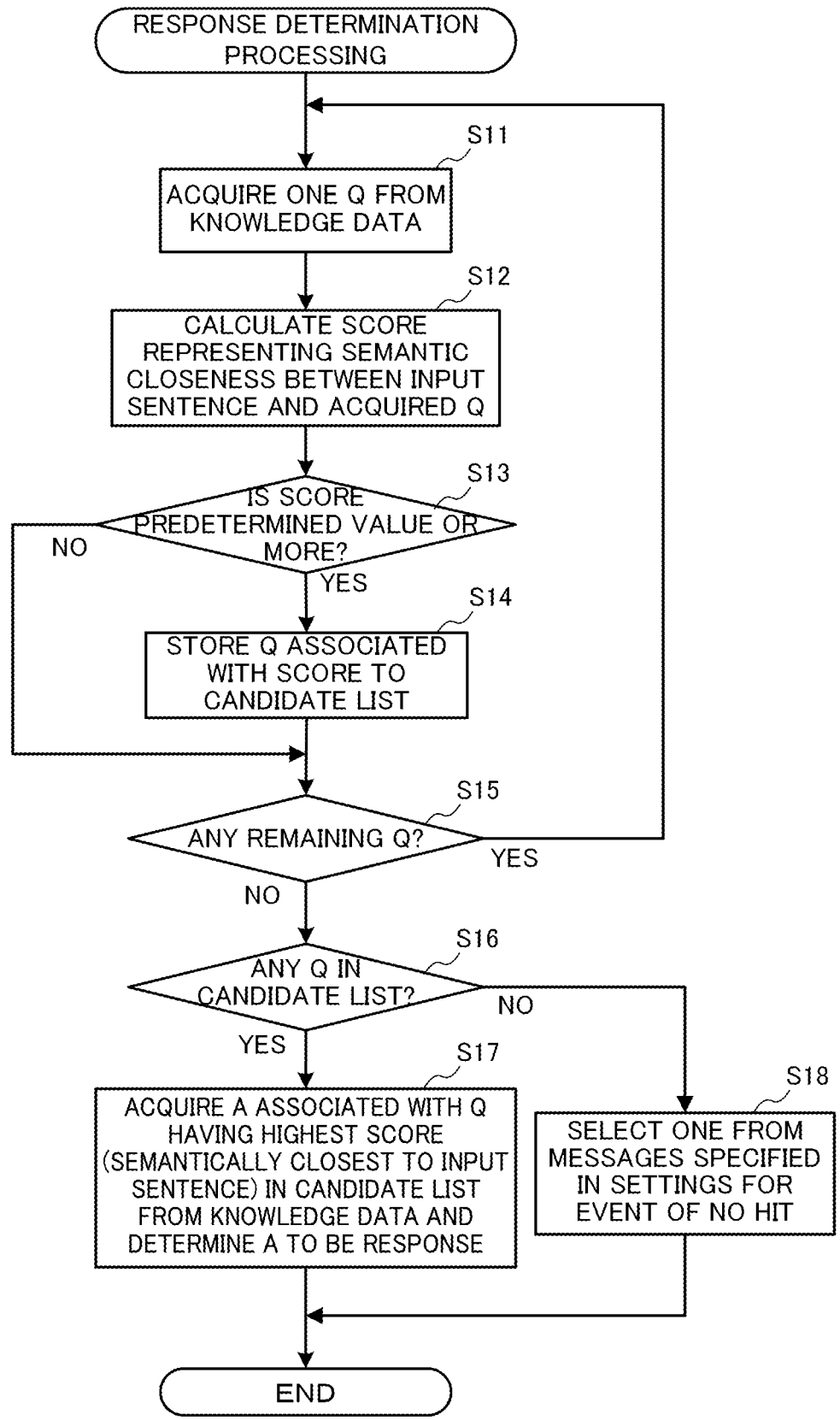
FIG. 11 is a flowchart of response determination processing performed by a response determination module.

FIG. 11 is a flowchart of response determination processing performed by the response determination module 212.

Upon receipt of an input sentence entered by a user 10 from the input reception module 211, the response determination module 212 first acquires a reference text (Q) from the knowledge data 310 at step S11. This example is configured to compare the received input sentence with all the reference texts stored in the knowledge data 310; however, the reference texts can be narrowed down beforehand through preliminary processing or referring to the classifications, indices, or other type of reference marks associated with the reference texts.

Next, the response determination module 212 calculates a score representing the semantic closeness between the input sentence and the acquired reference text (Q) at step S12. Subsequently, the response determination module 212 determines whether the calculated score is a predetermined value or more at step S13.

If the score is the predetermined value or more (YES at step S13), the response determination module 212 associates the reference text (Q) with the score and stores the reference text (Q) to a candidate list (step S14). If the score is less than the predetermined value (NO at step S13), the response determination module 212 performs nothing and proceeds to step S15.

At step S15, the response determination module 212 determines whether any remaining reference text (Q) exists in the knowledge data 310. If some remaining reference text (Q) exists (YES at step S15), the response determination module 212 returns to step S11 and repeats steps S11 to S14.

If no remaining reference text (Q) exists (NO at step S15), the response determination module 212 proceeds to step S16.

At step S16, the response determination module 212 determines whether the candidate list includes any reference text (Q). If the candidate list include some reference text (Q) (YES at step S16), the response determination module 212 determines the reference text (Q) having the highest score (or determined to be semantically closest to the input sentence) in the candidate list, acquires the response text (A) associated with the reference text (Q), and determines the response text (A) to be the response (step S17).

Although this flowchart provides a simple example, if a plurality of response texts (A) exist and are assigned response conditions as attributes of As, an A satisfying the response condition is determined to be the response. If response behavior setting information or applicability setting information is assigned as attribute of QA, such information can be included in the response (as necessary).

If the candidate list includes no reference text (Q) (NO at step S16), the response determination module 212 selects one from the messages specified in the settings for the event of no hit and determines the message to be the response (step S18).

Figure 12:
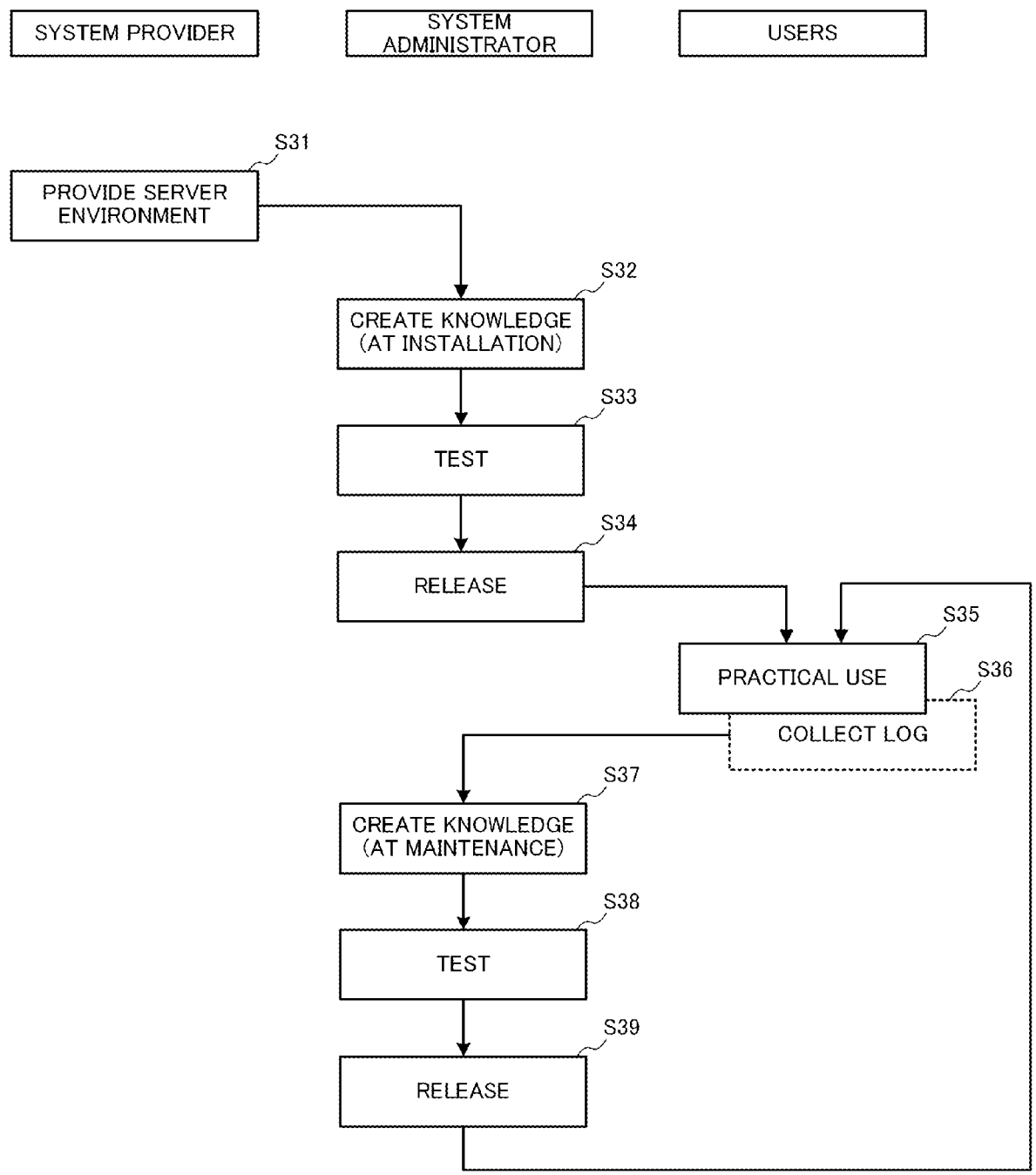
FIG. 12 is a diagram for conceptually illustrating a cycle of test, maintenance, and operation of the information providing system.

FIG. 12 is a diagram for conceptually illustrating a cycle of test, maintenance, and operation of the information providing system 1.

In FIG. 12, the person (system provider) who develops and provides the information providing system 1 configures and provides a server environment for the servers including information providing server 200 and a suggest server 400 (step S31).

Next, the company or organization (system administrator 20) that wants to provide users 10 with some knowledge using the information providing system 1 creates knowledge and builds up a plurality of units in the knowledge data 310 (step S32). The system administrator 20 conducts a test using the created knowledge data 310 (step S33). This test is a simulation performed by the system administrator as if an input and a response are exchanged between a user 10 using a user terminal 100 and the information providing system 1.

If the test reveals that a specific input is responded by an expected response, the system administrator 20 releases the knowledge data 310 for practical use by the users 10 (step S34).

Upon release of the knowledge data 310, practical operation is started. Users 10 exchange inputs and responses with the information providing system 1 (Users 10 have dialogues with the information providing system 1 which responds to inputs of the users 10) (step S35). During the operation, the inputs and the responses are stored in a log (step S36).

After a predetermined time has passed since the start of the operation, the system administrator 20 recreates the knowledge (step S37). This creation of the knowledge is different from the creation of the knowledge at the installation and can be referred to as maintenance for the purpose of improving the responses to inputs in view of the result of actual operation. Accordingly, the creation of the knowledge at this step uses the information in the log collected at step S36.

After creating knowledge and correcting the units in the knowledge data 310 or adding a new unit to the knowledge data 310, the system administrator 20 conducts a test using the corrected knowledge data 310 (step S38). Like the test at step S33, this test is also a simulation performed by the system administrator 20 as if an input and a response are exchanged between a user 10 using a user terminal 100 and the information providing system 1.

If the test reveals that a specific input is responded by an expected response, the system administrator 20 releases the knowledge data 310 for practical use by the users 10 (step S39). The maintenance of steps S37 to S39 is conducted after a predetermined time or with predetermined timing and this cycle is repeated afterwards.

Figure 13:
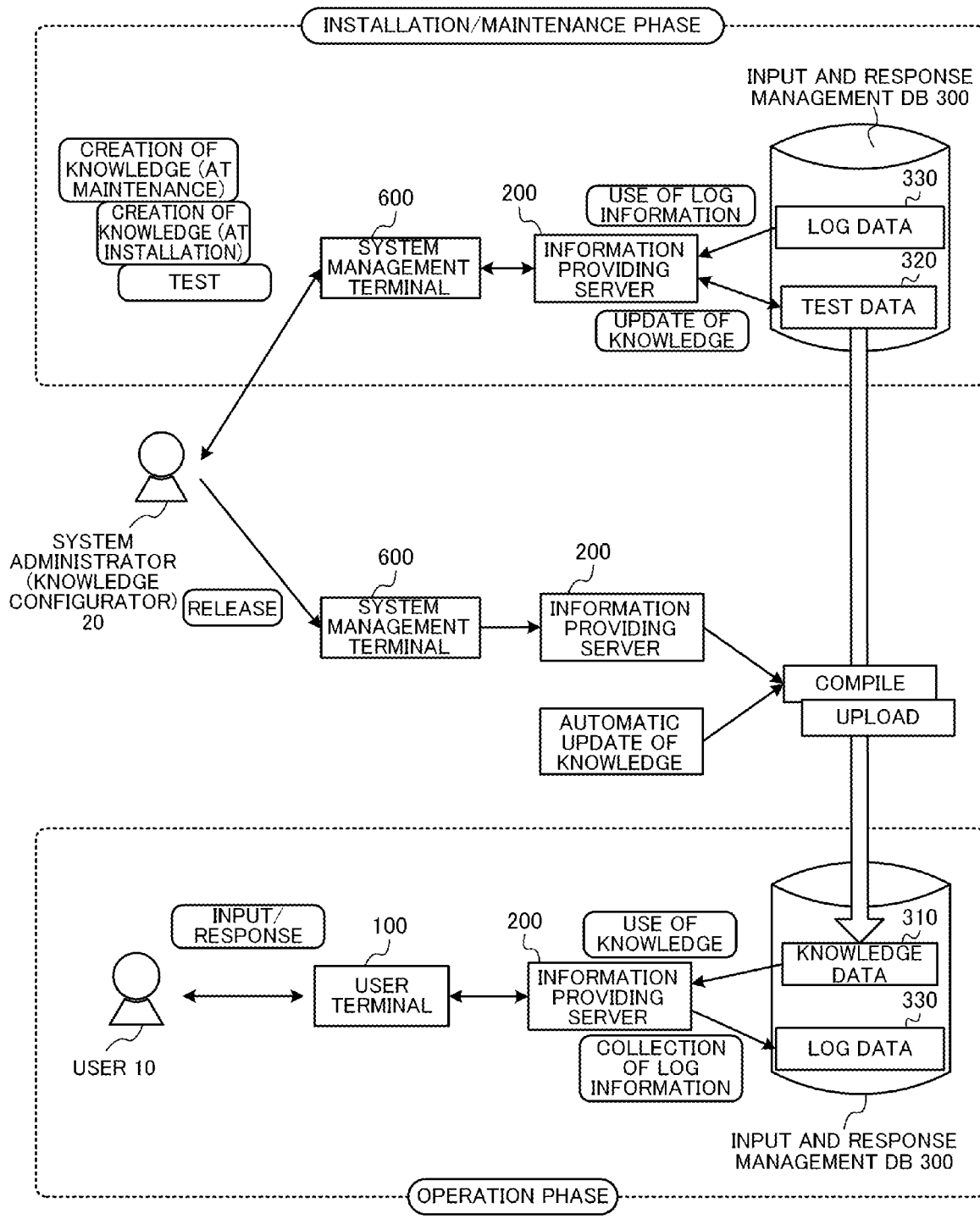
FIG. 13 is a diagram for illustrating handling of knowledge data in an installation/maintenance phase and in an operation phase.

Next, with reference to FIG. 13, handling of the data including the knowledge data 310 in the installation/maintenance phase and in the operation phase is described.

FIG. 13 is a diagram for conceptually illustrating the processing in the installation/maintenance phase and in the operation phase.

The upper section of FIG. 13 shows a configuration related to the information providing system 1 in the installation/maintenance phase. The system administrator 20 accesses the information providing server 200 of the information providing system 1 with the system management terminal 600 and configures and tests the knowledge (at the installation/maintenance). Configuring the knowledge is usually performed by a specific person such as a knowledge configurator.

As described above, in creating knowledge at the maintenance, log data 330 is used. The knowledge is updated by creation of knowledge at the installation and the maintenance and is stored in the test data 320. The test data 320 can be units including a set of reference texts and response texts stored in the form of text.

Upon completion of creation of the knowledge at the installation or the maintenance, the system administrator 20 conducts a test using the test data 320 and if the test is successful, the system administrator 20 releases the knowledge with the system management terminal 600 (see the middle section of FIG. 13). Upon receipt of an instruction for release from the system management terminal 600, the information providing server 200 compiles the test data 320 to create knowledge data 310 and uploads the knowledge data 310 for the users 10 to be able to commonly use the knowledge data 310 (for example, uploads to the Internet environment (environment for practical use)). In updating the knowledge data 310, only the corrected knowledge may be uploaded to be merged with the knowledge data 310 or otherwise, the entire replacement knowledge data 310 may be uploaded.

The knowledge can be automatically released at a predetermined time with a timer. When the predetermined time comes, the information providing server 200 automatically compiles the test data 320 to create a new knowledge data 310 and uploads the knowledge data 310 to the Internet environment.

The lower section of FIG. 13 shows a configuration related to the information providing system 1 in the operation phase where the users 10 actually use the information providing system 1.

A user 10 accesses the information providing server 200 through the user terminal 100 to hold a dialogue through inputs and responses. In holding a dialogue, the information providing server 200 uses the updated knowledge data 310 in making responses. As described above, while inputs and responses are exchanged between the user 10 and the information providing system 1, information on the inputs and the responses are stored in the log data 330.

In the operation phase, a service time can be set to the knowledge data 310; when the time is out of the service time, the user 10 cannot acquire a response based on the knowledge data 310. Optional control is available: for example, a plurality of versions of knowledge data 310 can be switched or integrated depending on the time zone of the access.

Figure 14:
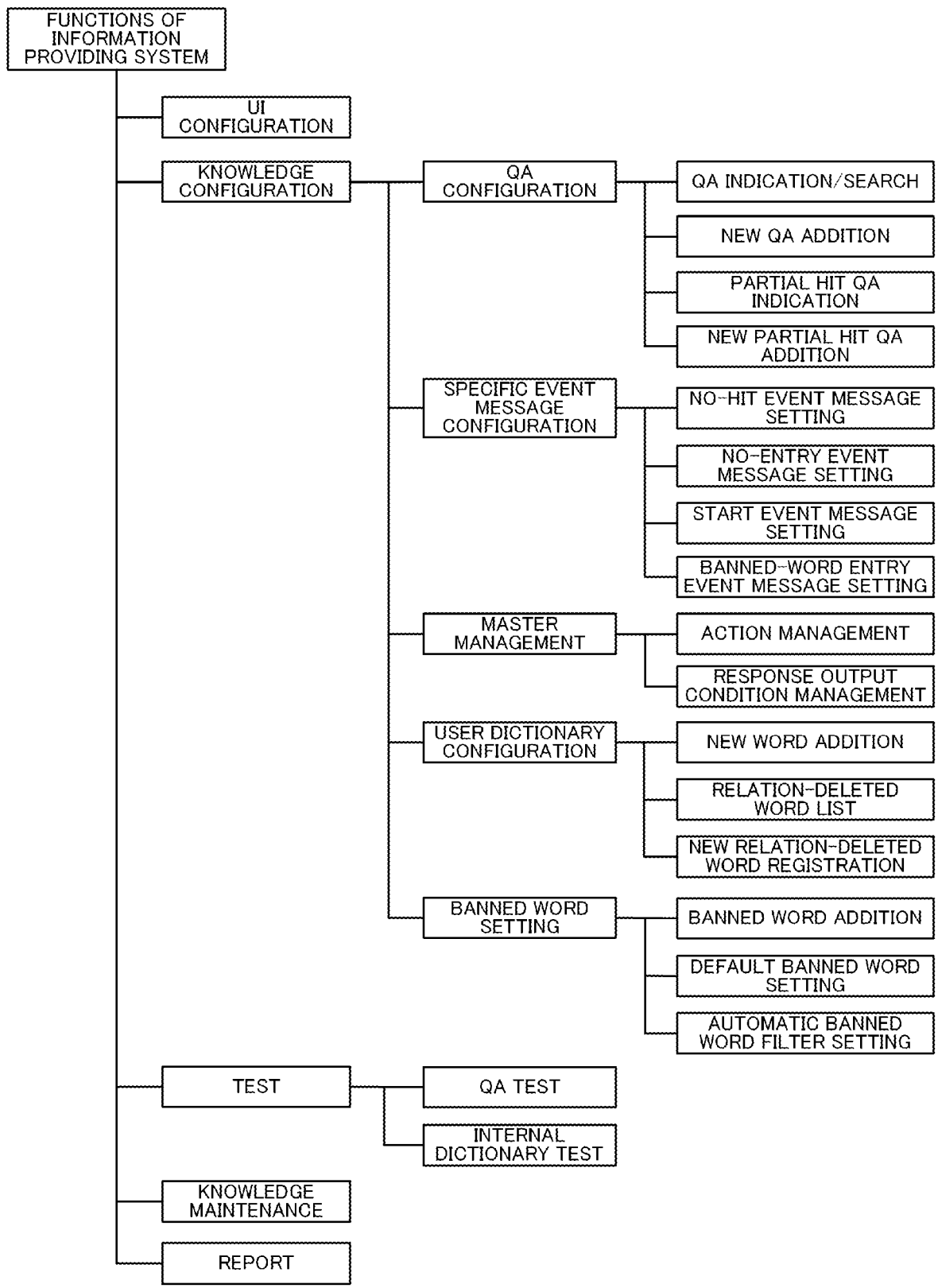
FIG. 14 is a diagram for illustrating functions of the information providing system.

Next, with reference to FIG. 14, more specific functions of the information providing system 1 are described. These functions can be used by the system administrator 20 or an agent with the system management terminal 600. These functions can be configured or tested for each company or organization to be provided with the service or for each robot (QA service) within the company or the organization.

As illustrated in FIG. 14, the information providing system 1 has five major functions: UI configuration, knowledge configuration, test, knowledge maintenance, and report.

The UI configuration is a function to configure a user interface screen (input and response screen 110) as shown in FIGS. 2A to 2C. For the input and response screen 110 to be used on a PC (personal computer), there are two types: a page-resident type which is embedded in the website providing the service and a separate window type which is popped up with an open button. The input and response screen 110 to be used on a smartphone or a tablet computer is automatically adjusted in size to fit in the screen of the device.

The UI settings configurable by the system administrator 20 include, for example, the screen size (only for the PC use), the overall color, the character image to be displayed on the character image display area 111, the colors of the response display area 112 (for the frame, background, and text), the colors of the entry area 113 (for the frame, background, and text), the colors of the Send button (for the frame, background, and text), and the colors of information display area 116 (for the frame, background, and text). In addition, the input and response screen may have a logo display area and a copyright claim area.

The knowledge configuration includes the following functions: QA configuration, specific event message configuration, master management, user dictionary configuration, and banned word setting. The QA configuration is made with the QA configuration screen 800 in FIG. 15 to be described later; more specifically, the QA configuration includes the functions of QA indication/search, new QA addition, partial hit QA indication, and new partial hit QA addition. A partial hit QA is a set of a partial hit Q and an A (response text); a Q defined as a partial hit Q is a Q to be regarded as a hit if an input sentence includes an independent word (a word having a meaning by itself: mainly, a noun, a verb, and an adjective) in the Q.

The specific event message configuration is made with the specific event message configuration screen 860 in FIG. 27 to be described later. More specifically, the specific event message configuration includes the functions of no-hit event message setting, no-entry event message setting, start event message setting, and banned-word entry event message setting.

The master management is a function to create/edit and see data (master data) about response action settings or response conditions that can be registered in advance for multiple use. An example of the master data is data specified for a response action (specifically, a character image to be used in "change the character image", a URL of a web page to be used in "jump to/open a page", a video or an image to be used in "display a motion picture or image", a related text or API to be used in "display information in information display area", and the like).

The user dictionary configuration is to register a word into the user dictionary. Specifically, the user dictionary is to register a synonym of some word or an unknown word, and further, to delete a relation between words defined as being related with each other in an internal dictionary.

The banned word setting is to register a problematic word to determine a language inappropriate for an input sentence. Some words are registered in advance. The problematic words are generally classified into obscene word, abuse word, and discriminatory word.

The test is executed, for example with the text screen 880 in FIG. 29 to be described later. Specifically, the test includes the functions of QA test and internal dictionary test.

The knowledge maintenance is executed, for example with the knowledge maintenance screen 890 in FIG. 30 to be described later.

The report is to acquire and analyze log data and to report a summary, the access count, the input count, the ranking of input sentences, and the like.

Hereinafter, QA configuration is described specifically with reference to FIGS. 15 to 26. QA configuration is creating knowledge by creating units of knowledge data 310 structured as shown in FIG. 8. Hereinafter, a reference text Q, a response text A, and a set of reference text(s) Q(s) and response text(s) A(s) stored in the knowledge data 310 are abbreviated and referred to as Q, A, and QA, respectively. It should be noted that a reference text is referred to as Q but the Q is not limited to a question and a response text is referred to as A but the A is not limited to a sentence answering some question. These have been mentioned in the foregoing.

Figure 15:
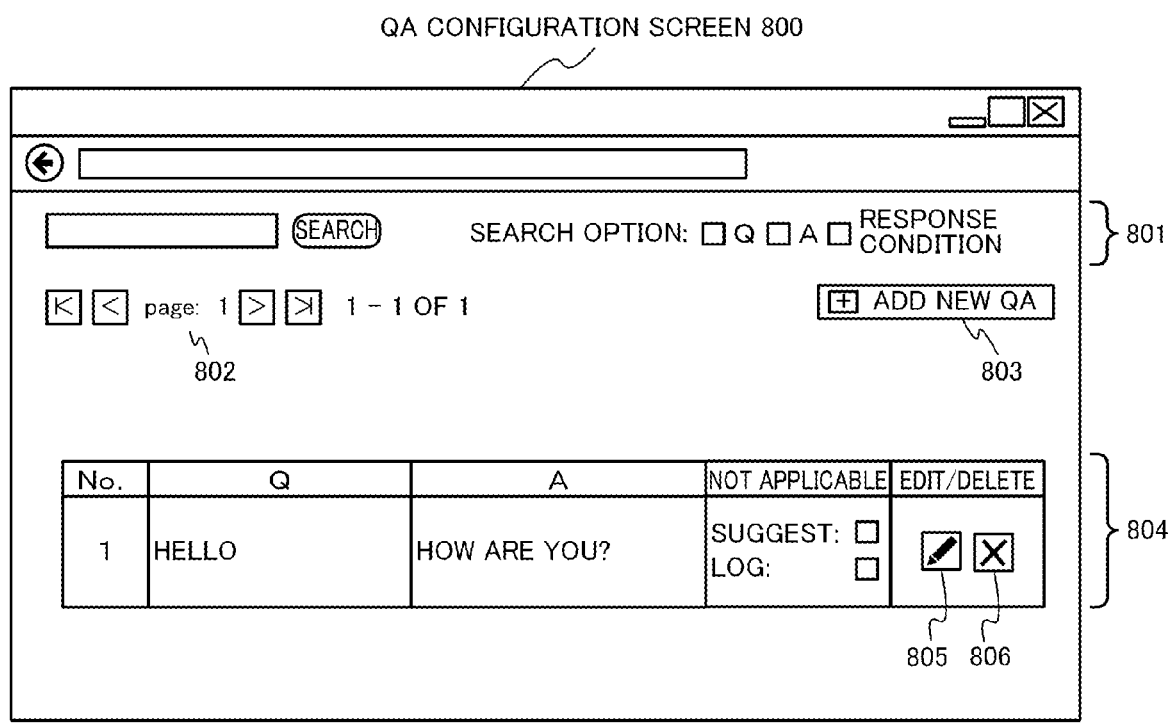
FIG. 15 is a diagram for illustrating a QA configuration screen.

FIG. 15 shows a QA configuration screen 800. This screen is displayed when the system administrator 20 selects "QA configuration" in the screen for knowledge configuration displayed on the system management terminal 600.

The QA configuration screen 800 includes a search instruction area 801 for entering an instruction to conduct a search for Qs, As, and/or response conditions stored in the knowledge data 310, a search result jump instruction area 802 for indicating the page position of the displayed search result within the search result list and for entering an instruction to jump to a desired search result, an Add New QA button 803 to display a new QA addition screen 810 for adding a QA, and a QA display area 804 to display a search result of QA.

The search instruction area 801 provides search options for specifying which part is to be searched by including checkboxes to select Qs, As, and response conditions.

The QA configuration screen 800 in FIG. 15 shows one QA in the QA display area 804 as a result of a specified search. This QA includes "Hello" for a Q and "How are you?" for an A of the response to this Q. This example shows the Q, the A, and further, applicabilities as attributes of the QA in the form of checkboxes in a unit stored in the knowledge data 310. The applicabilities provided here are the applicability for suggestion indicating whether this Q is to be a suggestion and the applicability for log record indicating whether to make records about this QA in a log.

If the QA includes a plurality of Qs, the plurality of Qs are indicated side by side with a space therebetween in the QA display area 804. In this case, the leftmost Q is the representative Q. In similar, if the QA includes a plurality of As, the plurality of As are indicated side by side with a space therebetween.

To edit the QA displayed in the QA display area 804, the administrator presses the Edit button 805 disposed in the corresponding QA display area 804. To delete the QA displayed in the QA display area 804, the administrator presses the Delete button 806 disposed in the corresponding QA display area 804.

FIG. 16 is a diagram for illustrating a new QA addition screen 810 to add a new QA to the knowledge data 310. The new QA addition screen 810 is a screen displayed in response to press of the Add New QA button 803 on the QA configuration screen 800 shown in FIG. 15. Furthermore, in response to press of the Edit button 805 to edit an existing QA, the same screen is displayed.

The new QA addition screen 810 includes a Q display area 811, an Add Synonymous Sentence button 812, an A display area 813, an Add Response Sentence button 814, a response action setting button 815, an applicability setting button (Not Applicable button) 816, and a Register button 817.

The Q display area 811 includes an entry area for entering a Q; the system administrator 20 enters a question or other kind of sentence that is expected to be entered by the users 10 to this entry area so that an input sentence of a user 10 will hit on the Q as being determined through comparison that the input sentence is semantically close to this Q. Furthermore, synonymous sentences or semantically similar sentences and expressions can be registered as a plurality of Qs. For this purpose, an Add Synonymous Sentence button 812 is provided. Upon press of this button, an entry area is added; the system administrator 20 enters a synonymous sentence to the added entry area. In the example of FIG. 16, the second entry area in the Q display area 811 is an area to enter a synonymous sentence (a text "I am looking for a book about psychology." is provided). The Q entered in the first entry area ("I want a book about psychology.") is a requirement and called representative Q.

Synonymous sentences can be added as many as desired in relation to a representative Q. Such configuration can absorb fluctuations in expression among users 10. In other words, inputs in various expressions entered by users 10 can hit one of the Qs including the representative Q and the synonymous sentences, so that an assigned A can be output effectively. The X button provided on the right of the entry area for a synonymous sentence is to delete the synonymous sentence.

Below the Q display area 811, an A display area 813 is provided. An A is a response text and sent to the web browser of the user terminal 100 when the input sentence of a user 10 hits on one of the Qs set as described above; the system administrator 20 enters an A appropriate for the Qs in the first row of the A display area 813.

In the example of FIG. 16, the system administrator 20 enters a response "You will find it on the third floor." as the first response. This A is to guide a user 10 (in a book store, for example) who has entered a sentence like the foregoing Q such as "I want a book about psychology", "I am looking for a book about psychology", or the like, by answering that "You will find it on the third floor."

The first entry area of the A display area 813 is provided with a Simple Configuration button and a Custom Configuration button for setting response conditions; however, the first A cannot be assigned response conditions. Unless a plurality of As are to be set, the system administrator 20 presses the Register button 817 upon completion of entry to the first entry area to complete the new QA addition.

If the system administrator 20 presses the Add Response Sentence button 814 after entering the first A to the A display area 813, the second entry area is displayed in the A display area 813 and the system administrator 20 enters the second A to the area. Such configuration enables different response sentences to be output in accordance with the predetermined conditions in response to input sentences having the same purport.

For the second and subsequent As to be specified in the A display area 813, a Simple Configuration button and a Custom Configuration button are displayed to specify response conditions; the system administrator 20 can press either one. In this example, the response conditions on the first A are evaluated first and if the response conditions are satisfied, the first A is determined to be a response and is sent to the user terminal 100; accordingly, the order of the second and subsequent As can be changed to coordinate the priorities in evaluation. Furthermore, the second and the subsequent As can be deleted together with their response conditions with the X button provided on the right of the entry area for entering the A.

Below the A display area 813, a response action setting button 815 is provided. Upon press of this button, an entry area to specify the response action is displayed. The details thereof are described later.

Below the response action setting button 815, an applicability setting button 816 is provided. Upon press of this button, an entry area to specify whether the QA should be subject to a suggestion, for example. The details thereof are described later.

On the bottom of the new QA addition screen 810, a Register button 817 is provided. Upon press of this button, information on the Qs, As, response conditions, and the like entered in the Q display area 811 and the A display area 813 is stored in the knowledge data 310.

In the description of the foregoing examples of the QA configuration screen 800 and the new QA addition screen 810, the data to be searched or updated is the knowledge data 310. However, the data may be the test data 320 including knowledge data to be tested. The knowledge data 310 used in the practical-use environment is updated by compiling and uploading the test data 320.

FIG. 17 is a diagram for illustrating a simple configuration screen 830 for specifying response conditions for an A. The simple configuration screen 830 is displayed upon press of the Simple Configuration button provided in the A display area 813 of the new QA addition screen 810 shown in FIG. 16. The simple configuration of response conditions is enabled for the second and subsequent As.

The simple configuration screen 830 includes an A display area 831, a response condition conditioning area 832, a response condition setting area 833, and a Set button 834.

The A display area 831 shows the A for which response conditions are to be specified with this simple configuration screen 830. For example, when the system administrator 20 presses the Simple Configuration button to specify the response conditions for the second A in FIG. 16, the second A (that is, "Take the escalator to the third floor. Discount is available on Tuesdays!") is conveyed to and displayed in the A display area 831.

The response condition conditioning area 832 displays a pull-down list to select a condition for the response conditions. The system administrator 20 chooses either a condition to determine that, in the case where a plurality of response conditions are specified, the response conditions are satisfied when all the response conditions are satisfied (AND condition) or a condition to determine that the response conditions are satisfied if any one of the conditions is satisfied (OR condition).

The response condition setting area 833 includes areas to specify individual response conditions. In the example of FIG. 17, conditions on the date (one day or a period), the day of the week, the time (a time or a period), and revisit can be specified. For example, in the case where a period of dates is specified as a response condition, if the entry of an input sentence from a user 10 is within the specified period, the input sentence satisfies the response condition, so that the associated A is output.

If the checkbox of Revisit is checked, the response condition is satisfied when an input sentence of the user 10 hits this Q again. This revisit means revisit in the same HTTP session; if the user 10 inputs the same input sentence again on the website after the user 10 leaves the website, this response condition is not satisfied.

In the example of FIG. 17, the checkbox of Tuesday is checked for the response condition on the day of the week; when a user 10 enters an input sentence on a Tuesday, the associated A "Take the escalator to the third floor. Discount is available on Tuesdays!" is displayed. As noted from this example, the information providing system 1 of the present invention can flexibly provide different responses depending on the response conditions, rather than provide a fixed response, to input sentences having the same meaning.

The configuration available in FIG. 17 is merely an example and other various response conditions can be set easily. The AND condition and the OR condition specified in the response condition conditioning area 832 can be specified more intricately (for example, by mixing an AND condition and an OR condition).

When the system administrator 20 presses the Set button 834 after completion of configuration of response conditions, these response conditions are associated with the A and stored in the knowledge data 310.

FIG. 18 is the new QA addition screen 810 displayed upon press of the Set button 834 after configuring the response conditions for the second A with the simple configuration screen 830 as shown in FIG. 17.

Unlike the new QA addition screen 810 in FIG. 16, the new QA addition screen 810 in FIG. 18 shows the response condition 818 of "Tue" meaning Tuesday under the second entry area of the A display area 813 and further, a Reset button 819 to be pressed to reset this response condition 818 on the right side of the indication of the response condition 818.

Under the second entry area of the A display area 813, the Simple Configuration button is enabled but the Custom Configuration button is disabled. This is because the response condition is configured with simple configuration and can be re-edited only with the simple configuration. If the Reset button 819 is pressed, the response condition is cleared and both of the Simple Configuration button and the Custom Configuration button become selectable.

The new QA addition screen 810 in FIG. 19 shows a state in which another A has been added by pressing the Add Response Sentence button 814 in the QA new addition screen 810 in FIG. 18. The third entry area in the A display area 813 includes a response text of "Visit the third floor. Special sale is going on!" as the third A.

Figure 20:
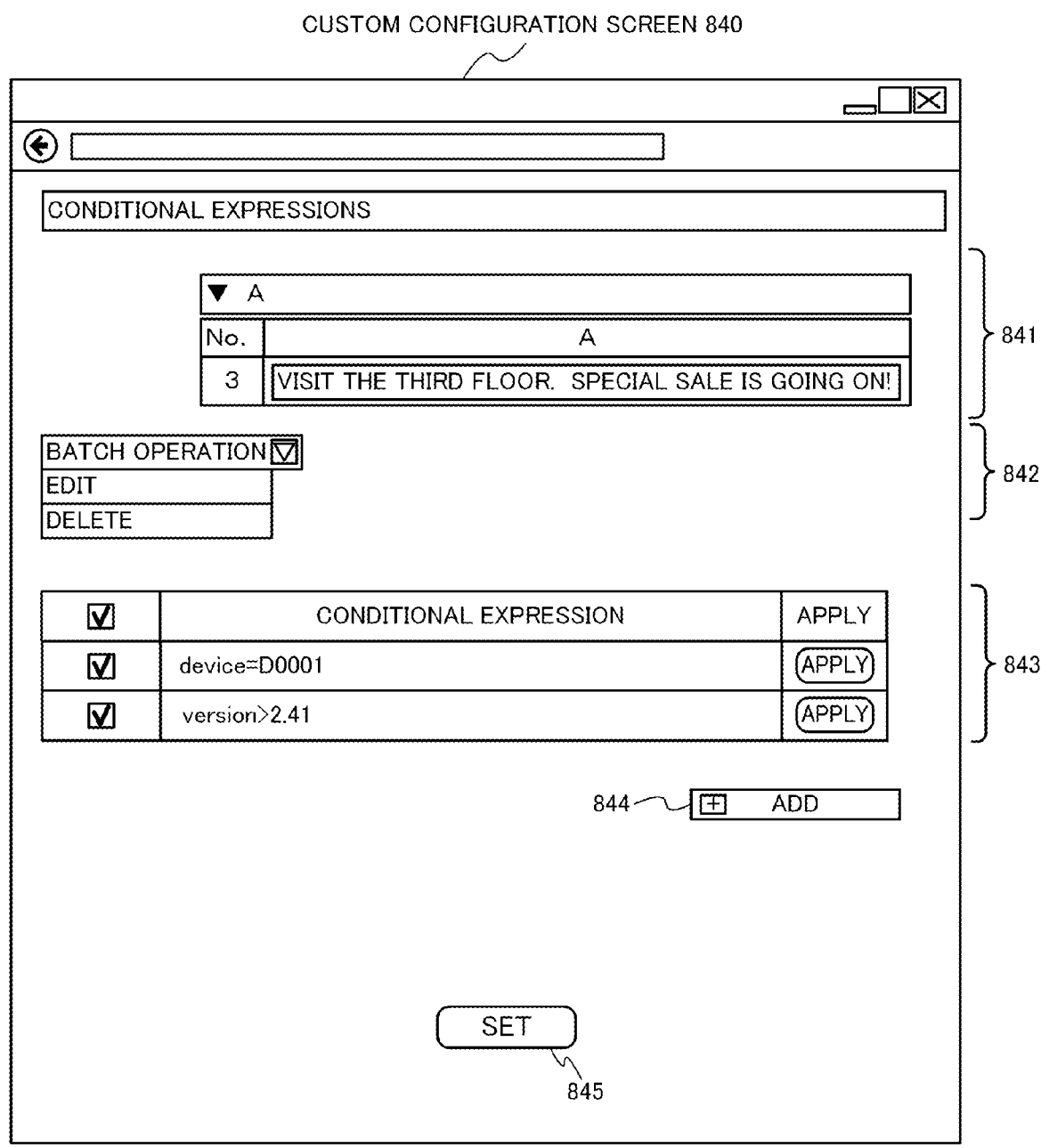
FIG. 20 is a diagram for illustrating a custom configuration screen.

In response to press of the Custom Configuration button to configure response conditions for the third A, the display changes to the custom configuration screen 840 shown in FIG. 20.

The custom configuration screen 840 in FIG. 20 includes an A display area 841, a batch operation setting area 842, a conditional expression setting area 843, an Add button 844, and a Set button 845.

The A display area 841 shows the A for which response conditions are to be specified with this custom configuration screen 840. In this example, the Custom Configuration button has been pressed to configure the response conditions for the third A in FIG. 19; accordingly, the third A (that is, "Visit the third floor. Special sale is going on!") is displayed in the A display area 841.

The batch operation setting area 842 shows a pull-down list to select a batch operation for the conditional expressions. Selecting Edit enables editing the conditional expressions selected with the checkboxes collectively; selecting Delete enables deleting the conditional expressions selected with the checkboxes collectively.

The conditional expression setting area 843 provides entry areas to enter the response conditions for the third A in the form of conditional expression. In the example of FIG. 20, two conditional expressions are specified (in this example, the two conditions are connected by AND condition so that the overall response condition is satisfied when the both response conditions are satisfied). Individual conditional expressions can use AND condition or OR condition.

The first conditional expression is "device=D0001". This conditional expression is compared with the data following "talk_option=" included in the request parameter of the URI sent from the user terminal 100 and if the data matches the conditional expression, the data is determined to satisfy the response condition.

The second conditional expression is "version>2.41". This conditional expression is compared with the data following "talk_option=" included in the request parameter of the URI sent from the user terminal 100 and if the data matches the conditional expression, the data is determined to satisfy the response condition.

These two conditional expressions indicated in the conditional expression setting area 843 are associated with the third A and stored in the knowledge data 310 upon press of the Apply buttons individually provided on the right of the conditional expressions.

The Add button 844 is to add another entry area for a conditional expression in the conditional expression setting area 843 so that a new conditional expression can be specified there. The Set button 845 is to save the conditional expressions in the entry areas displayed in the conditional expression setting area 843.

As described above, the conditional expressions specified with the custom configuration screen 840 are compared with the parameters appended by the web browser of the user terminal 100 and whether the response conditions are satisfied is determined in accordance with the comparison results. Accordingly, setting various parameters in the user terminal 100 enables creation of wide variation in responses.

For example, a user terminal 100 sends information obtainable by the user terminal 100 to the information providing server 200; then, the information providing server 200 can select a different response depending on the information. Specifically, the user terminal 100 may send information on the version of the OS or the web browser, or the model of the user terminal 100, so that the information providing server 200 can select a response. In addition, if the user terminal 100 can acquire information on the specifics of the input of the user 10 (such as the number of inputs and the time of input) with an imaging device, the information providing server 200 can select a response in accordance with this information.

When returning to the new QA addition screen 810 after associating the individual conditional expressions displayed in the conditional expression setting area 843 with the A by pressing the Apply buttons, the new QA addition screen 810 is as shown in FIG. 21. In FIG. 21, the third A in FIG. 19 has been changed to the second A by pressing a reorder button; this A is displayed in the second entry area in the A display area 813 and as a result, the A used to be the second A has been changed to the third A and is displayed in the third entry area in the A display area 813.

Under the second entry area in the A display area 813, the response conditions specified with the custom configuration screen 840 in FIG. 20, i.e., the response conditions 820 of "device=D0001, version>2.41" are displayed and a Reset button 821 to reset these response conditions is displayed on the right of the response conditions 820.

Furthermore, under the second entry area in the A display area 813, the Simple Configuration button is disabled but the Custom Configuration button is enabled. This is because the response conditions are configured by custom configuration and can be re-edited only by the custom configuration. If the Reset button 821 is pressed, the response conditions are cleared and both of the Simple Configuration button and the Custom Configuration button are enabled.

Under the conditions of the new QA addition screen 810 shown in FIG. 21, the response conditions displayed in the second entry area of the A display area 813, "device=D0001, version>2.41", are evaluated and if these response conditions are satisfied, the response "Visit the third floor. Special sale is going on!" is output.

If the foregoing response conditions are not satisfied, the response condition "Tue" shown in the third entry area of the A display area 813 is evaluated. If this response condition is satisfied, the response "Take the escalator to the third floor. Discount is available on Tuesdays!" is output. If the both response conditions are not satisfied, the response "You will find it on the third floor." is output.

Figure 22:
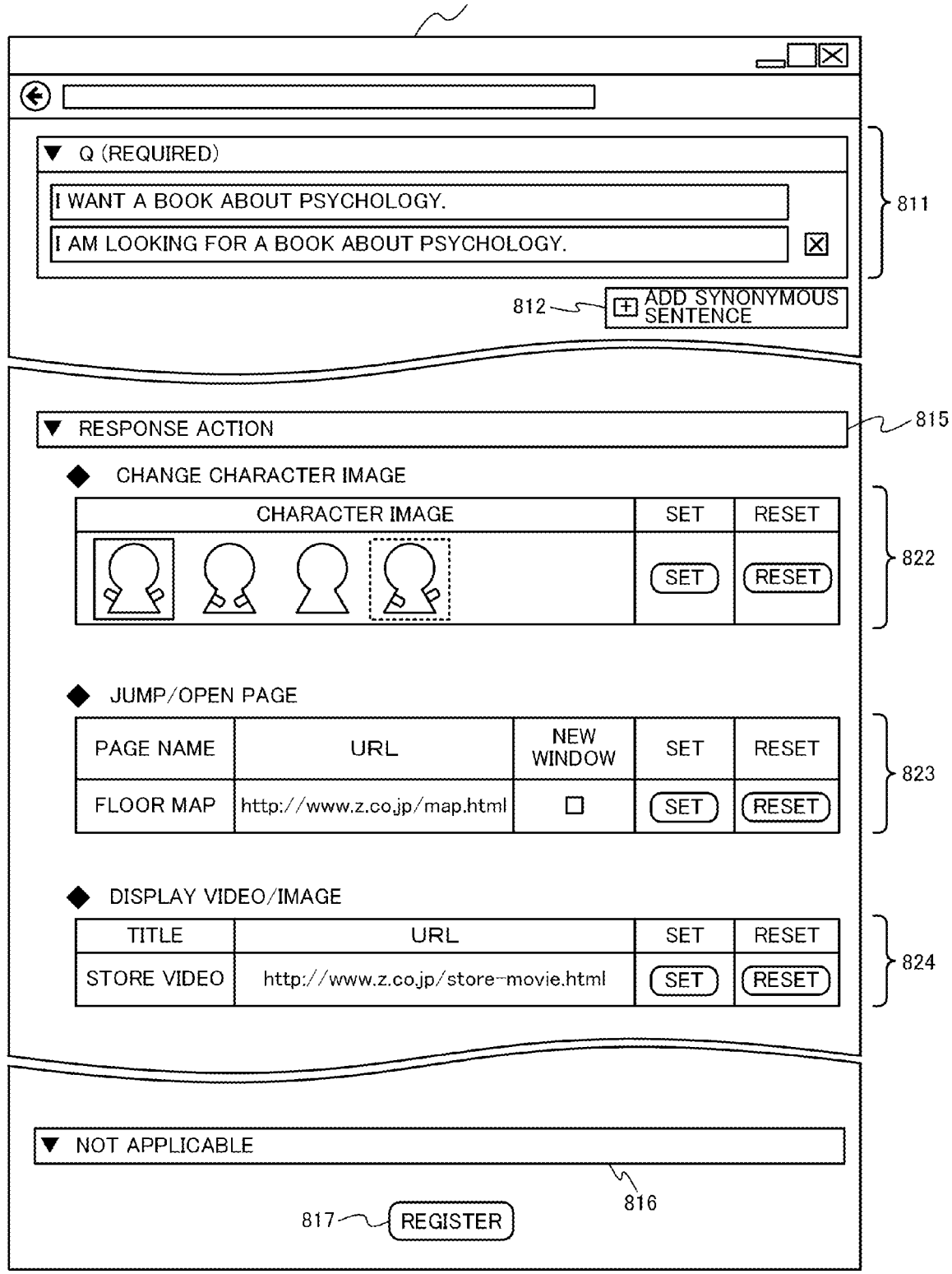
FIG. 22 is a diagram for illustrating a new QA addition screen.

The new QA addition screen 810 in FIG. 22 shows a character image change setting area 822, a page jump/open setting area 823, and a video/image display setting area 824 displayed in response to press of the response action setting button 815.

These areas are to specify response behaviors (actions) to be performed on the web browser of the user terminal 100 in outputting a response.

The character image change setting area 822 is to change the character image displayed in the character image display area 111 in providing a response. With reference to the example of the character image change setting area 822 in FIG. 22, the leftmost character image (the image surrounded by a solid line) indicated as default is changed to the rightmost character image (the image surrounded by a dotted line) by selecting the rightmost character image and pressing the Register button 817. Then, the character image display area 111 displays the default character when the user 10 is entering an input sentence but displays the character image (surrounded by a dotted line) selected in the character image change setting area 822 when the user terminal 100 outputs a response.

The Set button in the character image change setting area 822 is to open a sub window for registering an image to be output. The Reset button is to cancel the selected character image (the image surrounded by a dotted line).

This example changes from a default still image to a specified one to produce variation in response; however, control to change a still image to a video or to change a video to another video to show different motion is also available.

The change of character images produces impact on the display of a response. Selecting different character images depending on the response achieves greater expressiveness. For example, when the user enters an input sentence welcoming or appreciating a response, the character image could be changed to an image of a smiling character. For another example, when the user enters a banned word, the character image could be changed to an image of a character which is looking away.

The page jump/open setting area 823 is to specify the address of a web page to jump to or to be opened, in order to show the web page to the user 10 as a part of the response. If the checkbox for a new window is checked, the specified web page is opened in a new window. The Set button is to open a sub window to enter the address of the web page. The Reset button is to cancel the setting. The Register button 817 is to store the specified settings to the knowledge data 310.

The video/image display setting area 824 is to specify the video or the image (still image) to be displayed for the user 10 as a part of a response. The video or the image can be specified with the address of the video, the image, or a web page. The Set button is to open a sub window to enter the address of the video, image, or web page. The Reset button is to cancel the setting. The Register button 817 is to store the specified settings to the knowledge data 310.

Figure 23:
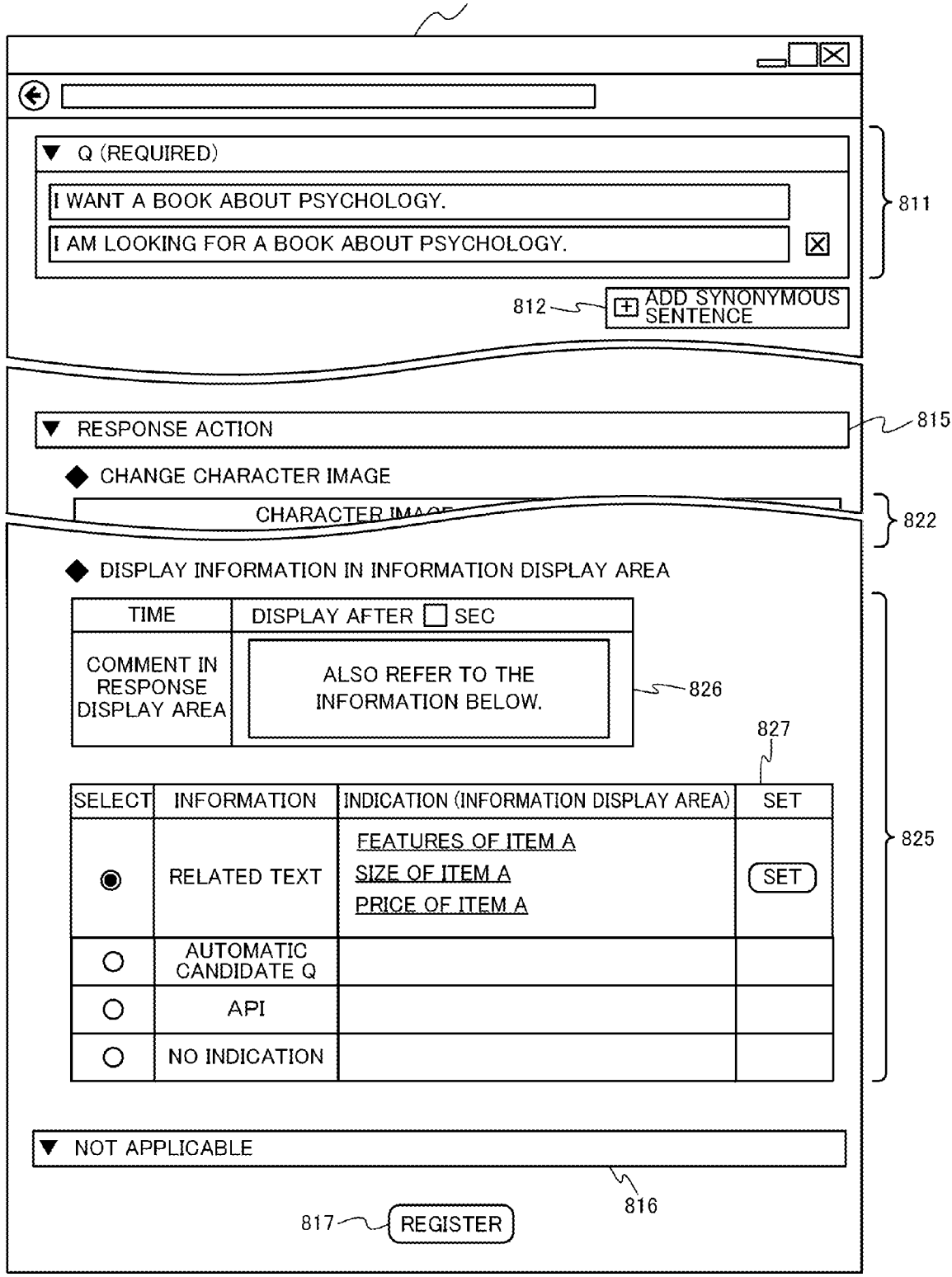
FIG. 23 is a diagram for illustrating a new QA addition screen.

The new QA addition screen 810 in FIG. 23 is continued from the new QA addition screen 810 in FIG. 22. FIG. 23 is to explain setting of the information to be indicated in the information display area 116 as a response behavior (action) by the web browser of the user terminal 100 in outputting a response.

The new QA addition screen 810 in FIG. 23 shows an information indication setting area 825 under the character image change setting area 824 shown in FIG. 22. The information indication setting area 825 is displayed in response to press of the response action setting button 815. The information indication setting area 825 includes a response display setting area 826 and the indication setting area 827.

The response display setting area 826 is to specify how many seconds later the specified indication is to be displayed in the information display area 116. In addition, the comment to be displayed in the response display area 112 can be specified.

The indication setting area 827 is to specify the indication to be displayed in the information display area 116. In the example of FIG. 23, related text, automatic candidate Q, API, or "no indication" can be selected with a radio button.

The related text is used to set a topic the system administrator 20 wants to direct the user after outputting a response. The Set button enables entering related texts. The related texts are displayed in the information display area 116; when the user 10 selects one of them with a mouse and the like, the related text (or the text associated with the related text) is sent to the information providing server 200. In this way, the information providing system 1 can be configured to direct the user 10 to follow a predetermined scenario by displaying texts desirable to be input and letting the user 10 select one of them.

The automatic candidate Q is a candidate sentence automatically acquired in view of the last input and is displayed in the information display area 116. Like the above-described related text, when the user 10 selects it with a mouse and the like, a text associated with the automatic candidate Q is sent to the information providing server 200.

The information display area 116 can display a plurality of candidate sentences; the order of display can be selected from the order of semantic closeness (to the last input), the order of popularity, and the like.

The API is specified when the system administrator 20 wants to use an external API. For example, specifying an API to acquire the weather report in Tokyo tomorrow for an input sentence "How's the weather tomorrow in Tokyo?" in this API setting enables returning a response using the result to the user 10.

"No indication" is to terminate the processing without displaying anything in the information display area 116 after outputting a response.

The new QA addition screen 810 in FIG. 24 is continued from the new QA addition screen 810 in FIGS. 22 and 23 (FIG. 24 shows a QA different from the QA in FIGS. 22 and 23). FIG. 24 is to explain setting of the applicability as an attribute of the QA associated with the QA.

The new QA addition screen 810 in FIG. 24 shows the applicability setting button 816 and the applicability setting area 828 disposed under the A display area 813 and the response action setting button 815. The applicability setting area 828 is deployed under the applicability setting button 816 in response to press of the applicability setting button 816.

The applicability setting area 828 in this example includes a checkbox for specifying whether the Q is to be included in suggestions and a checkbox for specifying whether the Q is to be recorded in the log when some input sentence hits this Q.

In this example, when the checkbox for specifying whether the Q is to be included in suggestions is checked, the Q "Hello" is excluded from the suggestions.

Figure 25A:
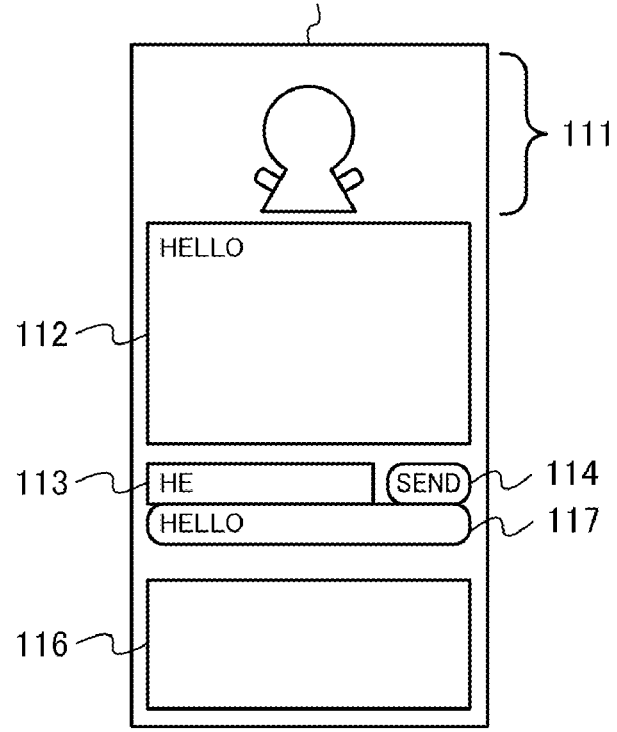
FIGS. 25A and 25B provide diagrams for illustrating how the behaviors of suggesting an input sentence are different between in the cases where the checkbox about the suggestions is checked and unchecked.
Figure 25B:
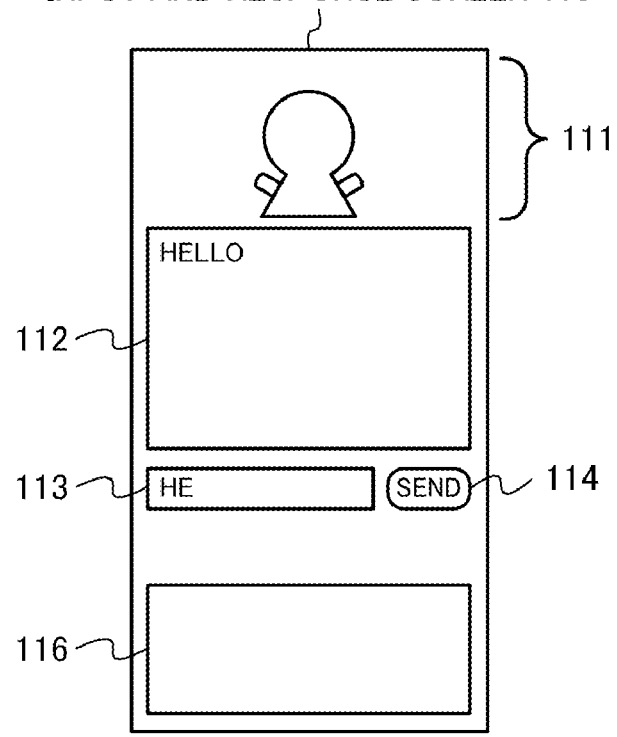

FIGS. 25A and 25B are to illustrate how the behaviors of suggesting an input sentence are different between in the cases where the checkbox about the suggestions is checked and unchecked.

FIG. 25A shows a behavior in the case where the checkbox is unchecked so that the Q "Hello" is included in the suggestions. When the user 10 enters "He" to the entry area 113, the input sentence suggest function of the information providing system 1 works to display a text "Hello" to the guide area 117 provided under the entry area 113 as a suggestion for the input sentence. Hence, the Q "Hello" previously accepted as an input is used by the input sentence suggest function.

FIG. 25B shows a behavior in the case where the checkbox is checked so that the Q "Hello" is excluded from the suggestions. When the user 10 enters "He" to the entry area 113, the input sentence suggest function of the information providing system 1 is working but does not display a text "Hello" under the entry area 113. This example shows that the Q "Hello" previously accepted as an input is not used by the input sentence suggest function.

Figure 26:
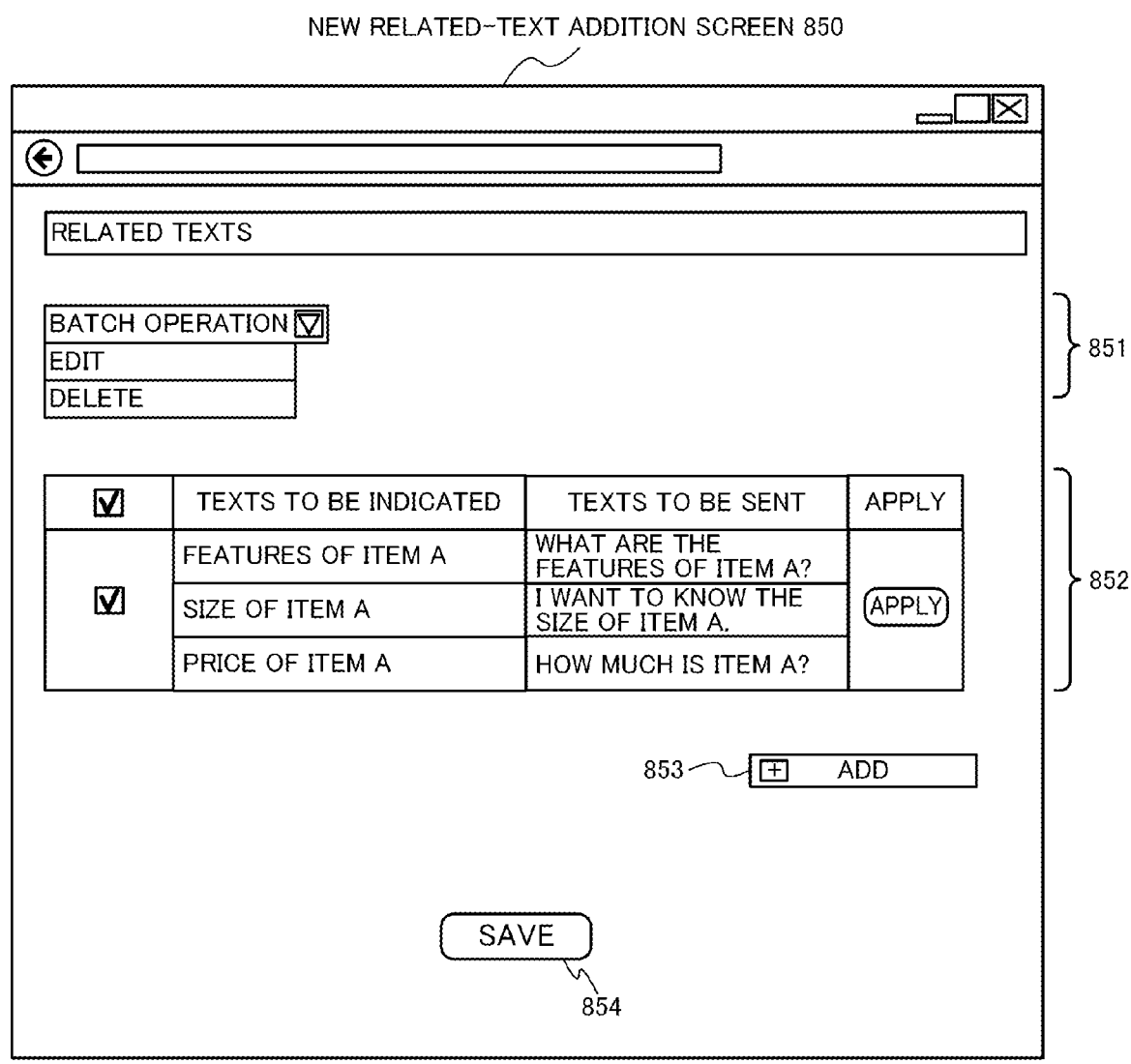
FIG. 26 is a diagram for illustrating a new related-text addition screen.

FIG. 26 shows a new related-text addition screen 850 to be displayed in response to press of the Set button for the related text displayed in the indication setting area 827 of the new QA addition screen 810 in FIG. 23.

The system administrator 20 can specify a text to be sent to the information providing server 200 as a response action to a specific Q selected by the user 10, using the new related-text addition screen 850.

The new related-text addition screen 850 includes a batch operation setting area 851, a related text setting area 852, an Add button 853, and a Save button 854.

The batch operation setting area 851 shows a pull-down list to select a batch operation for the related texts. Selecting Edit enables editing the related texts selected with the checkboxes collectively; selecting Delete enables deleting the related texts with the checkboxes collectively.

The related text setting area 852 is to set related texts to be displayed in the information display area 116; in this example, the texts to be displayed in the information display area 116 and the text actually to be sent to the information providing server 200 in response to selection by the user 10 can be defined separately.

For example, "Size of Item A" can be set to the indication but "I want to know the size of item A." can be set to the message (for the information providing server 200). Because of such a configuration of setting, the text to be indicated for the user 10 does not need to be identical to the text to be hit in the knowledge data 310; more flexible setting is available.

The Add button 853 is to display an entry area to enter a new related text. The Save button 854 is to save the settings configured in the related text setting area 852.

Next, with reference to FIGS. 27 and 28, a specific event message configuration screen is described. The specific event message configuration screen is to make specific event message configuration (see FIG. 14). Through the specific event message configuration screen, no-hit event message setting, no-entry event message setting, start event message setting, and banned-word entry event message setting are available.

The specific event message configuration screen 860 shown in FIG. 27 includes a no-hit event message display area 861, an Edit Message button 863, an Add Message button 864, a response action setting button 865, an applicability setting button 866, and a Register button 867.

The specific event message configuration screen 860 is to set the responses to be output in the response display area 112 in the event of no hit. The no-hit event message display area 861 shows two preset messages. According to the setting on the first message, a text "More details, please." is to be displayed. According to the setting on the second message, a text "Cannot understand. Could you express your question in a different way?" is to be displayed and a condition "word_count>500" (meaning that the input sentence is composed of more than 500 characters) is set to the response condition.

Accordingly, in the case where the user 10 sends an input sentence of more than 500 characters, the second message is responded; in the other cases, the first message is responded. Such settings of a message and response conditions therefor are the same as an A and response conditions therefor set through the new QA addition screen 810. As to the setting of response conditions, the same screens as the simple configuration screen 830 shown in FIG. 17 and the custom configuration screen 840 shown in FIG. 20 are used and the same configuration is available.

The Edit Message button 863 is to edit the message (response) and the Add Message button 864 is to add a message (under different response conditions).

The response action setting button 865 and the applicability setting button 866 respectively correspond to the response action setting button 815 and the applicability setting button 816 in the new QA addition screen 810. The Register button 867 is to register the configuration about the messages to the knowledge data 310.

FIG. 28 is an example of the specific event message configuration screen 860 configured to display candidate Qs for the latest input to suggest a Q in the event where the latest input results in no hit.

In the no-hit event message display area 861, one message is set. Since the one message is set, no response condition is set. In the event of no hit, a message "Maybe, is this what you wanted to say?" is displayed in the response display area 112.

As a response action for this message, automatic candidate Q is selected with a radio button in the response display setting area 868. This setting leads to displaying a plurality of Qs semantically close to the latest input sentence having no hit (or a plurality of frequently hit (popular) Qs) as automatic candidate Qs in the information display area 116.

Even if the input sentence of the user 10 does not hit any Q in the knowledge data 310, the foregoing configuration of the no-hit event message presents candidate Qs semantically close to the input sentence to the user 10, so that the user 10 and the information providing system 1 can continue the dialogue to solve the problem of the user 10.

With the specific event message configuration screen 860, configuration of the messages in the events of no entry, start, and entry of a banned word are available as well as the message in the event of no hit.

Next, with reference to FIG. 29, the test function of the information providing system 1 in the present embodiment is described. FIG. 29 shows a test screen 880 to conduct a test using test data. The test screen 880 in FIG. 29 includes a QA free test area 881 and a QA file test area 882.

The test using the QA free test area 881 is conducted when knowledge is created or corrected at the installation or maintenance; the test simulates an environment where a user 10 enters a text with a user terminal 100.

FIG. 29 shows a state where a text is entered under the condition where the data substantially the same as the knowledge data 310 shown in FIG. 10 is stored in the test data 320. When the system administrator 20 enters a text "I cannot hear the sound." and presses the Send button, a test result is displayed: "I cannot hear the sound." is displayed in the field of input sentence, "Contact your dealer." in the field of A, "hit (high)" in the field of hit, "Sometimes I cannot hear the sound" in the field of hit Q. This is the same as the input and response illustrated in FIG. 10. That is to say, the input sentence "I cannot hear the sound." matches "Q2: Sometimes I cannot hear the sound" with the highest score and "A2: Contact your dealer." associated with Q2 is determined to be the A.

The QA free test area 881 further shows texts "I cannot hear.", "I cannot see the screen.", and "I cannot hear the other end of the call." in the field of candidate Q as a test result. These candidate Qs are Qs except for the hit Q but semantically close to the input sentence among the Qs shown in FIG. 10. Even a Q determined to be no hit could be selected as a candidate Q. The example of FIG. 29 shows the texts "Q3: I cannot hear." hit with the second-highest score next to Q2, and "Q4: I cannot see the screen." and "Q1: I cannot hear the other end of the call." hit with a hit level=hit (low).

The system administrator 20 can determine whether the input sentence hits on the expected Q, whether the candidate Qs are appropriate for the input sentence, whether the hit Q and a candidate Q are to be treated as synonymous sentences, and the like with reference to the test result.

When the system administrator 20 presses the Retest button after correcting knowledge data of the test data 320, another test is conducted. When the system administrator 20 presses the Release button, the knowledge data of the test data 320 is compiled and uploaded, so that the knowledge data 310 is updated.

The test using the QA file test area 882 is conducted when knowledge is created or corrected at the installation or maintenance; the test simulates an environment where a user 10 enters a text with a user terminal 100. Unlike the QA free test, the system administrator 20 can test many input sentences altogether by creating a text file including a plurality of input sentences expected to be entered by the user 10 and sending the file.

The QA file test area 882 shows the same test results shown in the QA free test area 881 for a plurality of input sentences. The first input sentence is the same as the input sentence shown in the test result in the QA free test area 881; the same test result is acquired. The second input sentence is "It's cold today". The field of hit indicates "x" and the field of A indicates "More details, please." which is a response in the event of no hit. Since the input sentence results in no hit, the field of hit Q is blank. The field of candidate Q is also blank in this example; however, some semantically close reference text (but its score does not reach the hit level) may be indicated. The third input sentence is "How are you?" The field of hit indicates "x" and the field of A indicates "More details, please." which is a response in the event of no hit. Since the input sentence results in no hit, the field of hit Q is blank. The field of candidate Q is also blank in this example; however, some semantically close reference text (but its score does not reach the hit level) may be indicated.

When the system administrator 20 presses the Retest button after correcting knowledge data of the test data 320, another test is conducted. When the system administrator 20 presses the Release button, the knowledge data of the test data 320 is compiled and uploaded, so that the knowledge data 310 is updated.

Next, with reference to FIGS. 30 to 37, the knowledge maintenance function of the information providing system 1 in the present embodiment is described. FIG. 30 shows a knowledge maintenance screen 890 to carry out maintenance of the test data 320 using search results of log data. The knowledge maintenance screen 890 in FIG. 30 includes a log search area 891 and a log data display area 892.

The log search area 891 is to specify conditions on the log period, the hit level, the candidate Q, and/or the status and to conduct a search. The log data satisfying the search conditions is displayed in the log data display area 892. The hit levels include "hit (high)" representing a high-score hit (score represents the semantic closeness between the input sentence and the Q), "hit (low)" representing a hit scored lower than the "hit (high)", "no hit" scored lower than a predetermined value, "partial hit" representing a hit on a partial hit Q, and "banned word" identified as a banned word. The hit levels may include "hit (perfect match)" representing a hit where the input sentence perfectly matches a Q.

In the term of "candidate Q", the search determines whether any candidate Q exists or not. The candidate Q means a Q other than a hit Q among the Qs scored higher than a predetermined value. The term "status" means the status of the inputs in the maintenance function, providing a selection of "show all", "edited ones", "unedited ones", and "not subject to maintenance".

The log data display area 892 shows log data retrieved under the search conditions specified in the above-described log search area 891. In the example of FIG. 30, four sets of log data are acquired as search results. The log data used in this search is the log data generated when texts are input in using the knowledge data 310 shown in FIG. 10.

The first row of the log data display area 892 shows "I cannot hear the sound." in the field of input sentence, "hit (high)" in the field of hit, and "Sometimes I cannot hear the sound." in the field of hit Q. This is the same result as the input and response illustrated in FIG. 10. That is to say, the input sentence "I cannot hear the sound." hits on "Q2: Sometimes I cannot hear the sound." with the highest score so that the response sentence to Q2 "A2: Contact your dealer." is determined to be the A. Furthermore, texts "I cannot hear.", "I cannot see the screen.", and "I cannot hear the other end of the call." are displayed in the field of candidate Q. These are the hits other than the hit Q among the hits in FIG. 10. Specifically, the text hit with a second-highest score next to Q2 for this input sentence "Q3: I cannot hear." and the texts hit at a hit level=hit (low) "Q4: I cannot see the screen." and "Q1: I cannot hear the other end of the call." are displayed.

The second row of the log data display area 892 shows "I cannot listen to the other end." in the field of input sentence, "x" in the field of hit (meaning no hit), and a blank in the field of hit Q. This means that the input sentence "I cannot listen to the other end." does not hit any Q in the knowledge data 310 in FIG. 10. The texts having relatively close meaning are selected and displayed as candidate Qs. In the example of FIGS. 30, Q1 and Q8 are displayed out of the knowledge data 310 in FIG. 10.

The third row of the log data display area 892 shows "I cannot see the screen." in the field of input sentence, "hit (high)" in the field of hit, and "I cannot see the screen." in the field of hit Q. This hit Q corresponds to Q4 in the knowledge data 310 in FIG. 10.

The fourth row of the log data display area 892 shows "I cannot talk with the other end." in the field of input sentence, "x" in the field of hit (meaning no hit), and a blank in the field of hit Q. This means that the input sentence "I cannot talk with the other end." does not hit any Q in the knowledge data 310 in FIG. 10. The texts having relatively close meaning are selected and displayed as candidate Qs. In the example of FIGS. 30, Q1 and Q8 are displayed out of the knowledge data 310 in FIG. 10.

The gear icon in the field of input sentence in the log data display area 892 is to display detailed information on the input sentence (such as the response (A) to the input sentence).

Figure 31:
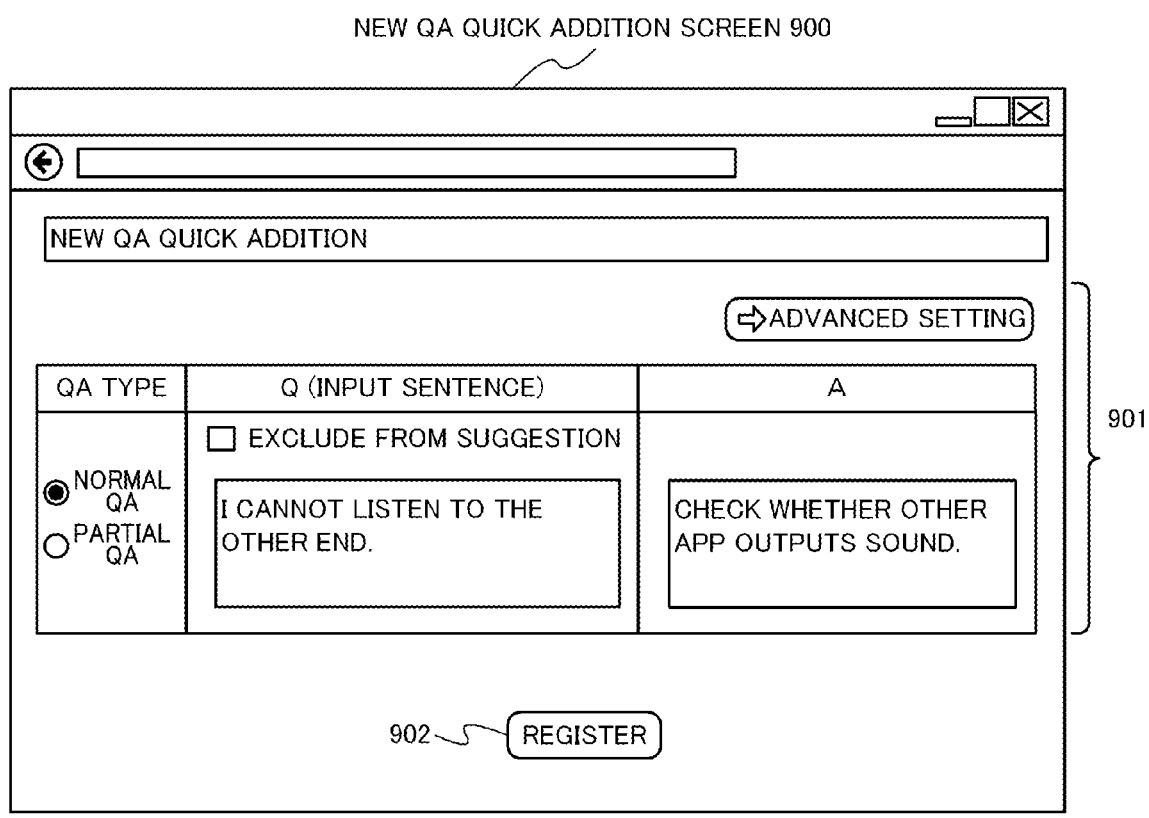
FIG. 31 is a diagram for illustrating a new QA quick addition screen.

The input sentence in the field of input sentence in the log data display area 892 can be pressed (the input sentence is a hypertext); in response to press, a new QA quick addition screen 900 to add the entire input sentence as a new Q is displayed as shown in FIG. 31.

The new QA quick addition screen 900 in FIG. 31 includes a QA edit area 901. For example, in response to press of the link "I cannot listen to the other end." on the second row in the field of input sentence in the log data display area 892 of the knowledge maintenance screen 890 in FIG. 30, the exact text "I cannot listen to the other end." is entered to the field of Q in the QA edit area 901 in FIG. 31. The system administrator 20 enters an appropriate response text to this Q to the field of A. In the example of FIG. 31, a text "Check whether other app outputs sound." is entered.

The Advanced Setting button in the QA edit area 901 is to switch the screen to the new QA addition screen 810 as shown in FIG. 16; the QA can be registered with the screen 810. The Register button 902 is to update the knowledge data in the test data 320. After returning to the knowledge maintenance screen 890 in FIG. 30 and pressing the Release button in the log data display area 892, the knowledge data in the test data 320 is compiled and uploaded, so that the knowledge data 310 is updated.

The foregoing configuration of the information providing system 1 of the present invention enables the system administrator 20 to easily add an appropriate response (A) for a no hit Q (an input sentence for which no corresponding QA can be found).

Figure 32A:
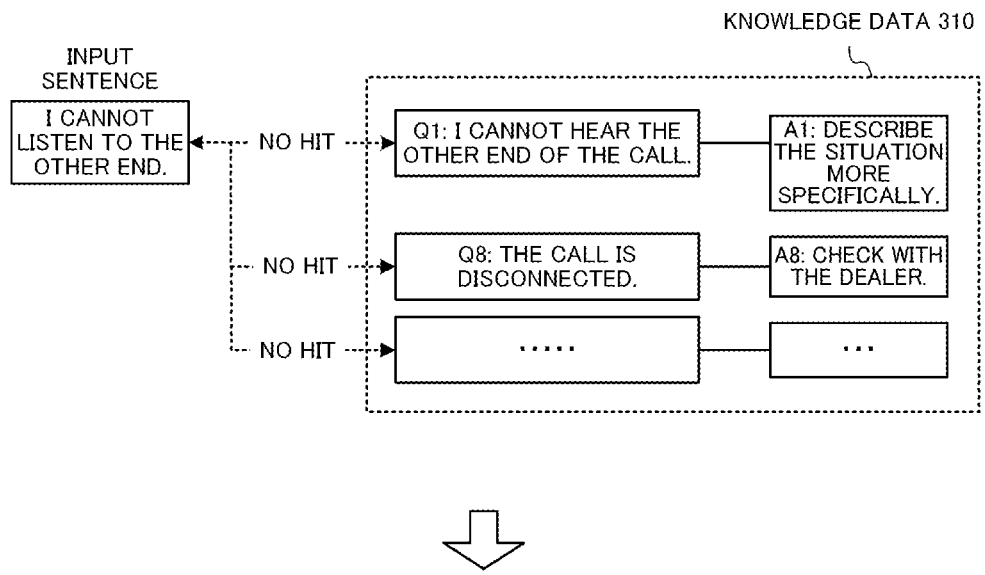
FIGS. 32A and 32B are diagrams for illustrating how a response to an input changes through knowledge maintenance.
Figure 32B:
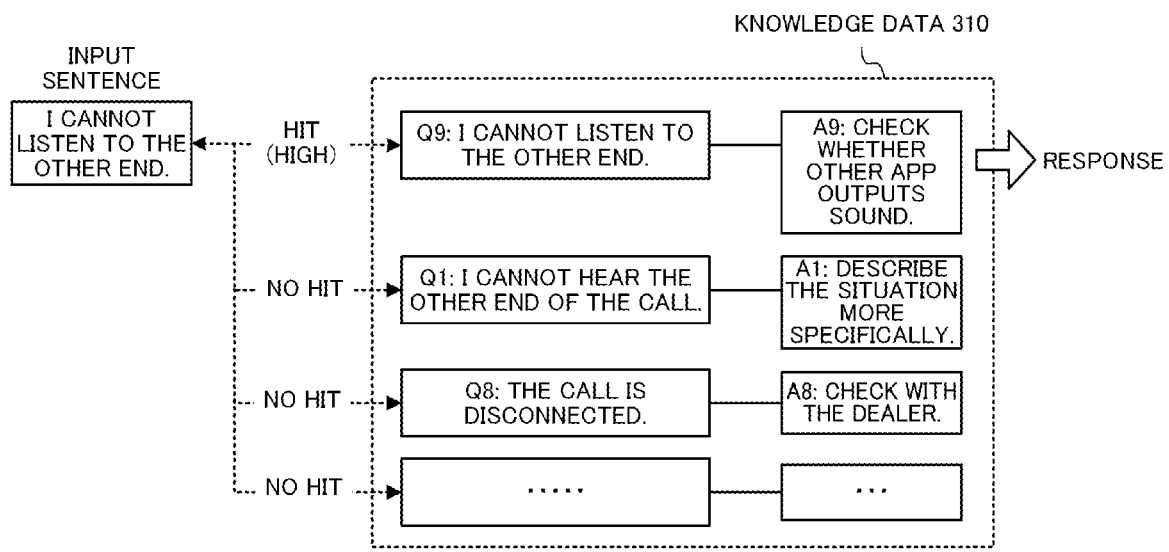

FIGS. 32A and 32B are diagrams for illustrating how a response to an input changes through the knowledge maintenance (new QA quick addition) described with FIGS. 30 and 31. In the test environment, test data 320 substantially including knowledge data is used; however, this section is described assuming that the knowledge data 310 is updated, for the sake of convenience.

FIG. 32A shows a state before applying knowledge maintenance. When an input sentence "I cannot listen to the other end." is entered, no Q is hit in the knowledge data 310 shown in FIG. 10, so that the response set in the no-hit event message configuration is output in response to this input sentence.

FIG. 32B shows a state after applying knowledge maintenance. When an input sentence "I cannot listen to the other end." is entered, the Q "Q9: I cannot listen to the other end." is hit (with hit (high)) since the knowledge data 310 includes the QA added through the new QA quick addition screen 900 in FIG. 31, so that the response associated with this Q, "A9: Check whether other app outputs sound." is output.

The knowledge maintenance screen 890 shown in FIG. 33 is the same as the knowledge maintenance screen 890 shown in FIG. 30; in response to placing a mouse cursor on the gear icon in the field of candidate Q, a popup window 893 including a Detailed Information link of a link to the detailed information on the candidate Qs and a Find Other Candidate link of a link to find other candidates are displayed. In response to press of either link, a screen associated therewith is displayed.

The Detailed Information link is to display a candidate Q detailed information screen 910 as shown in FIG. 34. The candidate Q detailed information screen 910 in FIG. 34 includes a candidate Q detailed information display area 911. The candidate Q detailed information display area 911 shows candidate Qs, responses (A) associated with the candidate Qs, and scores representing the comparison results of the input sentences and the candidate Qs.

Regarding the candidate Q "I cannot hear the other end of the call.", the score is 47%; on the other hand, the candidate Q "The call is disconnected." shows the score 45%. This indicates that the first candidate Q is evaluated as slightly closer to the input sentence.

The system administrator 20 can know whether the response (A) is appropriate for the response to the input sentence and the evaluation of the candidate Q about how semantically close to the input sentence.

Figure 35:
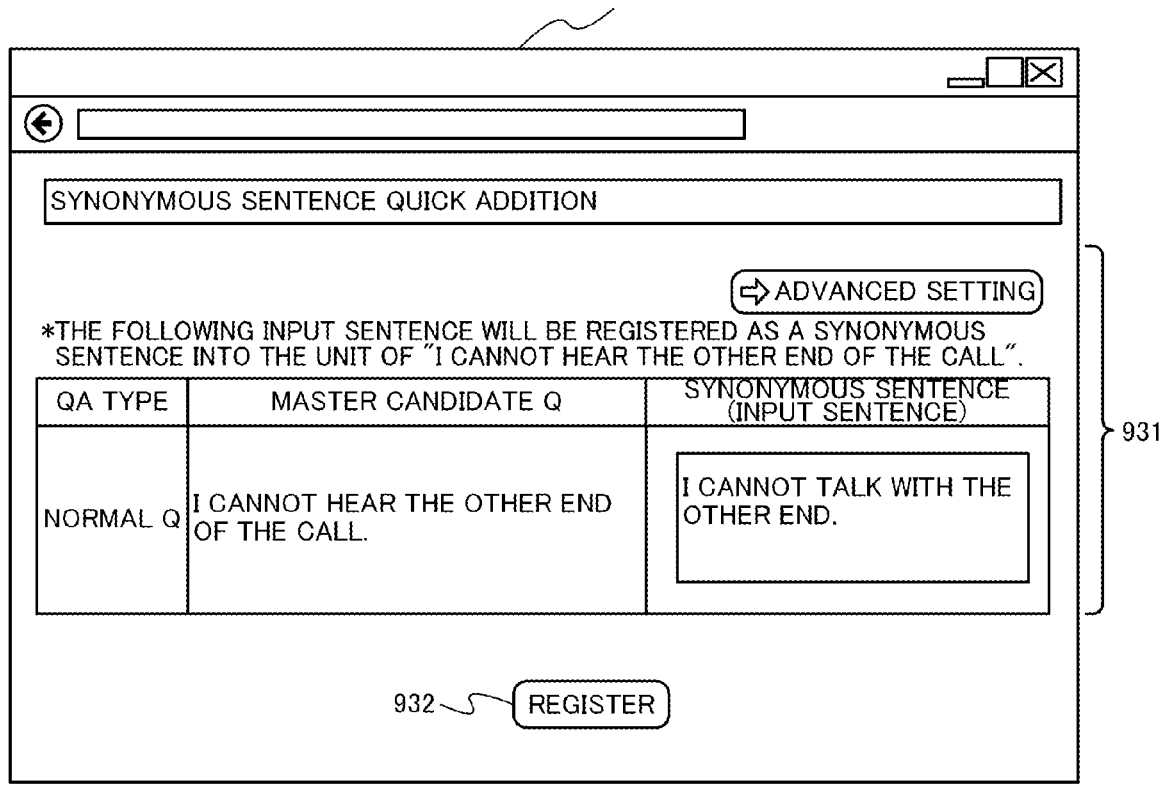
FIG. 35 is a diagram for illustrating a synonymous sentence quick addition screen.

Returning to FIG. 33, in response to press of the first candidate Q for the fourth input sentence in the log data display area 892 (each candidate Q is a link), a synonymous sentence quick addition screen 930 as shown in FIG. 35 is displayed, in which the entire candidate Q is set for a master candidate Q and the text of the input sentence is to be added as a synonymous sentence of the master candidate Q.

The synonymous sentence quick addition screen 930 shown in FIG. 35 includes a synonymous sentence addition setting area 931. For example, in response to press of the link of "I cannot listen to the other end." of the first candidate Q in the field of candidate Q for the fourth input sentence in the log data display area 892 of the knowledge maintenance screen 890 in FIG. 33, the exact text "I cannot listen to the other end." is entered to the field of master candidate Q in the synonymous sentence addition setting area 931 in FIG. 35 (since this text is a constituent of an existing QA, the text cannot be edited).

Further, the exact text of the input sentence in the same entry of the pressed candidate Q is entered in the field of synonymous sentence in the synonymous sentence addition setting area 931 (this text is editable).

The advanced setting button in the synonymous sentence addition setting area 931 is to switch the display to the new QA addition screen 810 as shown in FIG. 16; the QA can be registered with the screen. The Register button 932 is to update the knowledge data of the test data 320. After returning to the knowledge maintenance screen 890 in FIG. 33 and pressing the Release button in the log data display area 892, the knowledge data in the test data 320 is compiled and uploaded, so that the knowledge data 310 is updated.

The foregoing configuration of the information providing system 1 of the present invention enables the system administrator 20 to easily find an input sentence and a Q which are semantically close to each other and to be responded in the same way, and further to readily register the input sentence as a synonymous sentence of the Q.

Figure 36A:
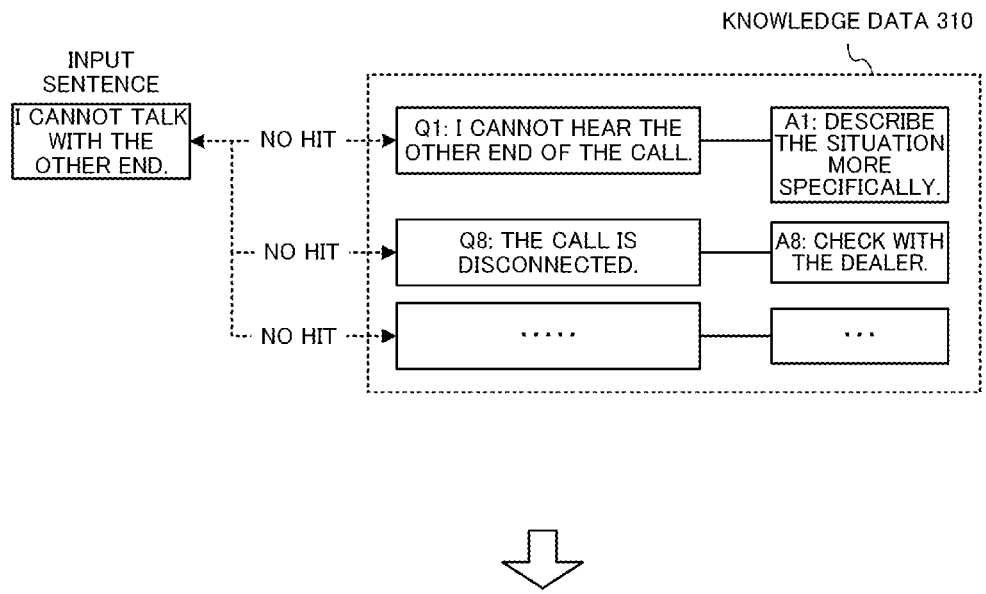
FIGS. 36A and 36B are diagrams for illustrating how a response to an input changes through knowledge maintenance.
Figure 36B:
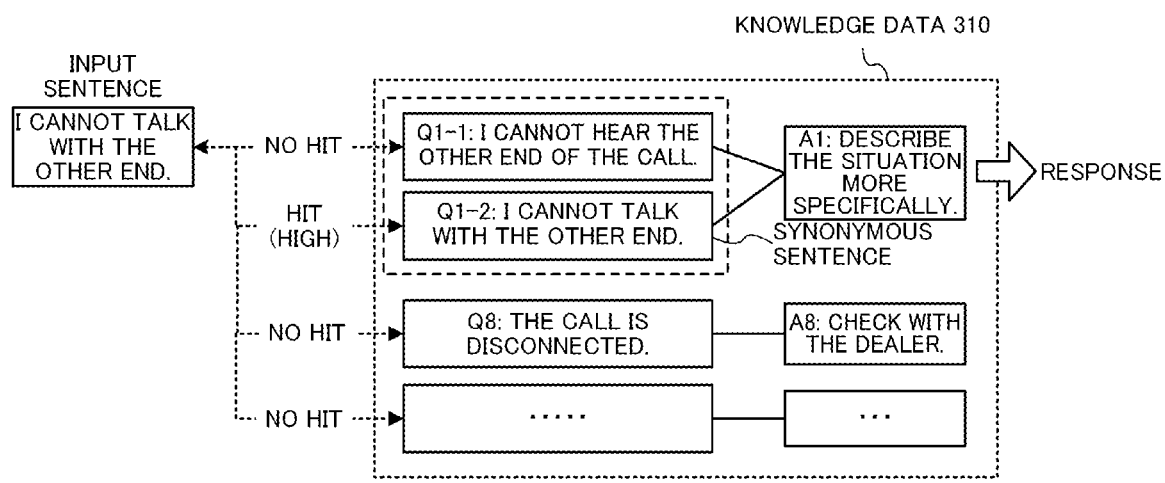

FIGS. 36A and 36B are diagrams for illustrating how a response to an input changes through the knowledge maintenance (synonymous sentence quick addition) described with FIGS. 33 to 35. In the test environment, test data 320 substantially including knowledge data is used; however, this section is described assuming that the knowledge data 310 is updated, for the sake of convenience.

FIG. 36A shows a state before applying knowledge maintenance. When an input sentence "I cannot talk with the other end." is entered, no Q is hit in the knowledge data 310 shown in FIG. 10, so that the response set in the no-hit event message configuration is output in response to this input sentence.

FIG. 36B shows a state after applying knowledge maintenance. Since a synonymous sentence has been added to a specified QA through the synonymous sentence quick addition screen 930 shown in FIG. 35, when an input sentence "I cannot talk with the other end." is entered, a Q "Q1-2: I cannot talk with the other end." is hit (with hit (high)) and a response associated with this Q "A1: Describe the situation more specifically." is output.

When the system administrator 20 returns to the knowledge maintenance screen 890 in FIG. 33 and presses the Input Sentence Test button in the log data display area 892 after adding a QA through the new QA quick addition screen 900 shown in FIG. 31 and adding a synonymous sentence through the synonymous sentence quick addition screen 930 shown in FIG. 35, the knowledge maintenance screen 890 will be as shown in FIG. 37.

Compared with the knowledge maintenance screen 890 in FIG. 33, the field of hit for the second input sentence in the log data display area 892 has been changed from "x" to "hit (high)" and the field of hit Q has been changed from a blank to "Check whether other app outputs sound". This is because a QA has been added through the new QA quick addition screen 900 shown in FIG. 31 to include a Q "Q9: I cannot listen to the other end." in the knowledge data 310, so that the input sentence hits the Q (see FIGS. 32A and 32B).

Furthermore, the field of hit for the fourth input sentence in the log data display area 892 has been changed from "x" to "hit (high)" and the field of hit Q has been changed from a blank to "I cannot hear the other end of the call". This is because a synonymous sentence has been added through the synonymous sentence quick addition screen 930 shown in FIG. 35 and a Q "Q1-2: I cannot talk with the other end." has been added to the knowledge data 310, so that the input sentence hits the Q (see FIGS. 36A and 36B). It should be noted that the candidate Q "I cannot hear the other end of the call." in the field of candidate Q is removed from the candidate Qs since this text has been changed to a hit Q.

Next, with reference to FIG. 38, an example of a hardware configuration of a computer for implementing the information providing server 200 of the information providing system 1 in an embodiment of the present invention is described. It should be noted that the configuration of the information providing server 200 illustrated in FIG. 38 is merely a representative configuration.

The information providing server 200 includes a CPU (Central Processing Unit) 1001, a RAM (Random Access Memory) 1002, a ROM (Read Only Memory) 1003, a network interface 1004, an audio controller 1005, a microphone 1006, a speaker 1007, a display controller 1008, a display device 1009, an input device interface 1010, a keyboard 1011, a mouse 1012, an external storage device 1013, an external recording medium interface 1014, and a bus 1015 connecting these components.

The CPU 1001 controls operations of each component of the information providing server 200 and, under the control of an OS, controls the processing of the input and response control module 210, the knowledge data management module 220, and other modules according to the present invention.

The RAM 1002 stores programs to execute the processing performed by the CPU 1001 and data to be used by the programs in execution on a temporal basis. The ROM 1003 stores the programs to be executed at the start of the information providing server 200.

The network interface 1004 is an interface to connect to the network 1020. The network 1020 is a network of the information providing server 200, the user terminal 100, and the system management terminal 600 and corresponds to the network 700 shown in FIG. 1.

The audio controller 1005 controls the microphone 1006 and the speaker 1007 to control the input and output of sound. The display controller 1008 is a dedicated controller for processing graphics instructions issued by the CPU 1001. The display device 1009 is a device made of an LCD (Liquid Crystal Display) or a CRT (Cathode Ray Tube).

The input device interface 1010 receives signals input from the keyboard 1011 and the mouse 1012 and sends instructions in accordance with the signal patterns to the CPU 1001.

The external storage device 1013 is a storage device such as a hard disk drive or a semiconductor memory. The aforementioned programs and data are stored in this device and loaded to the RAM 1002 as necessary. For example, the input and response management DB shown in FIG. 1 can be stored in the external storage device 1013.

The external recording medium interface 1014 accesses an external recording medium 1030 and retrieves data recorded therein. The external recording 1030 medium may be a portable flash memory, a CD (Compact Disc), or a DVD (Digital Versatile Disc). The program to be executed by the CPU 1001 and to implement the functions of the present invention can be provided from the external recording medium 1030 through this external recording medium interface 1014. Alternatively, the program to implement the functions of the present invention can be distributed by a specific server on the network via the network 1020 and the network interface 1004 and stored in the external storage device 1013 or the RAM 1002.

Described above is an example of the hardware configuration of the information providing server 200 of the information providing system 1 according to an embodiment of the present invention. It is to be noted that the suggest server 400, the user terminal 100, and the system management terminal 600 in the present embodiment are basically the same computers having this configuration. However, the audio controller 1005, the microphone 1006, the speaker 1007, the display controller 1008, the display device 1009, the input device interface 1010, the keyboard 1011, and the mouser 1012 are not essential for the servers.

As set forth above, the information providing system 1 according to an embodiment of the present invention has been described with specific examples for embodying the present invention; however, the specific examples are merely examples to describe the present invention and do not limit the scope of rights of the present invention. The technical idea of the present invention can be embodied using various methods and configurations other than those examples.

What is claimed is:

1. An information providing system that automatically generates a response, including a response according to a predetermined condition, to a text query input from a user terminal in electronic communication with the information providing system, the information providing system comprising:
   an information providing server including a central processing unit (CPU); and
   a non-transitory computer readable medium including computer implementable instructions, which when read by the CPU directs the information providing server to:
   receive, via an input reception module, an input text input from a user terminal;
   determine, via a response determination module, a response to the input text based on a comparison thereof with knowledge data stored in a database in electronic communication with the information providing server;
   generate, via a response data generation module response data including the response determined as a result of the comparison;
   send the generated response data to the user terminal; and
   send, via an administrative control module, information pertaining to the response data including the response determined as a result of the comparison to a system management terminal operable by a system administrator in response to information received from a system management terminal operating in a mode allowing system administrator operations,
   wherein the knowledge data stored in the database is composed of a plurality of units, each including a reference text that is compared with the input text, and a response text that is associated with the reference text,
   wherein the response determination module compares the input text with the reference texts associated with the plurality of units and determines, as a response, a response text associated with a reference text semantically closest to the input text when a semantic closeness level of the semantically closest reference text is higher than or equal to a predetermined level,
   wherein the response text is associated with additional information comprising one or more of:
      a predetermined response condition, which is a condition on information input from the user terminal other than the input text for selecting a response from among a plurality of responses to be sent to the user terminal;
      a predetermined response behavior setting, which is information for defining a behavior of the user terminal when a selected response is received by the user terminal; and, a predetermined applicability setting, which is information for specifying whether the reference text is to be a suggestion and/or whether to record the input text into a log, and wherein data to be included in the generated response data is based on the additional information associated with the response text and a semantic closeness of the input text and the reference text being greater than or equal to a predetermined threshold.

2. The information providing system according to claim 1, wherein the administrative control module includes a test control module that determines a response to a test input text provided from the system management terminal operated by the system administrator, the response to the test based on data including the reference texts compared with the input text and the response texts associated with the reference texts, and sends the determined response to the system management terminal in a test mode.

3. The information providing system according to claim 2, wherein the test input text is provided in a file including a plurality of test input texts to be tested, wherein the test control module individually determines responses to the plurality of test input texts and sends data to display a list of the responses to the test to the system management terminal.

4. The information providing system according to claim 2, wherein the test control module sends data to display the test input text, a reference text associated with the response determined in the test mode, and a reference text other than the reference text determined to be semantically closest to the test input text as a result of the comparison of the test input text with the reference texts to the system management terminal in a case where a response is determined in the test mode.

5. The information providing system according to claim 2, wherein the test control module sends data to display the test input text and a reference text determined to be semantically closest to the test input text as a result of the comparison of the test input text with the reference texts to the system management terminal in a case where no response is determined in the test mode.

6. The information providing system according to claim 1, wherein the administrative control module includes a knowledge maintenance control module that sends data to display a list of log data including:
   an input text for which no response text associated with the reference texts is determined to be a response; and,
   a reference text determined to be semantically closest to the input text by the response determination module as a result of the comparison of the input text with the reference texts,
to the system management terminal in response to operations of the system management terminal by the system administrator in a maintenance mode.

7. The information providing system according to claim 6, wherein the knowledge maintenance control module controls the system management terminal to display a screen to add the input text to the knowledge data as a reference text when the input text shown in the list of log data is selected with the system management terminal.

8. The information providing system according to claim 6, wherein the knowledge maintenance control module controls the system management terminal to display a screen to add the input text associated with the reference text in the list of log data as a synonymous sentence of the reference text stored in the knowledge data when the reference text shown in the list of log data is selected with the system management terminal.

9. An information providing method for an information providing server in an information providing system that automatically generates a response, including a response according to a predetermined condition, to a text query input from a user terminal in electronic communication with the information providing system, the method comprising:
   in an input reception step, receiving an input text input from the user terminal;
   in a response determination step, determining a response to the input text based on a comparison thereof with knowledge data stored in a database in electronic communication with an information providing server;
   in a response data generation step, generating response data including the response determined as a result of the comparison, and sending the generated response data to the user terminal; and
   in an administrative control step, sending information pertaining to the response data including the response determined as a result of the comparison to a system management terminal operable by a system administrator in response to information received from the system management terminal operating in a mode allowing system administrator operations,
   wherein the knowledge data stored in the database is composed of a plurality of units, each including a reference text that is compared with the input text query, and a response text that is associated with the reference text,
   wherein, in the response determination step, the input text is compared with the reference texts associated with the plurality of units and it is determined, as the response, a response text associated with a reference text semantically closest to the input text when a semantic closeness level of the semantically closest reference text is higher than or equal to a predetermined level,
   wherein the response text is associated with additional information comprising one or more of:
      a predetermined response condition, which is a condition on information input from the user terminal other than the input text for selecting a response from among a plurality of responses to be sent to the user terminal;
      a predetermined response behavior setting, which is information for defining a behavior of the user terminal when a selected response is received by the user terminal; and,
      a predetermined applicability setting, which is information for specifying whether the reference text is to be a suggestion and/or whether to record the input text into a log, and
   wherein data to be included in the generated response data is based on the additional information associated with the response text and a semantic closeness of the input text and the reference text being greater than or equal to a predetermined threshold.

10. The information providing method according to claim 9,
   wherein the administrative control step includes a test control step that determines a response to a test input text provided from the system management terminal operated by the system administrator, the response to the test control step based on data including the reference texts compared with the input text and the response texts associated with the reference texts, and sending the determined response to the system management terminal in a test mode.

11. The information providing method according to claim 9,
wherein the administrative control step includes a knowledge maintenance control step of sending data to display a list of log data including:
an input text for which no response text associated with a reference text is determined to be a response; and,
a reference text determined to be semantically closest to the input text by the response determination step as a result of the comparison of the input text with the reference texts,
to the system management terminal in response to operations of the system management terminal by the system administrator in a maintenance mode.

12. A non-transitory recording medium for storing a computer executable program, which when executed by a computer causes the computer to perform operations within an information providing system and function as:
an input reception module that receives an input text input from a user terminal;
a response determination module that determines a response to the input text based on a comparison thereof with knowledge data stored in a database in electronic communication with the computer;
a response data generation module that generates response data including the response determined by the response determination module and sends the generated response data to the user terminal; and
an administrative control module that sends information pertaining to the response data including the response determined as a result of the comparison to a system management terminal operable by a system administrator in response to information received from a system management terminal operating in a mode allowing system administrator operations,
wherein the knowledge data stored in the database is composed of a plurality of units, each including a reference text that is compared with the input text query, and a response text that is associated with the reference text, and
wherein the response determination module compares the input text with the reference texts associated with the plurality of units and determines, as a response, a response text associated with a reference text semantically closest to the input text when a semantic closeness level of the semantically closest reference text is higher than or equal to a predetermined level,
wherein the response text is associated with additional information comprising one or more of:
a predetermined response condition, which is a condition on information input from the user terminal other than the input text for selecting a response from among a plurality of responses to be sent to the user terminal;
a predetermined response behavior setting, which is information for defining a behavior of the user terminal when a selected response is received by the user terminal; and,
a predetermined applicability setting, which is information for specifying whether the reference text is to be a suggestion and/or whether to record the input text into a log, and
wherein data to be included in the generated response data is based on the additional information associated with the response text and a semantic closeness of the input text and the reference text being greater than or equal to a predetermined threshold.

13. The non-transitory recording medium according to claim 12,
wherein the administrative control module includes a test control module that determines a response to a test input text provided from the system management terminal operated by the system administrator, the response to the test based on data including the reference texts compared with the input text and the response texts associated with the reference texts, and sends the determined response to the system management terminal in a test mode.

14. The non-transitory recording medium according to claim 12,
wherein the administrative control module includes a knowledge maintenance control module that sends data to display a list of log data including:
an input text for which no response text associated with a reference text is determined to be a response; and,
a reference text determined to be semantically closest to the input text by the response determination module as a result of the comparison of the input text with the reference texts,
to the system management terminal in response to operations of the system management terminal by the system administrator in a maintenance mode.

* * * * *